US008672743B2

(12) United States Patent
Walker et al.

(10) Patent No.: US 8,672,743 B2
(45) Date of Patent: Mar. 18, 2014

(54) FACILITATING PLAY OF A GAMING DEVICE IN ACCORDANCE WITH A CONTRACT

(75) Inventors: Jay S. Walker, Ridgefield, CT (US); James A. Jorasch, New York, NY (US); Geoffrey M. Gelman, Brooklyn, NY (US); Stephen C. Tulley, Monroe, CT (US); Daniel E. Tedesco, Shelton, CT (US); Robert C. Tedesco, Fairfield, CT (US)

(73) Assignee: IGT, Las Vegas, NV (US)

( * ) Notice: Subject to any disclaimer, the term of this patent is extended or adjusted under 35 U.S.C. 154(b) by 1398 days.

(21) Appl. No.: 11/303,385

(22) Filed: Dec. 16, 2005

(65) Prior Publication Data
US 2008/0039189 A1 Feb. 14, 2008

Related U.S. Application Data

(63) Continuation-in-part of application No. PCT/US2005/028383, filed on Aug. 10, 2005.

(60) Provisional application No. 60/600,211, filed on Aug. 10, 2004, provisional application No. 60/600,646, filed on Aug. 11, 2004.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/25; 463/29; 463/40; 463/42; 273/242

(58) Field of Classification Search
USPC .................. 463/25, 29, 42, 40; 273/143, 242
See application file for complete search history.

(56) References Cited

U.S. PATENT DOCUMENTS

| 4,569,526 | A | * | 2/1986 | Hamilton | 273/242 |
| 5,178,390 | A | | 1/1993 | Okada | 273/143 |
| 5,766,075 | A | | 6/1998 | Cook et al. | 463/25 |

(Continued)

FOREIGN PATENT DOCUMENTS

WO    WO 03/025828    3/2003

OTHER PUBLICATIONS

International Search Report. Int'l Application. No. PCT/US05/28383, Int'l Filing Date Aug. 10, 2005.Mail Date Apr. 2, 2007, 5 pgs.

(Continued)

*Primary Examiner* — Adetokunbo O Torimiro
(74) *Attorney, Agent, or Firm* — Neal, Gerber & Eisenberg LLP

(57) ABSTRACT

According to some embodiments, systems, methods, and/or articles of manufacture are associated with determining an identifier associated with a player of a gaming device, determining information indicative of historical game play of the player, and determining, based at least upon the information indicative of the historical game play of the player and the identifier associated with the player, whether the player qualifies for a benefit pursuant to a gaming contract. Some embodiments are directed to receiving an indication of a gaming contract insurance claim associated with a gaming contract of a player, determining information indicative of a subset of historical game play of the player, and determining whether to provide a benefit to the player pursuant to the gaming contract.

40 Claims, 19 Drawing Sheets

(56) References Cited

U.S. PATENT DOCUMENTS

| | | | |
|---|---|---|---|
| 5,797,795 A * | 8/1998 | Takemoto et al. | 463/42 |
| 5,910,048 A | 6/1999 | Feinberg | 463/25 |
| 6,077,163 A | 6/2000 | Walker et al. | |
| 6,110,041 A | 8/2000 | Walker | |
| 6,113,493 A | 9/2000 | Walker et al. | |
| 6,113,495 A | 9/2000 | Walker et al. | |
| 6,238,288 B1 | 5/2001 | Walker et al. | |
| 6,254,482 B1 | 7/2001 | Walker et al. | |
| 6,279,910 B1 | 8/2001 | de Keller | |
| 6,283,474 B1 | 9/2001 | de Keller | |
| 6,561,903 B2 | 5/2003 | Walker et al. | |
| 6,582,310 B1 | 6/2003 | Walker et al. | |
| 6,645,075 B1 | 11/2003 | Gatto et al. | 463/25 |
| 6,719,291 B1 | 4/2004 | de Keller | |
| 6,800,030 B2 | 10/2004 | Acres | |
| 6,802,773 B2 | 10/2004 | Moody | |
| 6,863,608 B1 * | 3/2005 | LeMay et al. | 463/24 |
| 6,869,362 B2 | 3/2005 | Walker et al. | |
| 7,140,964 B2 | 11/2006 | Walker et al. | 463/25 |
| 7,195,243 B2 | 3/2007 | Kenny et al. | |
| 7,393,279 B2 | 7/2008 | Walker et al. | |
| 7,416,486 B2 | 8/2008 | Walker et al. | |
| 7,494,416 B2 | 2/2009 | Walker et al. | |
| 7,533,886 B2 | 5/2009 | Kenny et al. | |
| 7,591,726 B2 | 9/2009 | Baerlocher et al. | |
| 7,771,273 B2 | 8/2010 | Walker et al. | |
| 7,771,275 B2 | 8/2010 | Walker et al. | |
| 7,775,878 B2 | 8/2010 | Walker et al. | |
| 7,775,879 B2 | 8/2010 | Walker et al. | |
| 2002/0059379 A1 * | 5/2002 | Harvey et al. | 709/205 |
| 2002/0082088 A1 * | 6/2002 | Nagashima | 463/42 |
| 2002/0147040 A1 * | 10/2002 | Walker et al. | 463/25 |
| 2002/0175468 A1 | 11/2002 | Kenny et al. | |
| 2003/0003988 A1 | 1/2003 | Walker et al. | |
| 2003/0013516 A1 * | 1/2003 | Walker et al. | 463/25 |
| 2003/0027635 A1 * | 2/2003 | Walker et al. | 463/40 |
| 2003/0028480 A1 * | 2/2003 | Rowe | 705/39 |
| 2003/0220138 A1 | 11/2003 | Walker et al. | |
| 2003/0224854 A1 * | 12/2003 | Joao | 463/40 |
| 2004/0147308 A1 | 7/2004 | Walker et al. | |
| 2004/0147314 A1 * | 7/2004 | LeMay et al. | 463/30 |
| 2005/0059482 A1 | 3/2005 | Hedrick et al. | 463/29 |

OTHER PUBLICATIONS

Fey, Marshall. Slot Machines: A Pictorial History of the First 100 Years. Liberty Belle Press. 1983, p. 162.

Written Opinion of Int'l Searching Authority. Int'l Application. No. PCT/US05/28383, Int'l Filing Date Aug. 10, 2005. Mail Date Apr. 2, 2007, 5 pgs.

Non-Final Office Action dated Jun. 7, 2002 from U.S. Appl. No. 09/819,175.

Non-Final Office Action dated May 7, 2008 from U.S. Appl. No. 11/434,309.

Non-Final Office Action dated Sep. 21, 2009 from U.S. Appl. No. 11/434,309.

Search Report dated Jun. 7, 2010 from EP Application No. 05779722.7.

* cited by examiner

| | PLAYER IDENTIFIER 402 | NAME 404 | ADDRESS 406 | MEMBER SINCE 408 | TOTAL WAGERED 410 | |
|---|---|---|---|---|---|---|
| R400-1 → | P-000001 | BOB JONES | 123 ELM STREET SPRINGTOWN, NY | 11/20/99 | $1,535.00 | |
| R400-2 → | P-000002 | MARIA LOPEZ | 35 GUMDROP DR. CAPITAL CITY, CA | 7/28/04 | $168.50 | |
| | ○○○ | ○○○ | ○○○ | ○○○ | ○○○ | |
| R400-3 → | P-106998 | SUE SMITH | 140 MAIN ST PRARIEVILLE, ND | 1/15/93 | $19,754.25 | |
| R400-4 → | P-106999 | JOHN REID | 65 BEACH LANE #1 BEACH CITY, NJ | 3/26/98 | $980.10 | |

| | THEORETICAL WIN 412 | ACTIVE CONTRACT(S) 414 | EXPIRED CONTRACT(S) 416 | HOTEL GUEST? 418 |
|---|---|---|---|---|
| R400-1 | $138.15 | GC-000760 | - | Y |
| R400-2 | $15.17 | - | - | Y |
| ⋮ | ⋮ | | | ⋮ |
| R400-3 | $1,777.88 | - | GC-000569, GC-000113 | N |
| R400-4 | $88.21 | - | - | N |

FIG. 4B

| PLAYER ELIGIBILITY RULE IDENTIFIER 502 | CONDITION(S) 504 | ELIGIBILITY 506 | RULE STATUS 508 |
|---|---|---|---|
| R-001 | IS NOT A HOTEL GUEST OR DOES NOT HAVE A GUEST PASS | PLAYER IS NOT ELIGIBLE FOR ANY CONTRACT | ENABLED |
| R-002 | HAS AN ACTIVE CONTRACT | PLAYER IS NOT ELIGIBLE FOR ANY CONTRACT | ENABLED |
| R-003 | HAS GENERATED > $10,000 IN THEORETICAL WIN | PLAYER IS ELIGIBLE FOR ANY CONTRACT | ENABLED |
| ○○○ | ○○○ | | ○○○ |
| R-00N | HAS NOT BEEN A MEMBER SINCE BEFORE 01/01/00 | PLAYER IS ELIGIBLE FOR CONTRACT WITH REFUND RATE < 51% | DISABLED |

FIG. 5

| GAMING DEVICE IDENTIFIER 602 | GAME NAME 604 | MANUFACTURER 606 | LOCATION 608 | GAME TYPE 610 |
|---|---|---|---|---|
| D-000001 | GOLDEN NICKLE FRENZY | BIG GUY GAMING, INC. | ROOM A | 5-REEL SLOT |
| D-000002 | MEGAJACKPOT MANIA | SUPERFUN GAMING CORP. | ROOM A | 3-REEL SLOT |
| D-000003 | WILD 8'S POKER | GREAT POKER SYSTEMS, INC. | ROOM B | VIDEO POKER |
| ○○○ | ○○○ | ○○○ | ○○○ | ○○○ |
| D-009999 | BLACKJACK - TABLE 15 | TABLETOP GAMING CORP | PIT 4 | BLACKJACK |

| | STANDARD DEVIATION 612 | PAYOUT PRECENTAGE 614 | TOP JACKPOT (CREDITS) 616 | DENOMINATION 618 |
|---|---|---|---|---|
| R600-1 → | 3.134 | 91% | 1,200 | $0.05 |
| R600-2 → | 11.177 | 93% | PROGRESSIVE | $0.25 |
| R600-3 → | 7.018 | 92.7% | 1,000 | $1.00 |
| | ○○○ | | | ○○○ |
| R600-4 → | 2.375 | N/A | N/A | $15.00 MINIMUM BET |

FIG. 6B

| GAMING DEVICE IDENTIFIER 802 | GAMING DEVICE TYPE IDENTIFIER 804 | DEVICE STATUS 806 |
|---|---|---|
| GD-000001 | DT-000001 | IN USE |
| GD-000002 | DT-000001 | NOT IN USE |
| GD-000003 | DT-000001 | IN USE |
| ... | ... | ... |
| GD-N | DT-00000N | NOT IN USE |

FIG. 8

| CONTRACT RULE IDENTIFIER 902 | CONTRACT TERM BOUNDRIES 904 | RESULT 906 | RULE STATUS 910 |
|---|---|---|---|
| R-001 | REFUND RATE > 75%, CONTRACT FEE < $10 AND CONTRACT PERIOD < 1 HOUR | DO NOT PROVIDE THE GAMING CONTRACT | ENABLED |
| R-002 | MINIMUM RATE OF PLAY < 300 GAME PLAYS PER HOUR | DO NOT PROVIDE THE GAMING CONTRACT | ENABLED |
| R-003 | CONTRACT PERIOD > 24 HOURS | DO NOT PROVIDE THE GAMING CONTRACT | ENABLED |
| ○○○ | | | ○○○ |
| R-00N | REFUND RATE > 100% | DO NOT PROVIDE THE GAMING CONTRACT | DISABLED |

FIG. 9

|  | CONTRACT TYPE IDENTIFIER 1002 | CONTRACT PRICE 1004 | CONTRACT PERIOD 1006 | CONTRACT BENEFIT 1008 | COMPLIANCE REQUIREMENTS 1010 |
|---|---|---|---|---|---|
| R1000-1 | CT-01234 | $20.00 | 500 GAME PLAYS | NO PAYMENT FOR GAME PLAYS, BEYOND CONTRACT PRICE; BALANCE CAN GO NEGATIVE | ONLY FOR "DOUBLE GEMS JACKPOT" GAME |
| R1000-2 | CT-24516 | $5.00 | 2 HOURS | REFUND OF 75% OF LOSSES IF LOSSES EXCEED $50.00 | MAX. WAGER; MIN. 500 GAME PLAYS COMPLETE; VIDEO POKER ONLY |
| ⋮ | ⋮ | ⋮ | ⋮ |  |  |
| R1000-4 | CT-90777 | $30.00 | 200 GAME PLAYS OR LOSSES ≥ $200.00 | REFUND 100% OF LOSSES | RATE OF PLAY ≥ 300 GAME PLAYS PER HOUR; MAX. WAGER |

FIG. 10

| CONTRACT IDENTIFIER 1102 | PLAYER IDENTIFIER 1104 | CONTRACT PERIOD 1106 | REFUND RATE 1108 | CONTRACT FEE 1110 |
|---|---|---|---|---|
| C-000001 | P-000927 | 6 HOURS | 100% | $.01 PER $.25 WAGER |
| C-000002 | P-000763 | 10,000 GAME PLAYS | 50% | - |
| C-000003 | P-000165 | 9 A.M. - 3 P.M. | 100% | $40 |
| ○○○ | ○○○ | ○○○ | | ○○○ |
| C-00000N | P-001440 | 2 HOURS | 50% | $30 |

| PLAY REQUIRE-MENT 1112 | PERIOD REMAINING 1114 | TOTAL WAGER 1116 | TOTAL PAYOUT 1118 | TOTAL LOSS 1120 |
|---|---|---|---|---|
| 400 GAME PLAYS/HOUR | 2 HOURS, 34 MINUTES | $395.50 | $181.75 | $213.75 |
| MIN $.25 PER GAME PLAY | 2,231 GAME PLAYS | $1,023.25 | $867.50 | $155.75 |
| 500 GAME PLAYS/HOUR | 5 HOURS, 50 MINUTES | $11.50 | $4.50 | $7.00 |
| ○○○ | ○○○ | ○○○ | | ○○○ |
| 400 GAME PLAYS/HOUR | 11 MINUTES | $278.65 | $210.00 | $68.65 |

FACILITATING PLAY OF A GAMING DEVICE IN ACCORDANCE WITH A CONTRACT

CROSS-REFERENCE TO RELATED APPLICATIONS

This application is a continuation-in-part that claims priority and benefit under 35 U.S.C. §120 to commonly owned, co-pending International Application No. PCT/US2005/028383 entitled "SYSTEMS, METHODS AND APPARATUS FOR FACILITATING PLAY OF A GAMING DEVICE IN ACCORDANCE WITH A CONTRACT", and filed on Aug. 10, 2005, which itself claims priority to U.S. Provisional Application Ser. No. 60/600,211 entitled "SYSTEMS, METHODS AND APPARATUS FOR ADMINISTERING GAMING CONTRACTS", filed on Aug. 10, 2004, and U.S. Provisional Application Ser. No. 60/600,646 entitled "SYSTEMS, METHODS AND APPARATUS FOR MONITORING GAMING CONTRACTS", filed on Aug. 11, 2004, the entirety of each of which is hereby incorporated by reference herein.

BRIEF DESCRIPTION OF THE DRAWINGS

Various embodiments of the present invention are described herein with reference to the accompanying drawings. In the drawings, like reference numerals generally indicate identical or functionally similar elements. The leftmost digit(s) of a reference numeral typically identifies the figure in which the reference numeral appears. As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein. A brief description of the drawings follows:

FIGS. 4A and 4B are tables illustrating an example player database, in accordance with one or more embodiments of the present invention.

FIG. 5 is a table illustrating an example player eligibility rules database, in accordance with one or more embodiments of the present invention.

FIGS. 6A and 6B are tables illustrating an example gaming device database, in accordance with one or more embodiments of the present invention.

FIG. 8 is a table illustrating an example gaming device status database, in accordance with one or more embodiments of the present invention.

FIG. 9 is a table illustrating an example contract customization rules database, in accordance with one or more embodiments of the present invention.

FIG. 10 is a table illustrating an example available contracts database, in accordance with one or more embodiments of the present invention.

FIG. 11 is a table illustrating an example purchased contracts database, in accordance with one or more embodiments of the present invention.

DETAILED DESCRIPTION

I. Introduction

Figure 1:
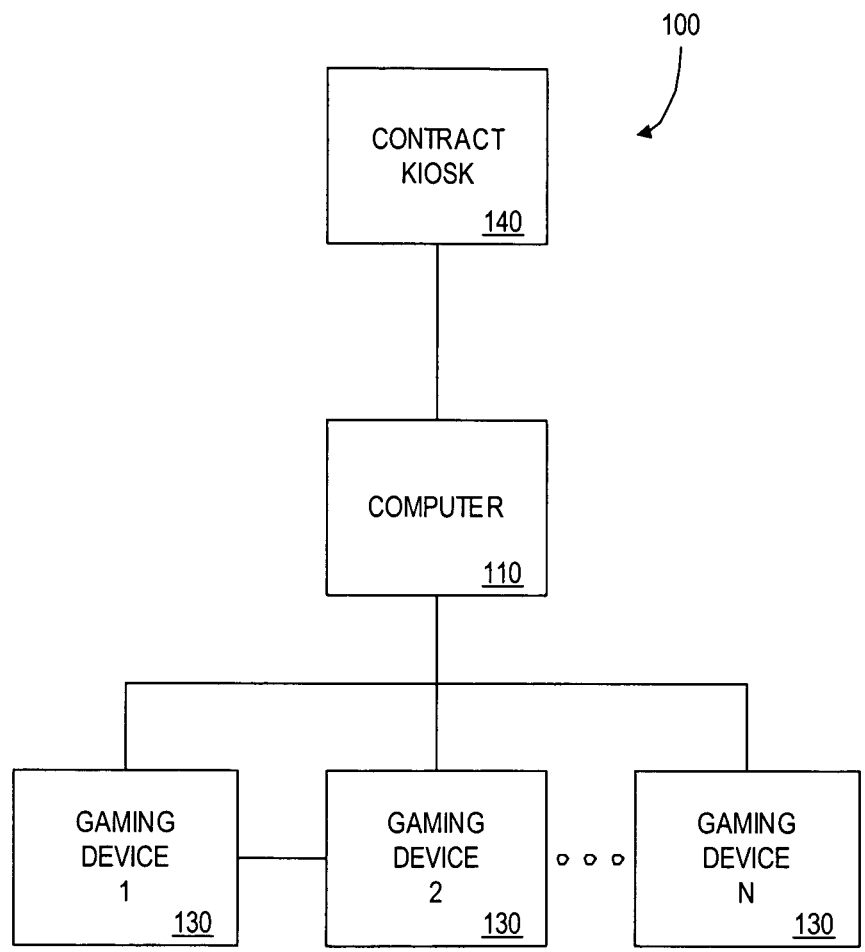
FIG. 1 is a block diagram of an example system, according to one or more embodiments of the present invention.

In accordance with one embodiment, a method provides for determining that play of a gaming device qualifies for coverage under a contract previously purchased, monitoring the play, and reconciling the contract based on the monitored play.

Some embodiments may comprise, for example, determining an identifier associated with a player of a gaming device, determining information indicative of historical game play of the player, determining information indicative of a game play contract associated with the player, and determining, based at least upon the information indicative of the historical game play of the player and the information indicative of the game play contract associated with the player, whether the player qualifies for a benefit pursuant to the game play contract.

In some embodiments, a method may comprise receiving an indication of a gaming contract insurance claim associated with a gaming contract of a player, determining information indicative of a subset of historical game play of the player, and determining whether to provide a benefit to the player pursuant to the gaming contract.

In one or more embodiments, the determination that play of a gaming device qualifies for coverage under a contract previously purchased may be based on receiving, from a gaming device, an indication that an identifier that is associated with the contract has been inserted into or otherwise received by the gaming device. The determination may further comprise determining terms of the contract, and determining that play of the gaming device satisfies the terms.

In one or more embodiments, reconciling the contract may comprise determining whether the contract has been complied with and providing a benefit to a player who purchased the contract only if the contract has been complied with. The benefit may comprise, for example, a refund of at least a portion of losses incurred by the player during a period of time defined by the contract, a refund of at least a portion of wagers posted by the player during a period of time defined by the contract, and/or allowing a player to continue playing a gaming device once a credit meter balance of the gaming device has been depleted.

In one or more embodiments, determining that a contract has been complied with may comprise determining that an amount of play defined by the contract has been completed in a satisfactory manner. This may comprise, for example, one or more of: (i) determining that the amount of play is not less than a minimum amount of play; (ii) determining that the amount of play is not more than a maximum amount of play; (iii) determining that the amount of play equals a specified amount of play; (iv) determining that the play was conducted on a gaming device approved for play under the contract; (v) determining that the play was conducted within a period of time defined by the contract; (vi) determining that the play required a minimum sum of wagers; (vii) determining that the play was conducted at a minimum required rate; and (viii) determining that a minimum wager amount was posted for at least one game play encompassed by the play.

In accordance with one or more embodiments, a method provides for receiving a contract initiation signal from a gaming device; storing data associated with game play of the gaming device until one of a contract play termination signal is received and/or an end of a contract period is determined; and providing a benefit defined by the contract based on whether the data indicates a compliance with terms of the contract.

In one embodiment, the benefit may comprise a refund of at least a portion of losses incurred by a player associated with the contract during a period of time defined by the contract.

In another embodiment, the benefit may comprise a refund of at least a portion of wagers posted by a player associated with the contract during a period of time defined by the contract.

In yet another embodiment, the benefit may comprise authorizing the gaming device to allow play of the gaming device once a credit meter balance of the gaming device has been depleted below a predefined level. The level may be zero, a number of credits insufficient to post a wager for a game play at the gaming device, a number of credits insufficient to post a maximum allowable wager for a game play at the gaming device, and/or a number of credits defined by a casino, a player, a gaming device manufacturer or another entity. In one embodiment, authorizing the gaming device to allow play of the gaming device comprises authorizing the gaming device to allow the credit meter balance to be a negative number. In another embodiment, authorizing the gaming device to allow play of the gaming device comprises authorizing the gaming device to add credits to the credit meter balance without requiring payment therefore from a player playing the gaming device.

In one or more embodiments, a system is provided. The system comprises a computing device operable to communicate with a plurality of gaming devices (e.g., a server of a casino), each of the gaming devices operable to facilitate a wagering game. The computing device is further operable to: (i) determine an initiation of a game play at one of the gaming devices; (ii) determine an identifier of a contract associated with the game play, wherein the contract has been entered into by a player prior to the initiation of the game play, and wherein the contract defines a contract period and a benefit to which the player is entitled if the terms of the contract have been satisfied; (iii) determine data associated with the game play; and (iv) determine whether the player is entitled to the benefit based on the data and the terms.

In one embodiment, the system further comprises the plurality of gaming devices. In one embodiment, the contract comprises a contract in exchange for which the player provided payment.

In one embodiment, the computing device is further operable to store the data in association with data from at least one other game play, thereby storing data indicative of a plurality of game plays; and determine whether the player is entitled to the benefit based on the data indicative of the plurality of game plays.

In one embodiment, the computing device is further operable to determine whether the game play qualifies as a game play that is covered under the terms of a contract.

In one embodiment, the computing device is further operable to store the data associated with the game play in association with the identifier only if the game play qualifies as a game play that is covered under the terms of a contract.

In one embodiment, the computing device is further operable to identify the contract based on an identifier provided by the player to the gaming device. The identifier may comprise, for example, an identifier that uniquely identifies the player and/or an identifier that uniquely identifies the contract.

In one embodiment, the computing device may further be operable to provide the benefit to the player. Providing the benefit may comprise, for example, causing a gaming device of the plurality of gaming devices to output the benefit to the player and/or authorizing a casino employee to provide the benefit to the player. The benefit may comprise a monetary payment (e.g., a refund of at least a portion of losses incurred by the player during the contract period).

In one embodiment, the computing device may further be operable to receive a request from the player for the benefit and determine, in response to the request, whether the player is entitled to the benefit based on the data and the terms.

In one embodiment, the computing device is further operable to determine the benefit based on the data and the terms of the contract. For example, the computing device may be operable to determine a value of the benefit based on the data and the terms of the contract.

In one embodiment, the computing device may further be operable to authorize a sale of the contract to the player. For example, in some embodiments only certain players (e.g., players associated with a specified status or other characteristic such as being a hotel guest, players associated with one or more specified gambling history characteristics, players associated with a specified history of previous contract purchases and/or contract compliance, etc) may be eligible to purchase any contract and/or to purchase a particular contract. In another embodiment, a certain contract may only be available if specified conditions are satisfied (e.g., a level of gaming device business on the casino floor is satisfactory, a general level of business of the casino is satisfactory, if the contract is flagged as available in a database of available contracts, etc.).

In one embodiment, the benefit is provided to a player at an end of a period defined by the contract, provided the player has complied with the terms of the contract. For example, a refund of at least a portion of player losses incurred during the period of time may be provided at the end of the period of time. In another embodiment, the benefit is provided to a player during a period of time defined by the contract, provided the player is currently complying with the terms of the contract. For example, a player may be allowed to continue playing a gaming device even if the credit meter balance has been depleted below a predefined level if the player is complying with the terms of the contract (e.g., the player is playing at a specified minimum rate of play, the player is playing an eligible gaming device, the player is playing during an eligible time of day, etc.).

In accordance with one aspect of the invention(s) described herein, disclosed herein are apparatus, systems and methods for administering a gaming contract (e.g., an agreement between a player and a casino establishment relating to game play within the casino). In one or more embodiments, a computer of the present invention (e.g., a "player tracking" and/or "slot accounting" controller in communication with one or more gaming devices) may be configured to (i) provide a gaming contract associated with a contract identifier (e.g., activate a gaming contract and provide a player a "contract card," which may be similar in appearance to such an object as a player tracking card), (ii) receive a contract initiation signal (e.g., detect the insertion of the contract card into an eligible gaming device), (iii) track game play data associated with the contract identifier (e.g., track an amount wagered and/or an amount lost by the gaming device player), and (iv) reconcile the contract based at least on the game play data (e.g., reimburse the player for an amount wagered and/or an amount lost). Such a system may be advantageous in that gaming contracts may be administered without requiring substantial gaming device reconfigurations (e.g., a slot machine and/or various components thereof need not be programmed or otherwise configured to administer contracts, track game play, etc.).

Systems, apparatus and computer program products are provided for carrying out the above-described embodiments and numerous other embodiments of the present invention. Each computer program product described herein may be carried by a medium readable by a computer (e.g., a carrier wave signal, a floppy disk, a hard drive, a random access memory, etc.).

Thus, in accordance with one aspect of the present invention, play of a gaming device may be made more beneficial and/or convenient to a player with the aid of a contract that a player may purchase. Many different types of contracts are described herein and in the related applications listed herein. Any and all of these contracts may be implemented via the systems and apparatus described herein. Further, in accordance with another aspect of the present invention, play of one or more gaming devices may be monitored by a computing device (e.g., a server of a casino) to determine whether a player who purchased a contract has or is complying with the terms of the contract and is thus entitled to a benefit defined by the contract. In this manner, the benefits of a contract may be realized by players without necessarily requiring any or substantial reconfiguration of existing gaming device, as explained herein.

With these and other advantages and features of the invention that will become hereinafter apparent, the nature of the invention may be more clearly understood by reference to the following detailed description of the invention, to the appended claims and to the several drawings attached herein.

Many other advantageous features may be provided in accordance with a contract executable via a gaming device, as described below. At least some of the novel methods and apparatus for facilitating execution of a contract via a gaming device provided herein overcome one or more drawbacks of the prior art.

II. Terminology

The terms "controller" "computing device" and "central controller" are used interchangeably herein and refer, unless specified otherwise, to an electronic device (e.g., a computer) that communicates with one or more peripheral devices (e.g., a card reader affixed to a gaming device), kiosks (e.g., a "contract kiosk" as described further herein), gaming devices, and/or any other devices described herein (e.g., computer devices operated by casino personnel). For example a controller may comprise a casino server operable to communicate with a plurality of gaming devices and/or its peripheral devices. In some embodiments, a controller may perform a variety of "player tracking" and/or "slot accounting" functions. Thus, a controller in communication with a gaming device may be configured to, among other things, (i) identify players (e.g., by detecting the insertion of a player tracking card), (ii) detect gaming contract initiation signals (e.g., by detecting the insertion of a "contract card"), and/or (iii) monitor and/or record game play data associated with players or gaming contracts (e.g., by measuring statistics such as wager amounts, payout amounts, win/loss amounts, and so on). Thus, the controller may contain or otherwise be configured to read data from and/or write data to one or more databases or other memory mechanisms regarding data associated with a particular player, gaming contract and/or gaming session. In some embodiments, a controller may function to, for example, (i) control the activities of a gaming device and/or its peripheral device, (ii) authorize an activity and/or event at a gaming device, (iii) direct a gaming device and/or its peripheral device to perform a function, (iv) monitor activity at a gaming device and/or its peripheral device, and/or (v) interrogate a gaming device and/or its peripheral device for information.

The term "game" means, unless specified otherwise, a wagering activity whereby a player posts consideration, usually monetary in form, in exchange for a chance at winning a payout. The definition is intended to include basic games and bonus games.

The terms "gaming device", "gaming device", "gambling device" and/or "gaming machine" are used interchangeably herein and refer, unless specified otherwise, to any electrical, mechanical or electro-mechanical device that, in a manner well known in the art, accepts a wager, determines an outcome and determines winnings based on the outcome. The outcome may be randomly generated, may be generated through a combination of randomness and player skill, or may be generated entirely through player skill. Gaming devices may include slot machines (both video and mechanical reels), video poker machines, video blackjack machines, video roulette machines, video keno machines, video bingo machines, pachinko machines, video lottery terminals, handheld gaming devices, and the like. In one or more embodiments, a gaming device may comprise and may also include a computer, personal digital assistant, or cell phone that is communication with an on-line casino (e.g., a gaming website). In one embodiment, a gaming device comprises a handheld gaming device, which may communicate with one or more other devices in a wireless manner.

The terms "game play", "play", "handle pull" and "spin", when used as a noun, are used interchangeably herein and refer, unless specified otherwise, to a single play of a game at a gaming device that generates a singular, corresponding outcome (e.g., a player pulls the handle of a slot machine and the reels resolve to "bar-lemon-plum"). In some embodiments, a game play may comprise a bonus round. It should be noted that, in some instances, the term "game play" may refer to any number of game plays. In one embodiment, a game play includes a sequence of events in which (i) a wager is initiated or made (either by a player or automatically by a gaming device), (ii) an outcome is provided (e.g., a random number and/or a set of reel indicia or other indicia is provided) and (iii) the wager is disposed of and/or a payout is provided in accordance with the outcome (the payout may be made, for example, by applying a credit to a credit balance).

As used herein, a "winning game play" is a game play in which a winning outcome is produced (e.g., a payout or other prize is provided to a player as a result of the outcome).

As used herein, a "losing game play" is a game play in which a winning outcome is not produced (e.g., a payout or other prize is not provided to a player as a result of the outcome and a player loses the wager posted for the game play).

The term "game play data" means, unless specified otherwise, to data and/or information associated with one or more game plays. In some embodiments, a game play data may be associated with (i) a player (e.g., as uniquely identifier by a player identifier, such as "P-000001"), and/or (ii) a gaming contract (e.g., as uniquely identified by a gaming contract identifier, such as "GC-000001"). Game play data may comprise various statistics related to game play, including but not limited to (i) wager data (e.g., a monetary amount wagered by a player in association with one or more game plays), (ii) payout data (e.g., a monetary amount won by a player in association with one or more game plays), (iii) win/loss data (e.g., a monetary result of one or more game plays, which may be determined by subtracting a wager amount from a payout amount), (iv) payline data (e.g., a number of slot machine paylines activated by a player in association with one or more game plays), (v) time data (e.g., an amount of time elapsed between and/or during one or more game plays), and so on. Game play data may also comprise an indication of a number of game plays initiated in association with a particular player and/or gaming contract (e.g., player "P-000001" has played one thousand two hundred and thirty-eight (1,238) handle pulls).

The terms "game session", "gaming session", "session", and "play session" are used interchangeably herein and refer, unless specified otherwise, to a gambling event with a beginning and end that typically encompasses a plurality of game plays. The end of the session may be determined voluntarily (in which the player elects to stop play) or involuntarily (in which the gaming device and/or controller terminates play). In some embodiments, a session may begin when a player provides an identifier (e.g., a player identifier and/or a contract identifier), and end upon an occurrence of a session ending event. A session ending event may comprise, for example, (i) an occurrence of an end of a period of time defined by a contract, (ii) a signal or indication from a player (e.g., the player's removal of a player tracking card and/or a contract card from a gaming device), (iii) a completion of terms of a contract, and/or a reconciliation of a contract. In some embodiments, a player may pay (e.g., pre-pay prior to initiating the game session) a fixed price for a game session. The payment may be in exchange for, for example, (i) a predetermined number of game plays, or (ii) a period of time during which an indeterminate number of game plays may ensue. Apparatus and methods which, among other things, permit and enable various ways of providing gaming contracts and game sessions such as prepaid or flat-rate play sessions, and which are appropriate for use in accordance with the present invention are disclosed in U.S. Pat. No. 6,077,163, filed Jun. 23, 1997, entitled "GAMING DEVICE FOR A FLAT RATE PLAY SESSION AND METHOD OF OPERATING SAME," as well as pending U.S. patent application Ser. No. 10/001,089, filed Nov. 2, 2001, entitled "GAME MACHINE FOR A FLAT RATE PLAY SESSION AND METHOD OF OPERATING SAME", the contractual and/or flat-rate play concepts and descriptions of each being hereby incorporated by reference herein.

The terms "gaming contract" and "contract" are used interchangeably herein and refer, unless specified otherwise, to an agreement between a player and another entity (e.g., a casino or other gaming establishment) relating to game play that may be conducted at one or more gaming devices and/or table games. In one embodiment, a contract has an associated price for which the player may purchase the contract and defines a benefit to be provided to the player. The contract may further define one or more terms with which the player must comply in order to be provided with the defined benefit. As explained in more detail below, the benefit may be provided at the end of a period of time defined by the contract. For example, a benefit may comprise a monetary amount that is a refund of at least a portion of losses incurred by the player during the period of time. In another embodiment, the benefit may be provided during a period of time defined by the contract (e.g., once, a plurality of times, continuously, periodically, in response to a triggering condition, or on another basis).

For example, a benefit may comprise access to a feature of a gaming device and/or an ability to continue playing the gaming device even though a credit meter balance of the gaming device has been depleted below a predetermined level. In some embodiments, a contract period may comprise (i) a predetermined number of game plays, or (ii) an indeterminate number of game plays to be initiated within a predetermined period of time (e.g., one hour). Further, in some embodiments, a gaming contract may be provided only if a player (i) pays or agrees to pay a premium, fee or surcharge, which may be associated with one or more game plays and/or wager amounts (e.g., an incremental one cent (1¢) fee is assessed for every twenty-five cents (25¢) wagered by the player; the player pays a flat thirty dollar ($30) premium for two hours of insured play), and/or (ii) agrees to a predetermined contract period (e.g., twelve (12) hours of slot play; six thousand (6,000) handle pulls, twenty-five thousand (25,000) lines played, etc.). One example of a contract is an insurance contract. An insurance contract is described in more detail below.

The terms "gaming contract data" and "contract data" are used interchangeably herein and refer, unless specified otherwise, to information or data associated with or pertaining to a gaming contract, including but not limited to (i) game play data associated with the contract, (ii) a refund rate associated with the contract, (iii) contract fees associated with the contract, (iv) a period of time associated with the contract, and so on.

The terms "gaming contract play" and "contract play" are used interchangeably herein and refer, unless specified otherwise, to one or more game plays which result from a contract, are covered under the terms of a contract, qualify for inclusion under a contract, or are otherwise associated with a contract (e.g., all game plays initiated by a player during a period of time defined by a contract).

The term "player tracking card" refers, unless specified otherwise, to an instrument issued by a casino and useful in uniquely identifying a player and/or tracking gambling or other activity of the player. Most casinos issue plastic cards (resembling frequent shopper cards) to players as a way of identifying the player at a slot machine or table game. As is well known in the art, such cards typically have encoded thereon (in machine-readable and/or human readable form) a player identifier (e.g., a six digit number) which uniquely identifies the player (e.g., because the number is associated with a record in a player database that includes corresponding player information). The player inserts the card into a reader device affixed to a gaming device (e.g., which may be an example of a peripheral device), and the player identifier is read from the card, most often magnetically or optically. From the player identifier, the corresponding player information may in turn be read from a database, typically via a network connection between the reader device and a device hosting the database (e.g., a controller).

As described in more detail below, in some embodiments a player establishing a gaming contract may receive a "contract card". In some embodiments, a contract card may have a substantially similar function and appearance as to that of a player tracking card, though a contract card may alternately or additionally be associated with a unique contract identifier (e.g., such that data may be read from and/or written to a database regarding the contract and/or game play data associated therewith). In some embodiments a player tracking card may comprise a contract card once a player established a contract.

The term "rate of play" as used herein, unless specified otherwise, refers to the number of game plays performed per unit of time. For example, a rate of twenty (20) game plays performed in five minutes (5-min) is slower than a rate of twenty-five (25) game plays performed in five minutes (5-min).

The term "depletion of a credit meter balance" as used herein, unless specified otherwise, refers to a reduction of a credit meter balance below a predetermined threshold. For example, depletion of a credit meter balance may refer to the credit meter balance reaching (i) zero credits, (ii) a negative amount of credits (i.e., an amount less than zero), (iii) an amount of credits that is less than a wager amount that is applicable per game play; (iv) an amount of credits that is less than a maximum allowable wager amount per game play; and/or (v) another amount. "Depletion of a credit meter balance" may also include reduction of the credit balance to or below a predetermined level that may have been set by the player, by the gaming device, by the casino, or by the controller.

As used herein, unless specified otherwise, the term "player" includes one person or a group of persons who place wagers on the operation of a gaming device. Such wagers may be made in connection with a contract.

As used herein, unless specified otherwise, the term "payout" includes an amount greater than zero that is credited to a credit balance of a gaming device in response to a winning game play and/or a prize provided to a player as a result of a game play.

As used herein, unless specified otherwise, the term "inputting" includes any manner of providing an input, a signal, a stimulus, an indication, data or information to a device, and includes actuating an actuatable portion of the device and/or transmitting a signal to the device from another device.

A gaming machine should be understood to "receive" (as that term is used herein and in the appended claims) an input, a signal, data or information upon actuation of an actuatable portion of the gaming machine (e.g., a push button, a keypad, a keyboard, a region of a touch screen) and/or upon receipt of a signal generated by a device exterior to the gaming machine.

III. System Architecture

Referring now to FIG. 1, an example embodiment 100 of a system in accordance with one or more embodiments is depicted in block diagram form. Embodiment 100 is referred to as system 100 herein. The present invention can be configured to work as a system 100 in a network environment including a computer 110 (e.g., a slot server of a casino) that is in communication, via a communications network, with one or more gaming devices 130 (e.g., slot machines, video poker machines, etc.) and with one or more contract kiosks 140. A kiosk 140 may comprise, for example, a stand-alone kiosk or computing device located at a casino-staffed personnel counter via which a player may view available contracts, purchase a contract, and/or receive a benefit for a contract previously entered into. The computer 110 may communicate with any and all of the gaming devices 130 and any and all of the contract kiosks 140 directly or indirectly, via a wired or wireless medium such as the Internet, LAN, WAN or Ethernet, Token Ring, or via any appropriate communications means or combination of communications means. Each of the gaming devices 130 may comprise computers, such as those based on the Intel® Pentium® processor, that are adapted to communicate with the computer 110. Any number and type of devices 130 may be in communication with the computer 110. Similarly, any number and type of contract kiosks 140 may be in communication with the computer 110.

In some embodiments, a contract kiosk 140 may be configured to execute or assist in the execution of various processes described herein, or portions thereof. In some embodiments, a kiosk may comprise a processor and a memory as described. A kiosk may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk may comprise many of the features and components of a gaming device, though the kiosk itself may not necessarily be configured to enable gambling activity as a primary function. A kiosk may communicate with any or all of (i) a controller operable to communicate with one or more gaming devices, (ii) a gaming device, (iii) an inventory/reservation system of a casino-maintained property (e.g., a hotel), (iv) casino personnel devices, (v) merchant POS terminals, and so on. A number of contract kiosks 140 may be stationed within casino premises (e.g., at various locations on a slot floor, in a casino hotel lobby, near a swimming pool operated by a casino, etc.). In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cashless gaming tickets, player tracking cards, contract cards, smart cards, etc.), (iii) outputting a menu of available contracts and detailed information of each available contract, (iv) determining a player's eligibility to purchase a contract, (v) facilitating a player's purchase of a contract (e.g., including receiving payment therefore), (vi) receiving data indicative of whether a player has complied with, or is complying with, terms of a contract previously purchased by the player (e.g., the data may be received from a gaming device, from computer 110, from a player device, from a contract card and/or player tracking card comprising a memory (e.g., a "smart card"), and/or from a contract server), and/or (vii) any other process described herein, or portion thereof. In some embodiments, a contract kiosk 140 may be configured to, among other things, (i) provide a gaming contract associated with a gaming contract identifier, (ii) reconcile contracts based on contract data (e.g., provide refunds), and/or (iii) output contract data (e.g., provide contract status information). A contract kiosk 140 may be operable to read from and/or write to one or more databases described herein. The memory of a contract kiosk 140 may store a program for executing such processes, or portions thereof.

It should be noted that, in accordance with one embodiment, one or more of the contract kiosks 140 may be in communication with a server or controller different from computer 110. For example, a contract server may be operable to store information about available and/or purchased contracts, authorize a contract kiosk 140 to sell a contract to a player, authorize a contract kiosk 140 to provide a benefit to a player, receive data from a casino employee regarding a contract, etc. In such an embodiment, computer 110 may communicate with contract kiosks 140 via the contract server. Of course, in other embodiments that include a contract kiosk, computer 110 may still communicate with contract kiosks 140 directly (e.g., in addition to, or in lieu of, communicating with the contract server).

Communication between the devices 130, 140 and the computer 110, among the devices 130, and among the devices 140 may be direct or indirect, such as over the Internet through a Web site maintained by computer on a remote server or over an on-line data network including commercial on-line service providers, bulletin board systems and the like. In yet other embodiments, the gaming devices 130 and/or the contract kiosks 140 may communicate with one another and/or the computer 110 over RF, cable TV, satellite links and the like.

Some, but not all, possible communication networks that may comprise the network or be otherwise part of the system 100 include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth®, and TCP/IP. Communication may be encrypted to ensure privacy and prevent fraud in any of a variety of ways well known in the art.

A variety of communications protocols may be part of the system 100 or another system operable to facilitate the embodiments described herein, including but not limited to: Ethernet (or IEEE 802.3), SAP, SAS™, SuperSAS™, ATP, Bluetooth®, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

In some embodiments, a computer 110 may not be necessary and/or preferred. For example, one or more embodiments may be practiced on a stand-alone gaming device 130, a gaming device 130 in communication only with one or more other gaming devices 130, and/or a gaming device 130 in communication with one or more contract kiosks 140 (i.e., without a computer 110). In such embodiments, any functions described as performed by the computer 110 or data described as stored on the computer 110 may instead be performed by or stored on one or more gaming devices 130 and/or by one or more contract kiosks 140.

In some embodiments, the contract kiosks 140 may not be necessary and/or preferred. For example, one or more embodiments may be practiced on a stand-alone gaming device 130, a gaming device 130 in communication only with one or more other gaming devices 130, and/or a gaming device 130 in communication with computer 110 (i.e. without any contract kiosk 140). In such embodiments, any functions described as performed by a kiosk 140 or data described as stored on a kiosk 140 may instead be performed by or stored on one or more gaming devices 130 and/or by computer 110.

In one or more embodiments, system 100 may include additional devices, such as one or more casino personnel devices, one or more additional servers (e.g., a contract server, as described above, a hotel reservation server, and/or an inventory management server). One or more point-of-sale terminals associated with one or more merchants may also be included in system 100.

In some embodiments, various casino employees may be equipped with or otherwise utilize one or more casino personnel devices, such as Personal Digital Assistant (PDA) devices or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device, server, kiosk, peripheral device, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value; a representative "swipes" a contract card to determine whether or not a player is due a benefit), and/or (iii) execute or assist in the execution of various other processes described herein. For example, a casino employee may utilize a casino personnel device to (i) obtain, display and/or view information about available contracts, (ii) sell a contract to a player, (iii) determine a player's eligibility for a contract, (iv) determine a player's compliance with a previously purchased contract, and/or (v) provide, or authorize the provision of, a benefit defined by a contract to a player associated with the contract. In one or more embodiments, a casino personnel device may be operable to read data from and/or write data to one or more of the databases described herein. A memory of a casino personnel device may store a program for executing processes described herein, or portions thereof.

In some embodiments, various merchants (e.g., shops, restaurants, etc.) may utilize Point-Of-Sale (POS) computer terminals to facilitate various processes of the present invention. For example, in some embodiments, a player may receive a benefit defined by a contract in the form of a cashless gaming ticket or other ticket, voucher or instrument redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a casino server, (ii) a gaming device, (iii) an inventory/reservation system (e.g., a computer terminal at a theatre communicates with an inventory database to determine a number of unsold seats for a certain event), (iv) a contract kiosk, and so on.

In some embodiments of the present invention, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

IV. Device Architecture

A. Controller

Figure 2:
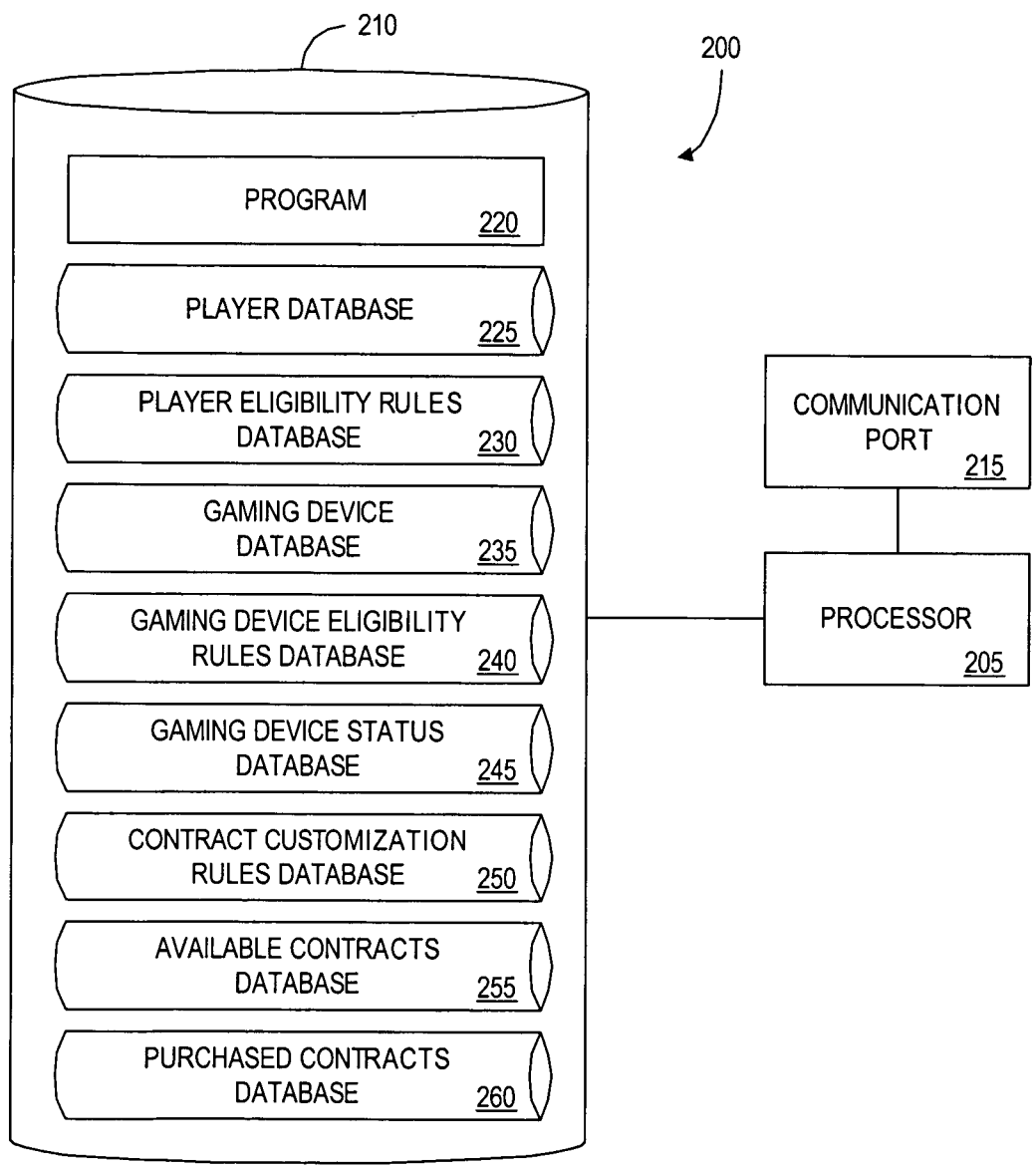
FIG. 2 is a block diagram of a server operable to communicate with one or more gaming devices, according to one or more embodiments of the present invention.

Referring now to FIG. 2, illustrated therein is an embodiment 200 of a controller operable to communicate with at least one gaming device (e.g., computer 110). Embodiment 200 is referred to as computer 200 herein. The computer 200 may be implemented as a system controller, a dedicated hardware circuit, an appropriately programmed general-purpose computer, or any other equivalent electronic, mechanical or electro-mechanical device. The computer 200 may comprise, for example, a server computer operable to communicate with one or more client devices, such as one or more gaming devices, one or more kiosks, one or more peripheral devices, and/or one or more casino personnel devices. The computer 200 may be operative to manage the system 100 execute some or all of the methods described herein.

In operation, the computer 200 may function under the control of a casino, another merchant, or other entity that may also control use of the gaming devices 130 and/or contract kiosks 140. For example, the computer 200 may be a slot server in a casino. In some embodiments, the computer 200 and a slot server may be different devices. In some embodiments, the computer 200 may comprise a plurality of computers operating together. In some embodiments, the computer 200 and a contract server may be the same device.

The computer 200 comprises a processor 205, such as one or more Intel® Pentium® processors. The processor 205 is in communication with a memory 210 and a communications port 215 (e.g., for communicating with one or more other devices). The memory 210 may comprise an appropriate combination of magnetic, optical and/or semiconductor memory, and may include, for example, Random Access Memory (RAM), Read-Only Memory (ROM), a compact disc and/or a hard disk. The processor 205 and the memory 210 may each be, for example: (i) located entirely within a single computer or other device; or (ii) connected to each other by a remote communication medium, such as a serial port cable, telephone line or radio frequency transceiver. In one embodiment, the computer 200 may comprise one or more devices that are connected to a remote server computer for maintaining databases.

The memory 210 stores a program 220 for controlling the processor 205. The processor 205 performs instructions of the program 220, and thereby operates in accordance with the present invention, and particularly in accordance with the methods described in detail herein. The program 220 may be stored in a compressed, un-compiled and/or encrypted format. The program 220 furthermore includes program elements that may be necessary, such as an operating system, a database management system and "device drivers" for allowing the processor 205 to interface with computer peripheral devices. Appropriate program elements are known to those skilled in the art, and need not be described in detail herein. The program 220 may include computer program code that allows the computer 200 to employ the communications port 215 to communicate with a gaming device (e.g., gaming device 300, described below) in order to, for example:

1. track gambling activity performed at the gaming device;
2. track gaming activities of individual players;
3. track gaming session activities at the gaming device;
4. determine whether an identifier identifying a contract has been provided to the gaming device;
5. determine whether current play of the gaming device is covered under a contract;
6. determine whether the gaming device is eligible for contract play;
7. instruct the gaming device to perform one or more functions (e.g., output a message and/or provide a benefit to a player);
8. determine whether play of the gaming device complies with terms of a contract; and/or
9. manage a contract play mode of the gaming device.

According to an embodiment of the present invention, the instructions of the program 220 may be read into a main memory from another computer-readable medium, such from a ROM to RAM. Execution of sequences of the instructions in program 220 causes processor 205 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 210 may also or alternatively store (i) a player database 225; (ii) a player eligibility rules database 230; (iii) a gaming device database 235; (iv) a gaming device eligibility rules database 240; (v) a gaming device status database 245; (vi) a contract customization rules database 250; (vii) an available contracts database 255; and (viii) a purchased contracts database 260. Each of the databases 225 through 260 are described in more detail below.

Although the databases 225 through 260 are described as being stored in a memory of computer 200, in other embodiments some or all of these databases may be partially or wholly stored, in lieu of or in addition to being stored in a memory of computer 200, in a memory of one or more other devices. Such one or more other devices may comprise, for example, one or more peripheral devices, one or more contract kiosks 140, a contract server, one or more gaming devices, a slot server (if different from the computer 200), another device, or a combination thereof. Further, some or all of the data described as being stored in the memory 210 may be partially or wholly stored (in addition to or in lieu of being stored in the memory 210) in a memory of one or more other devices. Such one or more other devices may comprise, for example, one or more peripheral devices, one or more gaming devices, one or more contract kiosks 140, a contract server, a slot server (if different from computer 200), another device, or a combination thereof. In one or more embodiments, memory 210 may store databases in addition to those described herein.

B. Gaming Device

Figure 3:
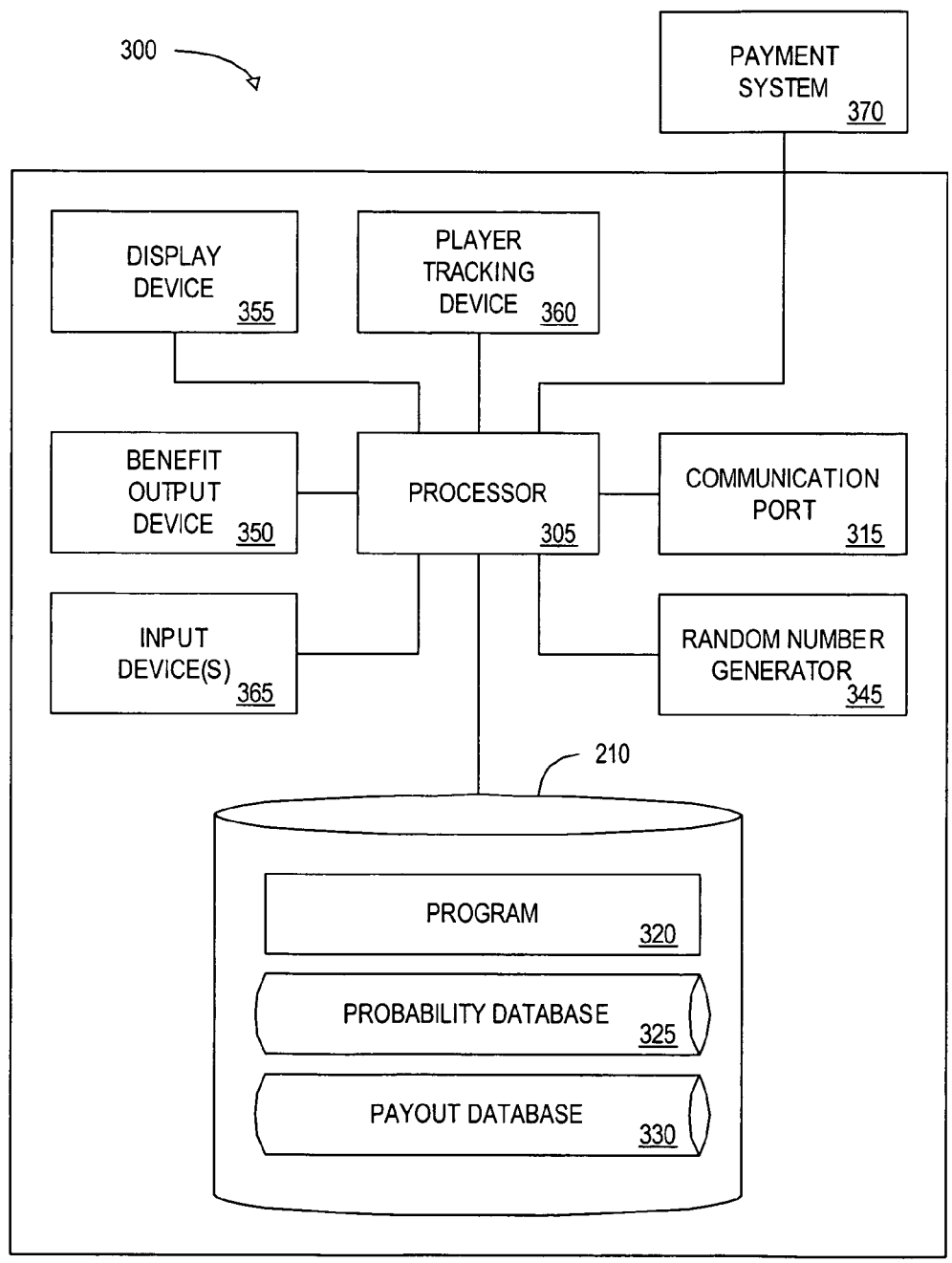
FIG. 3 is a block diagram of an example gaming device, according to one or more embodiments of the present invention.

Referring now to FIG. 3, illustrated therein is a block diagram of an example embodiment 300 of a gaming device (e.g., a gaming device 130) that may be used in accordance with one or more embodiments. Embodiment 300 is referred to herein as gaming device 300.

The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine or a table-top game (e.g., a mechanical or electro-mechanical device may be associated with a table game and be operable by a player and/or a dealer).

In some embodiments, a gaming device 300 may comprise, for example, a personal computer (e.g., which may communicate with an online casino Web site), a telephone (e.g., to communicate with an automated sports book that provides gaming services), and/or a portable handheld gaming device (e.g., a personal digital assistant, Nintendo™ GameBoy® or Sony™ PSP®, a dedicated personal hand-held gaming device provided by a casino, or any combination thereof). In some embodiments, a user device such as a PDA or cell phone may be used in place of, or in addition to, some or all of the gaming device 300 components depicted in FIG. 3. Further, a gaming device 300 may comprise a personal computer or other device operable to communicate with an online casino and facilitate game play at the online casino. In one or more embodiments, the gaming device 300 may comprise a computing device operable to execute software that simulates play of, for example, a reeled (mechanical or video) slot machine game, video poker game, video blackjack game, video keno game, video roulette game, or lottery game. In another embodiment, a gaming device 300 may comprise a hand-held device operable to display the results of a table game, slot machine game, keno game or other game being executed on a casino floor.

It should be noted that not all of the components described herein as being components of gaming device 300 may be necessary and/or preferred for a gaming device operable to implement embodiments described herein. For example, in embodiments in which a gaming device comprises a personal computer operable to access an online casino, a random number generator may not be a component of the gaming device but may rather be a component of a server administering the online casino. In another example, a gaming device that comprises a personal computer may not necessarily include a benefit output device and/or a player-tracking device.

The gaming device 300 comprises a processor 305, such as one or more Intel® Pentium® processors. The processor 305 is in communication with a memory 310 and a communications port 315 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The memory 310 may comprise or include any type of computer-readable medium. The processor 305 and the memory 310 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The memory 310 stores a program 320 for controlling the processor 305. The processor 305 performs instructions of the program 320, and thereby operates in accordance with embodiments of the present invention, and particularly in accordance with the methods described in detail herein. The program 320 may be stored in a compressed, un-compiled and/or encrypted format. The program 320 may furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment described herein, the instructions of the program 320 may be read into a main memory from another computer-readable medium, such as from a ROM to RAM. Execution of sequences of the instructions in program 320 causes processor 305 to perform the process steps described herein. In some embodiments, hard-wired circuitry may be used in place of, or in combination with, software instructions for implementation of the processes of the present invention. Thus, embodiments described herein are not limited to any specific combination of hardware and software.

The memory 310 also stores a plurality of databases, including a probability database 325 and a payout database 330. A probability database may be stored in the memory 310 in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. Such examples, concepts, and descriptions of which are hereby incorporated by reference herein.

A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three-reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player via a benefit output device described herein. Other arrangements of payout databases are possible. For example, the book "Winning At Slot Machines" by Jim Regan (Carol Publishing Group Edition, 1997) illustrates many examples of payout and probability tables and how they may be derived. These concepts and descriptions are hereby incorporated by reference herein.

Additionally, the memory 310 may store (e.g., while a game play covered under a contract is being executed or while a session covered under a contract is being executed), information associated with the contract (e.g., an indication that a current game play is covered under a contract, an indication of compliance with the terms of a contract, an indication of a status of a contract, etc.), via, for example, a memory caching or disk caching mechanism.

Although databases 325 and 330 are described as being stored in a gaming device 300, in other embodiments of the present invention some or all of these databases may be partially or wholly stored (in addition to or in lieu of being stored in gaming device 300) in one or more other devices. Such one or more other devices may comprise, for example, (i) one or more peripheral devices, (ii) a peripheral device server, (iii) computer 110, (iv) a kiosk 140 (v) another device, or (vi) a combination thereof. Further, some or all of the data described as being stored in the databases 325 and/or 330 may be partially or wholly stored (in addition to or in lieu of being stored in the gaming device 300) in a memory of one or more other devices. Such one or more other devices may comprise, for example, (i) one or more peripheral devices, (ii) a peripheral device server, (iii) computer 110, (iv) a kiosk 140, (v) another device, or (vi) a combination thereof.

In one or more embodiments, as described below, data may be stored in a memory of another device (e.g., a database of computer 110 or a database of a kiosk 140). In one or more embodiments, gaming device 300 may be operable to access the data thereof or have information associated with the data stored therein downloaded to the gaming device as necessary and/or appropriate. For example, gaming device 300 may access a memory of another device to determine terms of a contract to determine whether a current game play is covered under the terms of the contract.

The processor 305 is also operable to communicate with a random number generator 345, which may be a component of gaming device 300. The random number generator 345, in accordance with at least one embodiment of the present invention, may generate data representing random or pseudo-random values (referred to as "random numbers" herein). The random number generator may generate a random number every predetermined unit of time (e.g., every second) and/or in response to an event such as an initiation of a game play on the gaming device or receipt of a signal from another device. In the former embodiment, the generated random numbers may be used as they are generated (e.g., the random number generated at substantially the time of game play initiation is used for that game play) and/or stored for future use. A random number generated by the random number generator may be used by the processor 305 to determine, for example, an outcome for a game play, a payout associated with an outcome, and/or which of a plurality of payouts to provide as the result of an outcome.

A random number generator, as used herein, may be embodied as a processor separate from but working in cooperation with processor 305. Alternatively, a random number generator may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. Hot-Bits™, for example, is a service that provides random numbers that have been generated by timing successive pairs of radioactive decays detected by a Geiger-Muller tube interfaced to a computer. In another example, a blower mechanism that uses physical balls with numbers thereon may be used to determine a random number by randomly selecting one of the balls and determining the number thereof.

In yet another example, another device remote from and/or distinct from the gaming device 300 (e.g., a computer 110) may include a random number generator that generates random numbers to be provided to the gaming device 300. For example, in some embodiments, a gaming device may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred. Thus, for example, outcomes may be determined centrally by a server, and then propagated (e.g., electronically) such that indications of the outcomes may be viewed using one or more gaming devices (e.g., "Class II" gaming devices, Video Lottery Terminals, and so on).

The processor 305 is also operable to communicate with a benefit output device 350, which may be a component of gaming device 300. The benefit output device 350 may comprise one or more devices for outputting a benefit (e.g., a payout) to a player of the gaming device 300. It should be noted that a benefit output by a gaming device may, in some circumstances or embodiments, comprise a benefit defined by a contract that a player has qualified to receive as a result of compliance with the contract.

For example, in one embodiment the gaming device 300 may provide coins and/or tokens as a benefit. In such an embodiment the benefit output device 350 may comprise a hopper and hopper controller, for dispensing coins and/or tokens into a coin tray of the gaming device 300.

In another example, the gaming device 300 may provide a receipt or other document on which there is printed an indication of a benefit. For example, the gaming device may be operable to output one or more cash-out tickets. In such an embodiment the benefit output device 350 may comprise a printing mechanism and a document dispensing mechanism.

In yet another example, the gaming device 300 may provide electronic credits as a benefit (which, e.g., may be subsequently converted to coins and/or tokens and dispensed from a hopper into a coin tray). In such an embodiment the benefit output device 350 may comprise a credit meter balance and/or a processor that manages the amount of electronic credits that is indicated on a display of a credit meter balance. The processor may be the processor 305 or another processor.

In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device 350 may comprise a device for communicating with a server on which the financial account is maintained.

Note that, in one or more embodiments, the gaming device 300 may include more than one benefit output device 350 even though only one benefit output device is illustrated in FIG. 3. For example, the gaming device 300 may include each of (i) a hopper and hopper controller combination, (ii) a credit meter balance, and (iii) a document printing and dispensing combination. Such a gaming device may be operable to provide more than one type of benefit to a player of the gaming device.

A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 is also operable to communicate with a display device 355, which may be a component of gaming device 300. The display device 355 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, gaming device 300 may comprise more than one display device. For example, gaming device 300 may comprise an LCD display for displaying electronic reels, a display area that displays rotating mechanical reels, and an LED display of a player tracking device (e.g., such as player tracking device 360, described below) that outputs information to a player.

The processor 305 may also be in communication with one or more other output devices besides the display device 355, for outputting information (e.g., to a player or another device). Such other one or more output devices may also be components of gaming device 300. Such other one or more output devices may comprise, for example, an audio speaker (e.g., for outputting audio information corresponding to audio/video content), an infra-red transmitter, a radio transmitter, an electric motor, a printer (e.g., such as for printing cashless gaming vouchers), a ticket or product dispenser, an infra-red port (e.g., for communicating with a second gaming device or a portable device of a player), a Braille computer monitor, and a coin or bill dispenser. For gaming devices, common output devices include a CRT monitor on a video poker machine, a bell on a gaming device (e.g., rings when a player wins), an LED display of a player's credit balance on a gaming device, an LCD display of a PDA for displaying keno numbers.

The display device 355 may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of one or more payout tables). In one or more embodiments, the gaming device 300 may include more than one display device, one or more other output devices, or a combination thereof (e.g., two display devices and two audio speakers). In one embodiment, a first display area and a second display area may comprise two distinct areas of the same display device (e.g., a slit screen or a window within a screen, etc.).

The processor 305 is also in communication with an input device 365, which is a device that is capable of receiving an input (e.g., from a player or another device, such as a selection of an option or feature available on the gaming device, such as a selection of an episode of a television show) and which may be a component of gaming device 300. An input device may communicate with or be part of another device (e.g. a computer 110, another gaming device, etc.). For example, a player may use a touch screen to indicate his desire to view contracts available for purchase and/or to view a status of a contract previously purchased or entered into by the player.

Some examples of input devices include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a USB port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card and/or contract card inserted into a gaming device, a touch screen for input of player selections during game play, a paper ticket acceptor for accepting paper tickets such as cash-out tickets and a coin and bill acceptor.

In some embodiments, a gaming device may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, is manufactured by International Gaming Technology (IGT)™, headquartered in Reno, Nev.

Of course, as would be understood by one of ordinary skill in the art, a gaming device may comprise various combinations of such component devices. For example, in one or more embodiments, the gaming device may include more than one display device, one or more other output devices, several input devices, and so on (e.g., two display screens, two audio speakers, a ticket-in/ticket-out device and several buttons).

The processor 305 is also in communication with a payment system 370, which may be a component of gaming device 300. The payment system 370 is a device capable of accepting payment from a player (e.g., a bet or initiation of a balance, a payment in exchange for entering into a contract). Exemplary methods of accepting payment by the payment system 370 include (i) receiving hard currency (i.e., coins or bills), and accordingly the payment system 370 may comprise a coin or bill acceptor; (ii) receiving an alternate currency (e.g., a cash-out ticket, a coupon, a non-negotiable token), and accordingly the payment system 370 may comprise a bar code reader or other sensing means; (iii) receiving a payment identifier (e.g., a credit card number, a debit card number, a player tracking card number, a code via a keypad or touchscreen); (iv) receiving a smart card having an indication of an amount of currency stored thereon; and (v) determining that a player has performed a value-added activity (e.g., participating in surveys, monitoring remote images for security purposes, referring friends to the casino).

The processor 305 is further operable to communicate with a player tracking device 360, which may be a component of gaming device 300. Player tracking device 360 may, in one or more embodiments, comprise a reader device operable to read information from and/or write information to a card such as a smart card and/or a player tracking card, such that (i) players may be identified, and (ii) various data associated with players may then be determined. For example, a contract previously entered into by the player may be identified, a status of the contract may be determined, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc. In one example, a card reader device may determine an identifier associated with a player (e.g., by reading a player tracking card comprising an encoded version of the identifier), such that the gaming device may then access data (e.g., of a player database, a session database) associated with the player. In another example, a smart card reader device may determine data associated with a player directly by accessing a memory of an inserted smart card.

As described in more detail below, player database may be used, for example, to store player wager data (e.g., such that players wagering over a given threshold in a given amount of time may be rewarded for their patronage, qualify for a particular gaming contract, and so on). The player database may also contain other information that may be useful in, for example, promoting and managing player behaviors (e.g., information about the player's gaming preferences, lodging arrangements, and the like). Further, the player database may store data regarding a given player's standing in a game session, gaming contract or bonus game, so that the player can continue the game session, gaming contract or bonus game at a plurality of game machines that have common access to the player database. Such player data may be stored in a relational database and retrieved or otherwise accessed by the processor after receiving a "key" data point from the player, such as a unique identifier read from the player's player tracking card, contract card or cashout ticket.

In one embodiment, a player tracking device 360 may be operable to read an identifier that uniquely identifies a contract. For example, a card inserted into the player tracking device may have a contract identifier stored thereon, which contract identifier may be readable by the player tracking device 360. The player tracking device 360 may further be operable to retrieve data (e.g., from computer 110, a contract kiosk 140 and/or a contract server) associated with the contract and/or output an indication of the data.

In one embodiment, the player tracking device may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally® Gaming and Systems.

As known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Of course, other non-card-based methods of identifying players and/or contracts are contemplated. For example, a unique identification code may be associated with the player and/or contract. The player and/or contract may then be identified upon entering the code. For example, the code may be stored (e.g., within a database maintained within the gaming device, a contract kiosk 140, a contract server and/or a computer 110) such that the player may enter the code using an input device of a gaming device, and accordingly allow the player and/or contract to be uniquely identified. In other embodiments, player biometrics may serve as identification means (e.g., a player and/or contract is identified via a thumbprint or retinal scan of the player). In further embodiments, a barcode of a cashless gaming ticket may encode a player identifier and/or a contract identifier.

Thus, as described, various data associated with a player may be tracked and stored (e.g., in an appropriate record of a centrally-maintained database), such that it may be accessed as desired (e.g., when entering into a contract with a player, when determining a player's compliance with a contract, when determining promotional offers, contract and/or rewards to be provided or offered to a player, when determining the status of player with respect to a particular game, contract or period of gambling activity, and so on). Further, various statistics may be measured in association with a player (e.g., coin-in statistics, win/loss statistics, buy-in amount for a session) and similarly accessed.

Various systems for facilitating such monitoring of player behavior and activity are contemplated. For example, a two-wire system such as one offered by IGT™ may be used. Similarly, a protocol such as the IGT™ SAS™ protocol or the IGT™ SuperSAS™ protocol may be used. The SAS™ protocol and the SuperSAS™ protocol each allows for communication between gaming machines and slot accounting systems and provides a secure method of communicating all necessary data supplied by the gaming device to the online monitoring system. One aspect of the SAS™ protocol and the SuperSAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

In one or more embodiments, aspects of the present invention, such as facilitating play of a gaming device under the terms of a contract (e.g., providing a benefit during a period of time defined by the contract and/or monitoring the play to determine compliance with the contract), may be practiced by replacing and/or augmenting one or more components (e.g., hardware and/or software components) of an existing gaming device. Thus, in one or more embodiments, the invention may be applied as a retrofit or upgrade to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more Printed Circuit Boards (PCB) devices. Such components may include various hardware described herein, such as a communications port and various controllers of peripheral devices (e.g., a display controller), as well as a memory for storing programming instructions (software) and a processor for carrying out such instructions. Forms of memory that may be found in a gaming device include Electronically Erasable Programmable Read-Only Memory (EEPROM), Erasable Programmable Read-Only Memory (EPROM) and flash memory. Thus, in one or more embodiments of the present invention, an EPROM storing software with instructions for carrying out aspects of the present invention (as well as instructions for carrying out other functions traditionally performed by the gaming device) may replace an EPROM previously installed in a gaming device or may be reprogrammed in accordance with one or more embodiments described herein, such that the gaming device may be configured to operate in accordance with various processes described herein.

For example, a "contract play" module may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play the gaming device in a manner that does not incorporate embodiments described herein, or (ii) to play the gaming device in a manner that incorporates embodiments described herein (e.g., be eligible for a benefit defined by a contract). Thus, players who are familiar with operating a gaming device may elect to pay for them in a different or similar manner as they are accustomed to.

Accordingly, a gaming device may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that embodiments described herein may not be utilized). If a player selects "contract play" mode, the gaming device may then be operable to execute game play in accordance with one or more embodiments described herein.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; etc.). Accordingly, a player may select a mode of operation (e.g., by pressing an appropriately labeled icon of a touch-sensitive display screen), and upon receiving the player's selection, the gaming device may be configured to operate in the selected mode.

In another embodiment, a gaming device may be operable to automatically determine whether it should switch modes from a standard mode to a "contract play" mode. A gaming device may perform such a determination, for example, by evaluating data received from a player and/or another device and/or by querying another device. For example, a gaming device may be programmed to determine (e.g., upon receiving a player identifier and based upon the player identifier) whether the player currently playing the gaming device has entered into a contract. In another embodiment, a gaming device may be programmed to recognize that a player has entered a contract identifier into the gaming device. Upon determining that a player has previously entered into or purchased a contract, a gaming device may further be programmed to determine a status of the contract and/or whether a current game play of the gaming device is covered under the terms of the contract. For example, the gaming device may be programmed to access data (e.g., the terms of the contract) stored on another device (e.g., a contract kiosk 140, a contract server, computer 110, etc.) or query such other device for an answer to the determination. If the gaming device determines that current play of the gaming device qualifies for coverage under the terms of the contract, the gaming device may switch from a standard mode to a "contract play" mode. In "contract play" mode, for example, a gaming device may be operable to transmit information associated with the game plays being conducted to another device to enable the other device to determine compliance with the contract and/or to locally determine compliance with the contract. In one embodiment, a gaming device may be operable to output an indication that it is currently in "contract play" mode (e.g., to inform a player that the current play of the gaming device is covered under the terms of a contract). For example, the gaming device may turn on a light, change graphics, output a sound, etc.

In other embodiments, as described, a peripheral device may be useful for implementing one or more embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device. Such a peripheral device may be operable to, for example, monitor and/or transmit information about a player's gambling activity at the gaming device to another device (e.g., computer 110, a kiosk 140 and/or a contract server). The peripheral device may monitor and/or transmit such information to enable a determination of compliance with the terms of a contract.

In still further embodiments, rather than configure existing gaming devices to execute embodiments described herein by installing or connecting new hardware and/or software, software may be downloaded into an existing memory of one or more gaming devices. For example, U.S. Pat. No. 6,805,634 to Wells et al. teaches methods for downloading data to gaming devices in such a manner. Such methods, concepts, and descriptions of which are hereby incorporated by reference herein. Thus, in some embodiments, an existing gaming device may be reprogrammed to accommodate new functionality of the present invention without the need, or by minimizing the need, to remove and replace hardware within the gaming device.

In one embodiment, a gaming device 300 or another device operable to carry out one or more embodiments described herein (e.g., a contract kiosk 140) may be operable to output a menu of available contracts to a player via a player interface. A player interface may comprise, for example, a video screen that is a touch screen operable to display such one or more such menus. A menu so displayed to a player may provide the player with, for example, a choice of whether to play the gaming device in a conventional manner or in a manner consistent with one or more embodiments described herein. In another example, a menu so displayed to a player may provide the player with available contracts, contracts which the player has previously entered into and/or contracts for which the player is currently eligible. A player may be presented with a menu of options via a touch screen, for example, upon indicating a desire to consider options available via such a menu and/or upon initiating play at the gaming device 300. A player may select an option from such a menu by touching the area of the screen on which the option appears.

It should be appreciated that one or more embodiments may include storing graphic and/or sound elements that are used to construct the menu of available options. These elements may be store, for example, in EEPROM, flash memory, hard disk, CD ROM, or in any other suitable storage device. The menu may be displayed via any suitable display device, such as a CRT, LCD, VFC, LED display. In one embodiment, the menu may be implemented using only dedicated electro-mechanical switches. In one embodiment, a player operates an input device of the device operable to display the menu, in order to cause the menu to be displayed. In one embodiment, the device includes a touch screen and a touch screen controller (not shown) associated with a video monitor display device. The touch screen and touch screen controller may be operable to communicate with a video controller of the video monitor display device and a processor (e.g., a processor of gaming device 300). Thus, a player may be enabled to indicate decisions (e.g., which contract the player desires to view more detailed information about, which contract the player desires to purchase, which contract the player desires to reconcile, etc.) by touching the touch screen in the appropriate places.

In one embodiment, display of the menu preempts display of other information. For example, in one embodiment the same display device or screen used to display indicia indicative of an outcome by displaying the indicia as disposed along a payline during active game play may be used to display a menu of available contracts to a player upon an indication of a player to view the menu. In another embodiment, a dedicated display device or screen may be used to display a menu of available contracts on a continuous, periodic, or other basis.

V. Data Structures

Example structures and sample contents of the (i) a player database 225; (ii) a player eligibility rules database 230; (iii) a gaming device database 235; (iv) a gaming device eligibility rules database 240; (v) a gaming device status database 245; (vi) a contract eligibility rules database 250; and (vii) a purchased contracts database 255 are shown in FIG. 4, FIG. 5, FIG. 6, FIG. 7, FIG. 8, FIG. 9, and FIG. 10, respectively. The specific data and fields illustrated in these drawings represent only some embodiments of the records stored in the databases described herein. The data and fields of these databases can be readily modified, for example, to include more or fewer data fields. A single database also may be employed. Note that in the databases, a different reference numeral is employed to identify each field of each database. However, in at least one embodiment, fields that are similarly named (e.g., session identifier fields) store similar or the same data in a similar or in the same data format.

The databases 225, 230, 235, 240, 245, 250 and 255 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though seven separate databases are illustrated, the invention could be practiced effectively using one, two, three, four, five, six, eight or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

It should also be noted that some or all of the data or types of data illustrated in FIG. 4, FIG. 5, FIG. 6, FIG. 7, FIG. 8, FIG. 9, and/or FIG. 10 may be stored and managed in individual ones of the gaming devices 130, the contract kiosks 140, and/or a contract server, and may be used therein to manage, control and/or monitor contract play modes of the gaming devices 130.

A. Player Database

Referring now to FIG. 4A and FIG. 4B, illustrated therein is a tabular representation 400 of an example embodiment of a player database 225. Tabular representation 400 is referred to herein as player database 400. The player database 400 may be utilized by a device (e.g., a computer 110, a kiosk 140, a gaming device 130 and/or a contract server) to store and/or access information about players who are members of a loyalty club administered by a casino. As is well known, most casinos offers rewards (e.g., comp points) to players in exchange for the players providing personal information about themselves, being assigned a unique player tracking number, and allowing their gambling and/or other activities in the casino to be tracked. The data in the player database 400 may be input by, for example, a casino employee and/or a device (e.g., a gaming device 130, a computer 110, a contract kiosk 140, and/or a contract server). The data may be updated by one or more of these entities as well.

For example, upon a player signing up for a casino's loyalty club, a record may be opened for the player in the player database, the record being uniquely identifiable based on the player identifier assigned to the player. A device and/or person may access the player database 400 to determine, for example, whether a player is eligible for a contract; and/or whether an active contract is associated with the player. In another example, the player database 400 may be accessed by a device and/or person in order to update information associated with a player (e.g., to store an indication of a contract entered into by the player, to update the total amount wagered by the player, etc.).

The player database 400 includes a number of example records or entries, including records R400-1 through R400-4, each defining a player who has associated therewith a unique player identifier. Those skilled in the art will understand that the player database 400 may include any number of entries. The player database 400 also defines fields for each of the entries or records. The fields specify: (i) a player identifier 402; (ii) a player name 404; (iii) a player address 406 that stores a postal address and/or other contact information associated with a player; (iv) a member since 408 that indicates a date at which the player joined the casino loyalty club; (v) a total wagered 410 that indicates a sum of wagers posted by the player within a specified period of time (e.g., since the player joined the loyalty club); (vi) a theoretical win 412 of the player; (vii) an active contract(s) 414 that indicates a contract identifier for any currently active contract (e.g., any contract previously entered by the player that is not yet expired, not yet completed, not yet reconciled, etc); (viii) an expired contracts 416 that stores an indication of contracts previously entered into by the player that are currently expired or otherwise inactive (e.g., the duration of the contract has elapsed or the contract has otherwise been completed, fulfilled or terminated); and (ix) a hotel guest? 418 indication that indicates whether the player is currently registered as a guest in a hotel associated with the casino administering the loyalty club.

In one embodiment, a player database may not store an indication of contracts associated with a player. This information may instead be stored in a separate database, such as a purchased contracts database as described below.

To illustrate a usage of player database 400, assume a player has requested to purchase a contract which only players of a certain status are eligible to purchase (e.g., only players who are currently registered as hotel guests). In this example, a player database may be accessed to determine, based on the information stored in field 418, whether the player is eligible to purchase the requested contract. To illustrate another usage of the player database 400, assume a player has inserted a player tracking card into a gaming device. A computer 400 or another device may determine, based on the player identifier of the player tracking card, whether the player's play of the gaming device is covered under a contract by, for example, (i) determining whether the player is associated with a currently active contract, based on the information stored in field 414; and (ii) determining the terms of the contract (e.g., by accessing another database, such as a purchased contracts database 255, which is described below with respect to FIG. 10).

A player database may be used, for example, to store player wager data (e.g., such that players wagering over a given threshold in a given amount of time may be rewarded for their patronage, qualify for a particular gaming contract, and so on). The player database may also contain other information that may be useful in, for example, promoting and managing player behaviors (e.g., information about the player's gaming preferences, lodging arrangements, and the like). Further, the player database may store data regarding a given player's standing in a game session, gaming contract or bonus game, so that the player can continue the game session, gaming contract or bonus game at a plurality of game machines that have common access to the player database. Such player data may be stored in a relational database and retrieved or otherwise accessed by the processor after receiving a "key" data point from the player, such as a unique identifier read from the player's player tracking card, contract card or cashout ticket. The player database 400 may also store additional or different information from that described. For example, the player database may store information about an average wager amount posted by a player; games, features or other play options preferred by the player; gambling habits of the player; etc.

B. Player Eligibility Rules Database

Referring now to FIG. 5, illustrated therein is a tabular representation 500 of a player eligibility rules 230. Tabular representation 500 is referred to herein as player eligibility rules database 500. The player eligibility rules database 500 may be utilized by a device (e.g., a computer 110, a kiosk 140, a gaming device 130 and/or a contract server) to store and/or access information about rules based on which it is determined whether a player is eligible to enter into contract. In accordance with one embodiment, only certain players are eligible to enter into contracts at all or into particular contracts. In other embodiments, player eligibility rules database 500 may not be used because all players may be eligible to enter into any available contract. The data in the player eligibility rules database 500 may be input by, for example, a casino employee and/or a device (e.g., a gaming device 130, a computer 110, a contract kiosk 140, and/or a contract server). The data may be updated by one or more of these entities as well.

The player eligibility database 500 includes a number of example records or entries, including records R500-1 through R500-4, each defining a rule in accordance with which it may be determined whether a player is eligible to enter into a contract. Those skilled in the art will understand that the player eligibility rules database 500 may include any number of entries. The player eligibility rules database 500 also defines fields for each of the entries or records. The fields specify: (i) a player eligibility rule identifier 502 that identifies (e.g., uniquely) a rule based on which it may be determined whether a player is eligible to enter into a contract; (ii) condition(s) 504 that specify a condition of a corresponding rule; (iii) an eligibility 506 that indicates a player's eligibility to enter into a contract if the corresponding condition(s) is satisfied; and (iv) a rule status 508 that indicates whether a rule is currently enabled (i.e., to be applied in a determination of whether a player is eligible to enter into a contract) or is disabled (i.e., is not to be applied in a determination of whether a player is eligible to enter into a contract). In one embodiment, casino personnel may enable a particular rule at certain desired time and may disable the rule at another time. In one embodiment, a rule may be enabled and/or disabled based on a schedule or other basis programmed into a device.

For example, a computer 110 may be programmed to enable a rule if certain condition(s) are satisfied.

Thus, for example, record R500-1 indicates that, based on rule "R-001", a player who is not a hotel guest or does not have a guest pass is not eligible to enter into any available contract.

It should be noted that, in one embodiment, a player eligibility rule may be associated with one or more particular contracts, such that it may only be applied in a determination of whether a player is eligible to enter into the one or more particular contracts. This may be contrasted with another embodiment in which a rule may be of general applicability, such that it may be applied in a determination of whether a player is eligible to enter into any contract at all. In one embodiment, a player eligibility rules database may store some rules that are associated with one or more particular contracts and some rules that are of general applicability. In another embodiment, a rule that applies to a particular contract may be stored in a record of another database, such as database storing information on available contracts. For example, a record defining a particular contract available for purchase may store one or more player eligibility rules based on which it may be determined whether a player is eligible to purchase the particular contract.

To illustrate a usage of player eligibility rules database 500, assume a player has indicated a desire to enter into a contract. Based on rule "R-001" of player eligibility rules database 500 it may be determined that the player is not eligible to enter into any contract if the player is not a hotel guest or does not have a guest pass. Thus, the player's player identifier may be requested and used to determine whether the player is a hotel guest (e.g., is currently registered as a guest in a hotel associated with the casino at which the player is attempting to enter into a contract) or has a guest pass. For example, the player database 400 and/or a hotel reservation system may be accessed to determine this information. If it is determined that the player is not a hotel guest or does not have a guest pass, it may be determined that, under rule "R-001", the player is not eligible to enter into any contract. Of course, the player may be eligible to enter into a contract under another rule that is currently enabled. Accordingly, each of the enabled rules in the player eligibility rules database 500 may be evaluated in turn to determine whether the player is eligible to enter into a contract. It should be noted that player eligibility rules database 500 may be accessed, for purposes of the determination described immediately above or for other purposes, by casino personnel and/or a device (e.g., a contract kiosk 140, a gaming device 130, computer 110, a contract server, another device, or a combination thereof).

C. Gaming Device Database

Referring now to FIG. 6A and FIG. 6B, illustrated therein is a tabular representation 600 of a gaming device database 235. Tabular representation 600 is referred to herein as gaming device database 600. The gaming device database 600 may be utilized by a device (e.g., a computer 110, a kiosk 140, a gaming device 130 and/or a contract server) to store and/or access information about gaming devices (e.g., gaming devices that may be available for contract play). The data in the gaming device database 600 may be input by, for example, a casino employee and/or a device (e.g., a gaming device 130, a computer 110, a contract kiosk 140, and/or a contract server). The data may be updated by one or more of these entities as well. For example, a casino employee may enter a record for a new gaming device once a new gaming device becomes available. In another example, a gaming device may update data in a record associated with the gaming device based on upgrades and/or other changes to the gaming device.

The gaming device database 600 includes a number of example records or entries, including records R600-1 through R600-4, each defining a gaming device that may be part of system 100. Those skilled in the art will understand that the gaming device database 600 may include any number of entries. The gaming device database 600 also defines fields for each of the entries or records. The fields specify: (i) a gaming device identifier 602 that (e.g., uniquely) identifies a gaming device or gaming device type; (ii) a game name 604 that specifies a name of a game playable on the corresponding gaming device (in one or more embodiments more than one game may be playable on a gaming device); (iii) a manufacturer 606 of the gaming device; (iv) a location 608 of a gaming device (e.g., a geographic location within a casino property); (v) a game type 610 that indicates a type of game(s) playable on the gaming device; (vi) a standard deviation 612 associated with the gaming device (as will be described further herein); (vii) a payout percentage 614 of the gaming device; (viii) a top jackpot 616 (in terms of number of credits) available for winning on the gaming device; and (ix) a denomination 618 accepted by the gaming device.

To illustrate a usage of gaming device database 600, assume a player has indicated a desire to play a gaming device under the terms of a contract (e.g., the player has provided a contract identifier to the gaming device). The gaming device database 600 may be accessed to determine whether play of the gaming device qualifies for coverage under the contract. For example, a term of the contract (which may be determined based on the contract identifier provided by the player) may specify that the contract only covers play on video poker machines. If it is determined that the gaming device which the player is attempting to play is not a video poker gaming device (e.g., based on the gaming device identifier, which may be received along with the contract identifier by a device performing this determination, if such a device is not the gaming device itself), it may be concluded that play of the gaming device will not be covered under the contract. The player may be notified of this conclusion (e.g., a warning message may be output to the player).

D. Gaming Device Eligibility Rules Database

Figure 7:
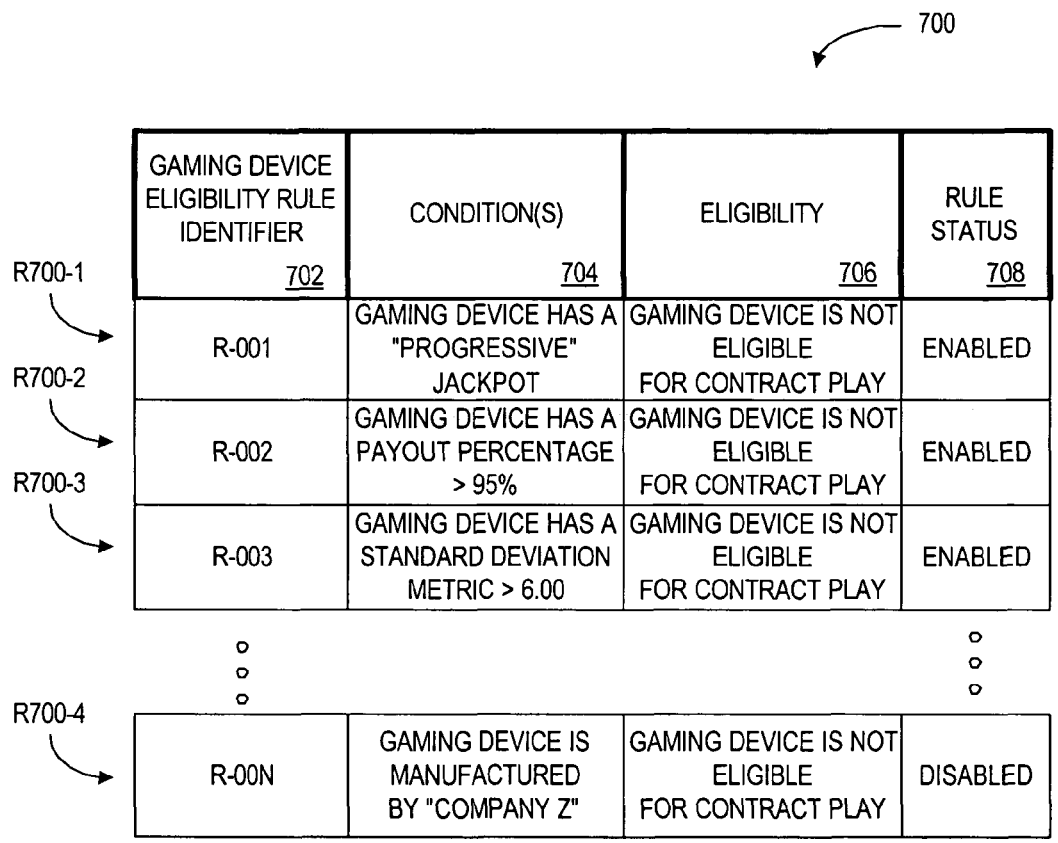
FIG. 7 is a table illustrating an example gaming device eligibility rules database, in accordance with one or more embodiments of the present invention.

Referring now to FIG. 7, illustrated therein is a tabular representation 700 of a gaming device eligibility rules database 240. Tabular representation 700 is referred to herein as gaming device eligibility rules database 700. The gaming device eligibility rules database 700 may be utilized by a device (e.g., a computer 110, a kiosk 140, a gaming device 130 and/or a contract server) to determine whether a gaming device is eligible for contract play. A gaming device being eligible for contract play may mean, for example, that play of the gaming device will (i) qualify for coverage under the terms of a contract, (ii) aid a player in complying with one or more terms of a contract and/or (iii) aid a player in earning or otherwise qualifying for a benefit defined by a contract. The data in the gaming device eligibility rules database 700 may be input by, for example, a casino employee and/or a device (e.g., a gaming device 130, a computer 110, a contract kiosk 140, and/or a contract server). The data may be updated by one or more of these entities as well.

The gaming device eligibility rules database 700 includes a number of example records or entries, including records R700-1 through R700-4, each defining a rule based on which it may be determined whether a gaming device is eligible for contract play. Those skilled in the art will understand that the gaming device eligibility rules database 700 may include any number of entries. The gaming device eligibility rules database 700 also defines fields for each of the entries or records. The fields specify: (i) a gaming device eligibility rule identifier 702 that (e.g., uniquely) identifies a rule in accordance with which a determination may be made as to whether a gaming device is eligible for contract play; (ii) a condition(s) 704 that specifies one or more conditions to be satisfied and/or one or more characteristic(s) of a gaming device; (iii) an eligibility 706 that indicate whether (if the corresponding condition is satisfied or a gaming device is determine to possess the corresponding characteristic) a gaming device is eligible for contract play; and (iv) a rule status 708 that indicates whether a rule is currently enabled (i.e., to be applied in a determination of whether a gaming device is eligible for contract play) or disabled (i.e., not to be applied in a determination of whether a gaming device is eligible for contract play). In one embodiment, casino personnel may enable a particular rule at certain desired time and may disable the rule at another time. In one embodiment, a rule may be enabled and/or disabled based on a schedule or other basis programmed into a device. For example, a computer 110 may be programmed to enable a rule if certain condition(s) are satisfied.

Thus, for example, record R700-1 indicates that, based on rule "R-001", a gaming device that contributes to a progressive jackpot is not eligible for contract play.

It should be noted that, in one embodiment, a gaming device eligibility rule may be associated with one or more particular contracts, such that it may only be applied in a determination of whether a gaming device is eligible for contract play under the one or more particular contracts (e.g., whether play of the gaming device will be covered under the terms of the one or more particular contracts). This may be contrasted with another embodiment in which a rule may be of general applicability, such that it may be applied in a determination of whether a gaming device is eligible for contract play under any contract at all. In one embodiment, a gaming device eligibility rules database may store some rules that are associated with one or more particular contracts and some rules that are of general applicability. In another embodiment, a rule that applies to a particular contract may be stored in a record of another database, such as database storing information on available contracts. For example, a record defining a particular contract available for purchase may store one or more gaming device eligibility rules based on which it may be determined whether a particular gaming device is eligible for contract play under the particular contract.

To illustrate a usage of gaming device eligibility rules database 700, assume a player has indicated a desire to play a gaming device under the terms of a contract (e.g., the player has provided a contract identifier to the gaming device). The gaming device eligibility rules database 700 may be accessed to determine whether play of the gaming device qualifies for coverage under the contract. For example, rule "R-002" may be applied to determine whether the gaming device the player is attempting to play has a payback percentage of greater than ninety-five percent (95%). This may be determined based on the gaming device identifier of the gaming device the player is attempting to play, which may have been received from the gaming device and by the device that is performing the gaming device eligibility determination (if the device is different from the gaming device). For example, the gaming device database 600 may be accessed and field 614 of the record corresponding to the gaming device identifier may be analyzed to determine the payback percentage of the gaming device. If it is determined that the gaming device which the player is attempting to play has a payback percentage that is greater than ninety-five percent (95%), it may be concluded that play of the gaming device will not be covered under the contract and that the gaming device is not eligible for contract play. The player may be notified of this conclusion (e.g., a warning message may be output to the player).

E. Gaming Device Status Database

Referring now to FIG. 8, illustrated therein is a tabular representation 800 of a gaming device status database 245. Tabular representation 800 is referred to herein as gaming device status database 800. The gaming device status database 800 may be utilized by a device (e.g., a computer 110, a kiosk 140, a gaming device 130 and/or a contract server) to store and/or access information about a current status of the gaming device (e.g., whether the gaming device is currently in use). The data in the gaming device status database 800 may be input by, for example, a casino employee and/or a device (e.g., a gaming device 130, a computer 110, a contract kiosk 140, and/or a contract server). The data may be updated by one or more of these entities as well. For example, a gaming device may update data in a record associated with the gaming device based on a change in its current status (e.g., when a player initiates play on the gaming device, the gaming device may transmit a signal that indicates it is currently in use, which signal may be received by controller 200 and used to update the status in the appropriate record of the gaming device status database 800).

The gaming device status database 800 includes a number of example records or entries, including records R800-1 through R8004, each defining a status of a gaming device that may be part of system 100. Those skilled in the art will understand that the gaming device status database 800 may include any number of entries. The gaming device status database 800 also defines fields for each of the entries or records. The fields specify: (i) a gaming device identifier 802 that (e.g., uniquely) identifies a particular gaming device that may be located on a casino property or otherwise controlled by an entity practicing aspects of the present invention; (ii) a gaming device type identifier 804 that identifies (e.g., uniquely) the type of gaming device; and (iii) a gaming device status 806 that indicates a status of the gaming device (e.g., whether the gaming device is currently in use or is currently not in use). Other example statuses of a gaming device that may be stored in the gaming device status database 800 include an indication of whether a gaming device is currently off-line, is currently being serviced, and/or is currently engaged in contract play.

To illustrate a usage of gaming device status database 800, assume a player has indicated a desire to purchase a contract to cover game play on a particular gaming device. The gaming device status database 800 may be accessed to determine whether to authorize the sale of the contract to the player, based on whether the gaming device is currently in use.

F. Contract Customization Rules Database

Referring now to FIG. 9, illustrated therein is a tabular representation 900 of a contract customization rules database 250. Tabular representation 900 is referred to herein as contract customization rules database 900. The contract customization rules database 900 may be utilized by a device (e.g., a computer 110, a kiosk 140, a gaming device 130 and/or a contract server) to store and/or access information about manners in which a player may build or customize a contract. The data in the contract customization rules database 900 may be input by, for example, a casino employee and/or a device (e.g., a gaming device 130, a computer 110, a contract kiosk 140, and/or a contract server).

The contract customization rules database 900 includes a number of example records or entries, including records R900-1 through R900-4, each defining respective boundaries for each of a plurality of contract terms. Those skilled in the art will understand that the contract customization rules database 900 may include any number of entries. The contract customization rules database 900 also defines fields for each of the entries or records. The fields specify: (i) a contract rule identifier that (e.g., uniquely) identifies a rule for customizing or building a contract; (ii) contract term boundaries 904 that specifies at least one boundary for a value of at least one contract term; (iii) a result 906 that indicates whether a contract should be approved or provided if the contract term(s) is as specified in the contract term boundaries. In one embodiment, casino personnel may enable a particular rule at certain desired time and may disable the rule at another time. In one embodiment, a rule may be enabled and/or disabled based on a schedule or other basis programmed into a device. For example, a computer 110 may be programmed to enable a rule if certain condition(s) are satisfied.

To illustrate a usage of contract customization rules database 900, assume a player has indicated a desire to build or customize a contract and has provided a desired value for a term of the desired contract. More specifically, assume the player has requested a contract that defines a period of 48 hours (e.g., the contract will cover play of a gaming device for a period of forty-eight (48) hours). It may be determined, based on rule "R-003" (of record R900-3) of contract customization rules database 900 that the contract should not be approved or provided, since the defined contract period is greater than 24 hours.

G. Available Contracts Database

Referring now to FIG. 10, illustrated therein is a tabular representation 1000 of an available contracts database 255. Tabular representation 1000 is referred to herein as available contracts database 1000. The available contracts database 1000 may be utilized by a device (e.g., a computer 110, a kiosk 140, a gaming device 130 and/or a contract server) to store and/or access information about contracts that are available for purchase. For example, a kiosk 140 or a gaming device 130 may access the available contracts database 1000 to determine what information to output to a player via a menu of available contracts. As described herein, in one or more embodiments, one or more contracts may be pre-defined (e.g., by a casino, game designer, gaming device manufacturer, or another entity) and offered for sale to players. A pre-defined contract may comprise a contract that has respective values specified for each of a plurality of terms that define the contract.

Examples of terms of a contract include (i) a period of time defined by the contract, (ii) a price for the contract, (iii) a refund rate or other benefit provided under the contract, (iv) one or more conditions a player must comply with (e.g., a rate of play, a minimum wager amount per game play, etc.) in order to earn or qualify for the benefit defined by the contract, and (v) gaming devices and/or games eligible for play under the contract. In such an embodiment, information about the pre-defined contracts may be stored in a database such as available contracts database 1000, for output to a player who has indicated a desire to purchase an available contract. The data in the available contracts database 1000 may be input by, for example, a casino employee, employee of a game designer and/or gaming device manufacturer and/or by a device (e.g., a gaming device 130, a computer 110, a contract kiosk 140, and/or a contract server). For example, casino personnel may set initial values for respective terms of a contract and a device (e.g., computer 110) may update the values based on the success of the contract and/or feedback from the players.

The available contracts database 1000 includes a number of example records or entries, including records R1000-1 through R1000-4, each defining a respective contract that is available for purchase or that may otherwise be entered into by a player. Those skilled in the art will understand that the available contracts database 1000 may include any number of entries. The available contracts database 1000 also defines fields for each of the entries or records. The fields specify: (i) a contract type identifier 1002 that identifies a particular type of contract characterized by certain terms, though does not necessarily identify a unique contract provided to a particular player (note: a unique contract identifier may be assigned once a player purchases a contract type); (ii) a contract price 1004 that specifies a monetary amount or other form of consideration to be provided by a player in exchange for entering into the contract; (iii) a contract period 1006 that defines a period of time (which may be defined in terms of a number of game plays, a number of units of time, as ending upon an occurrence of a specified event, etc.) during which game play that complies with the remainder of the terms of the contract will be covered under the contract; (iv) a contract benefit 1008 that defines a benefit a player may earn or qualify for by complying with the terms of the contract; and (v) compliance requirements 1010 that define restrictions on game play that a player must comply with in order to earn or qualify for the benefit of the contract.

Thus, for example record R1000-1 indicates that if a player purchases a contract of contract type "CT-01234" for a price of twenty dollars ($20), the player will not need to provide any payment for five hundred (500) game plays of a "Double Gems Jackpots" game (beyond the twenty dollar ($20) price of the contract) and the credit meter balance of a gaming device on which the player is playing the game will be allowed to become a negative number if necessary for the player to complete the five hundred (500) game plays.

To illustrate a usage of available contracts database 1000, assume a player has indicated a desire to purchase a contract. The player may be presented (e.g., via a touch-screen of a contract kiosk 140) with a menu of available contracts. The menu may be populated based on information obtained from the available contracts database 1000.

H. Purchased Contracts Database

Referring now to FIG. 11, illustrated therein is a tabular representation 1100 of a purchased contracts database 260. Tabular representation 1100 is referred to herein as purchased contracts database 1100. The purchased contracts database 1100 may be utilized by a device (e.g., a computer 110, a kiosk 140, a gaming device 130 and/or a contract server) to store and/or access information about contracts that have been purchased or otherwise entered into by players. For example, a kiosk 140 or a gaming device 130 may access the purchased contracts database 1100 to determine a period remaining in a contract previously purchased by a player. The data in the purchased contracts database 1100 may be input by, for example, a casino employee and/or by a device (e.g., a gaming device 130, a computer 110, a contract kiosk 140, and/or a contract server). For example, casino personnel or a contract kiosk 140 may create a record in the purchased contracts database 1100 upon a player purchasing a contract and update the record as the player participates in play covered under the terms of the contract.

The purchased contracts database 1100 includes a number of example records or entries, including records R1100-1 through R1100-4, each defining a respective contract that has been purchased or otherwise entered into by a player. Those skilled in the art will understand that the purchased contracts database 1100 may include any number of entries. The purchased contracts database 1100 also defines fields for each of the entries or records. The fields specify: (i) a contract identifier 1102 that uniquely identifies a contract; (ii) a player identifier 1103 that identifies the one or more players associated with the contract (note that in some embodiments the player identifier and the contract identifier may comprise the same identifier); (iii) a contract period 1106 that specifies a period of time defined by the contract (e.g., a period of time during which the contract is active, a period of time during which play is covered under the terms of a contract, and/or a period of time defining an amount of play covered under the terms of the contract); (iv) a refund rate 1108 that specifies a percentage of losses or wagers posted by a player that will be refunded to the player, as one example of a benefit that may be provided to a player under a contract; (v) a contract fee 1110 that specifies a consideration to be exacted from a player in exchange for the benefit defined by the contract (which may be a price the player pre-pays for the contract or another form of consideration); (vi) a play requirement(s) 1112 that specifies one or more restrictions on game play that a player must normally comply with in order to earn or qualify for the benefit of the contract; (vii) a period remaining 1114 that specifies the period of time remaining in the contract (i.e., the total period of time defined by the contract less the period of the contract utilized by the player to date); (viii) a total wager 1116 that indicates a sum of wagers posted by the player while participating in play covered under the terms of the contract; (ix) a total payout 1118 that specifies a sum of payouts won by the player as a result of participating in play covered under the terms of the contract; and (x) a total loss 1120 that specifies the sum of losses incurred by the player as a result of participating in play covered under the terms of the contract. It should be noted that the example contracts illustrated in purchased contracts database 1100 are directed to a type of contract in which a benefit is a refund of losses incurred by a player as a result of participating in play covered under the terms of the contract. As described herein, other contracts may define different benefits. Accordingly, in some embodiments different fields may be appropriate to track information relevant to such different benefits.

Thus, for example record R1100-1 indicates that a player identified as "P-000927" has purchased a contract identified as "C-000001", and that this contract has an associated period of time of six (6) hours, a refund rate of one hundred percent (100%) and a contract fee in which one cent (1¢) will be charged to the player for each twenty-five cents (25¢) wagered by the player while participating in play covered under the terms of the contract. The contract further specifies that a player must participate in four hundred (400) game plays per hour in order to qualify for the one hundred ($100) refund rate and that the player has a remaining two (2) hours and thirty-four (34) minutes remaining under the contract. The record of the contract further specifies that the player has wagered a sum of three hundred and ninety-five dollars and fifty cents ($395.50) under the contract and received a sum of payouts equal to one hundred and eighty-one dollars and seventy-five cents ($181.75), which results in a loss to date of two hundred and thirteen dollars and seventy-five cents ($213.75).

To illustrate a usage of the purchased contracts database 1100, assume a player provided contract identifier "C-000001" to a gaming device and indicated a desire that play of the gaming device be covered under the terms of the contract (e.g., the player has indicated a desire to engage in contract play). It may be determined, based on the contract identifier, whether the contract has a period of time remaining prior to affirming to the player that the play of the gaming device will be covered under the terms of the contract. Further, the required rate of play that is a play requirement defined by the contract may be determined, and the player's play of the gaming device may be monitored to determine whether the player is complying with the required rate of play. It should be noted that the required rate of play may be a minimum rate of play, a maximum rate of play and/or a specific rate of play with which the player must comply.

VI. Contract Indicia

A. Contract Cards

Figure 12:
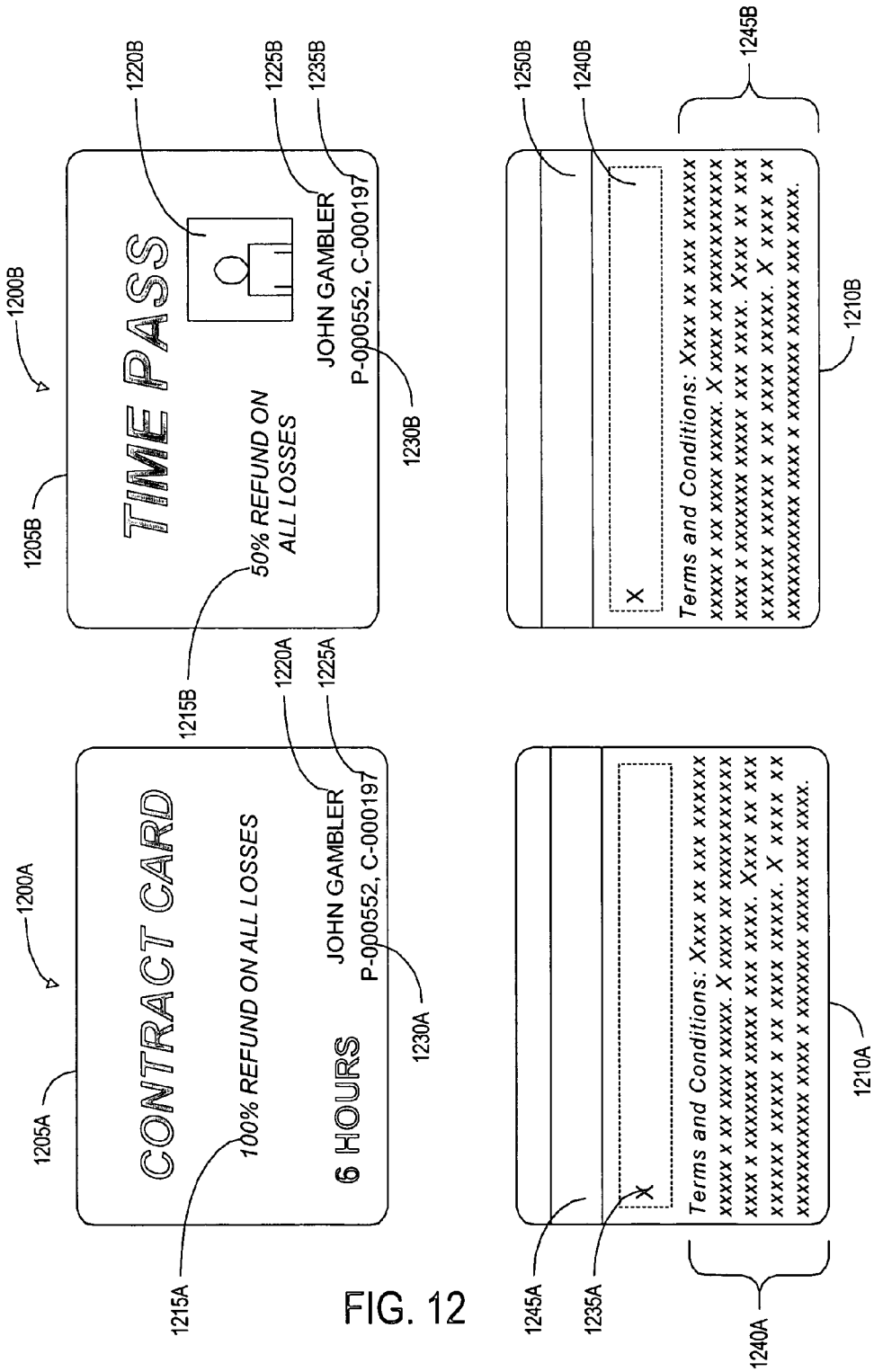
FIG. 12 is a table illustrating example contract cards, in accordance with one or more embodiments of the present invention.

Referring now to FIG. 12, illustrated therein are two example contract cards that may be provided to a player who enters into a contract in accordance with one or more embodiments described herein. As described herein, in some embodiments, a contract card may have a substantially similar physical appearance and functionality as to that of a player tracking card, although a contract card may be associated with a unique contract identifier instead of or in addition to a player identifier (e.g., such that data may be read from and/or written to a contract database regarding the contract and/or game play data associated therewith). As illustrated in FIG. 12, a contract card may comprise a magnetic stripe, which when read by a card reader device, may indicate a gaming contract identifier and/or a player identifier. A variety of methods of encoding contract cards with contract identifiers and other data are imagined. For example, in one embodiment, a contract card comprises a "smart card" or other device comprising a memory, such that gaming contract data may be stored on the smart card (e.g., a gaming device and/or controller transmits data to the smart card device via radio frequency transmission). In another embodiment, a contract card may comprise a cashless gaming ticket (e.g., the barcode thereof may be read so as to determine a contract identifier).

In other embodiments, a player may not be provided with a contract card, but a controller may determine that one or more game plays should be monitored pursuant to contract play in some other manner. For example, in one embodiment, a player may be provided with a code. The player may then enter the code using an input device of a gaming device (e.g., a player enters a gaming contract identifier using a touch-sensitive display screen). In another embodiment, a player may be instructed to actuate one or more input devices of a gaming device in a specific sequence and/or for a particular period of time (e.g., "To initiate Contract Play, press and hold both the "Spin" button and the "Paytable" button for five seconds). In one or more embodiments, a player identifier may be received so as to signal contract play. Various methods of receiving player identifiers are contemplated. In one embodiment, a player may use a player tracking card in lieu of a contract card (e.g., such game play data may be monitored and then stored in a player database, as opposed to a contract database). In another embodiment, a player may be identified by biometric means (e.g., via a retina recognition device).

Turning now to the first example contract card 1200A, a front view 1205A and a back view 1210A of the contract card are illustrated. The front of the contract card 1200A includes a description of the benefit defined by the contract card (1215A), the name of the player associated with the contract card (1220A), the contract identifier uniquely identifying the contract of the contract card (1225A), the player identifier of the player associated with the contract card (1230A) and an indication of the period of time defined by the contract (1235A). The back of the contract card 1200A includes a magnetic stripe 1245A, as well as an area for the signature of the player associated with the contract card (1235A), and a description of the terms and conditions associated with the contract (1240A). The terms and conditions may describe, for example, any restrictions by which the player must abide in order to earn or otherwise qualify for the benefit defined by the contract. In another embodiment, the terms and conditions may pertain to the proper use of the contract card, irrespective of the terms of the contract associated with the card (e.g., the contract card may only properly be used by the player who rightfully purchased or otherwise entered into the contract associated with the card, etc.).

It should be noted that a player associated with a contract card may comprise a player who purchased or otherwise entered into the contract corresponding to the contract card.

Turning now to the second example card 1200B, the front view 1205B includes features substantially similar to those of example contract card 1200A: (i) a description of the benefit defined by the contract associated with the contract card (1215B), (ii) a name of the player associated with the contract card (1225B), (iii) a player identifier identifying the player associated with the contract card (1230B), and (iv) a contract identifier that uniquely identifies the contract associated with the contract card (1235B). In addition, the front 1205B of the contract card 1200B includes a photograph of the player associated with the contract card (1220B), which may be useful for security purposes (e.g., to ensure that the bearer of the contract card is the player who purchased or otherwise entered into the contract associated with the contract card).

The back 1210B of the example contract card 1200B includes features substantially similar to those of the back 1210A of example contract card 1200A: (i) a magnetic stripe 1250B, (ii) an area for a signature of a player associated with the contract card (1240B), and (iii) a description of the terms and conditions associated with the contract card (1245B).

B. Contract Receipt

Figure 13:
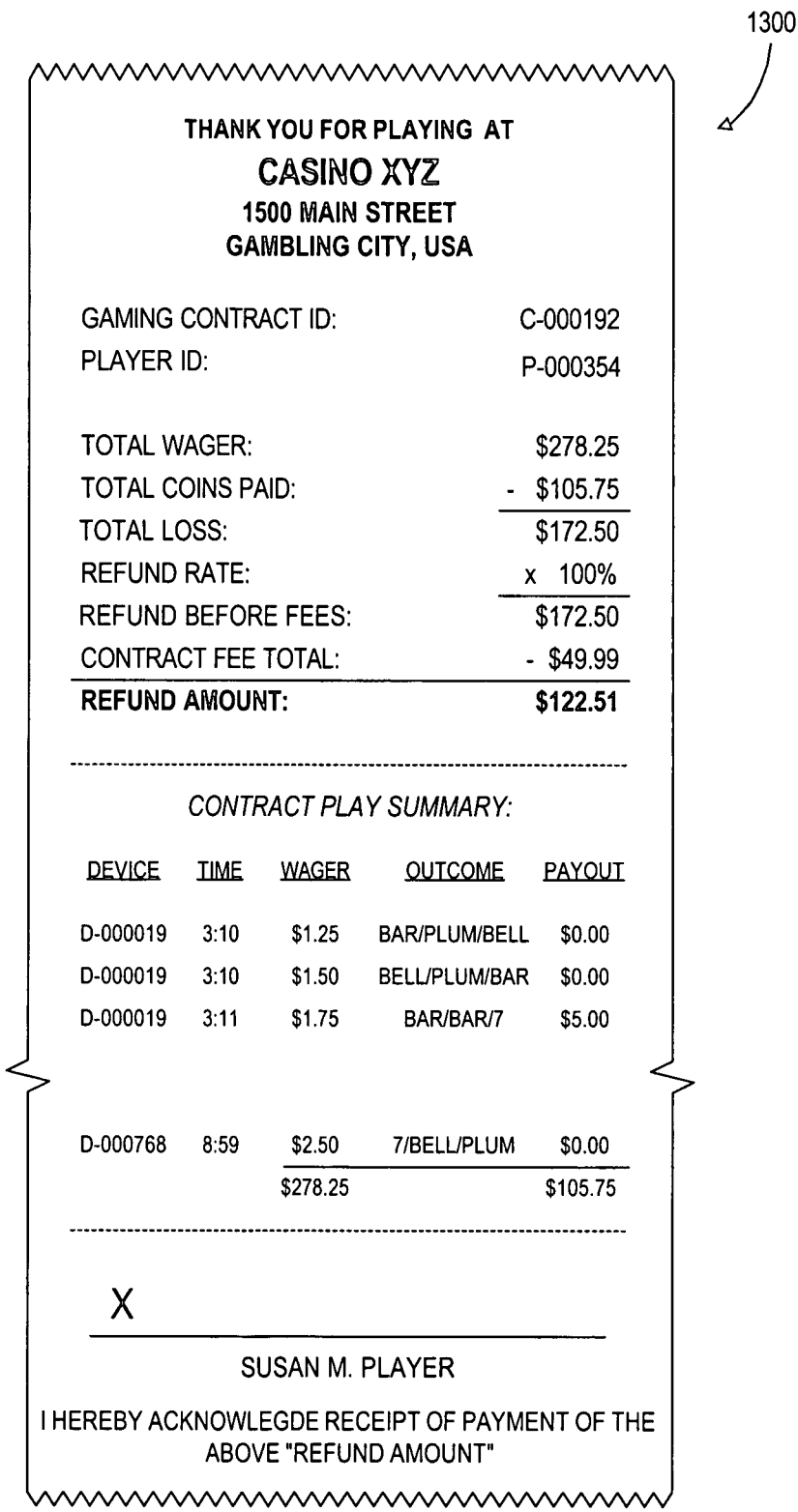
FIG. 13 is an example contract receipt, in accordance with one or more embodiments of the present invention.

Referring now to FIG. 13, illustrated therein is an example of a contract receipt that may be provided to a player upon an end of a contract, which receipt the player may use to obtain the benefit defined by the contract. A contract may be considered to end, for example, (i) upon the occurrence of a period of time defined by the contract (e.g., a player plays the one hundredth (100th) game play of the one hundred (100) game plays defined by a contract, a player completes the second (2nd) hour of play of the two (2) hours defined by a contract);

(ii) upon a player completing all play requirements defined by a contract in a satisfactory manner (e.g., a player completes five hundred (500) game plays at a designated gaming device while maintaining a minimum required rate of play of three hundred (300) game plays per hour);

(iii) upon a player earning or otherwise qualifying for a benefit defined by a contract (e.g., a player has incurred at least one hundred dollars ($100) in losses within one (1) hour); and/or (iv) upon an occurrence of another designated event (e.g., the current time is 8:00 pm on Jul. 1, 2005, which is the expiration time of a contract; the player collects one hundred (100) "lemon" symbols through play of a slot machine game, and thus the contract ends; and so on).

It should be noted that a contract that has ended may not necessarily have been satisfactorily completed such that a player is necessarily entitled to a benefit defined by the contract. For example, upon determining that a contract has ended, casino personnel and/or a device (e.g., computer 110, contract kiosk 140, etc.) may perform a distinct determination of whether the player has complied with the terms of the contract and is thus entitled to a benefit defined by the contract.

Of course, as described herein, in some embodiments a benefit may be provided to a player under the terms of the contract during the duration of the contract and before an end of the contract. For example, the player may be provided with access to a feature of a gaming device and/or allowed to continue playing the gaming device (and receiving payouts for winning outcomes) even if the credit meter balance of the gaming device is depleted, while executing game plays covered under the contract and before an end of the contract.

Returning again to FIG. 13, in one embodiment a gaming device 130, contract kiosk 140, casino personnel device and/or another device may be operable to print a contract receipt for a player once a contract is complete. The receipt may entitle the player to a benefit defined by the contract (e.g., a monetary amount based on a refund of at least a portion of losses incurred by the player as a result of participating in game plays under the contract). For example, the player may present the receipt to casino personnel at a casino cage or to a contract kiosk 130 in order to receive the benefit. In one embodiment, the receipt may include machine readable indicia (e.g., a bar code) that instructs a device (e.g., a contract kiosk 130) to provide the specified benefit to the player.

In one example, a player may have purchased a contract with an associated refund rate of one hundred percent (100%) and contract fee of one cent (1¢) per twenty-five cents (25¢) wagered. After a contract period concludes, the player may have accumulated one hundred and thirty-five dollars and eighty-seven cents ($135.87) in losses and thirteen dollars and seventeen cents ($13.17) in contract fees. This information may be, for example, monitored and tracked by computer 110 as the player plays one or more gaming devices 130. Accordingly, as the player is owed a refund, the player may approach a casino representative stationed at a location within the casino. The player may provide his contract card to the representative, such that she may access contract data (e.g., the representative enters a contract identifier using a keypad of a computer device in communication with one or more databases of the present invention). It may then be determined (e.g., based on the information monitored, tracked and stored by computer 110) that the player is owed one hundred and twenty-two dollars and seventy cents ($122.70) (e.g., the refund amount of one hundred and thirty-five dollars and eighty-seven cents ($135.87), minus the thirteen dollars and seventeen cents ($13.17) in contract fees). The representative may then pay the player with cash in the appropriate amount. In one embodiment, the player may be provided with a physical "contract receipt" (e.g., in addition to or in lieu of being provided with the cash). If the receipt is provided in lieu of cash, the receipt may be exchangeable for the appropriate amount of cash at an appropriate casino counter, at a contract kiosk 140 or via another means. The contract receipt may comprise, for example, a sheet of printed paper, an exemplary illustration of which is depicted by FIG. 13.

A contract receipt, as illustrated in the example of FIG. 13, may include, for example, (i) an indication of the casino or other entity that entered into the contract with the player (1305);

(ii) a contract identifier and/or player identifier (1310);

(iii) a win and/or loss amount associated with the contract (1315) that may be calculated, for example, by subtracting the amount of coins wagered by the player (1320) from the amount of coins paid to the player (1325);

(iv) an indication of a refund rate (1330) or other benefit defined by the contract;

(v) an indication of a gross value of the benefit earned by the player as a result of the contract, such as the gross amount to be refunded to the player (1335);

(vi) an indication of contract fees or other fees (e.g., taxes) to be subtracted from the gross value of the benefit earned by the player as a result of the contract (1340);

(vii) an indication of the net value of the benefit earned by the player as a result of the contract, such as the net amount to be refunded to the player (1345), which net value may be calculated by deducting any applicable fees from the gross value of the benefit;

(viii) a summary of the play that was covered under the contract (1350), which may be a summary of all game plays that contributed to the determination of the gross value of the benefit earned by the player as a result of the contract; and (ix) an area for the signature of the player associated with the contract (1355).

It should be noted that in some embodiments a player may be provided a monetary amount that is a benefit earned by the player as a result of a contract by having the amount credited to an account associated with the player (e.g., a credit card account, a debit card account, a casino-maintained account, etc.). In such embodiments, a contract receipt may include an indication of the account to which the monetary amount was added.

In some embodiments, a contract receipt may not comprise a physical contract receipt. For example, in one embodiment, text and/or graphics representative of a contract receipt may alternately or additionally be output by a display screen of a kiosk.

In one embodiment, a contract receipt may be provided to a player before completion of a contract. For example, if a player terminates play of a gaming device before completion of a contract, the gaming device or another device may print a receipt for the player that is readable by another device and that allows the other device to read or derive information about the player's contract (e.g., how many game plays and/or time the player is entitled to under the contract, etc.).

VII. Processes

Figure 14:
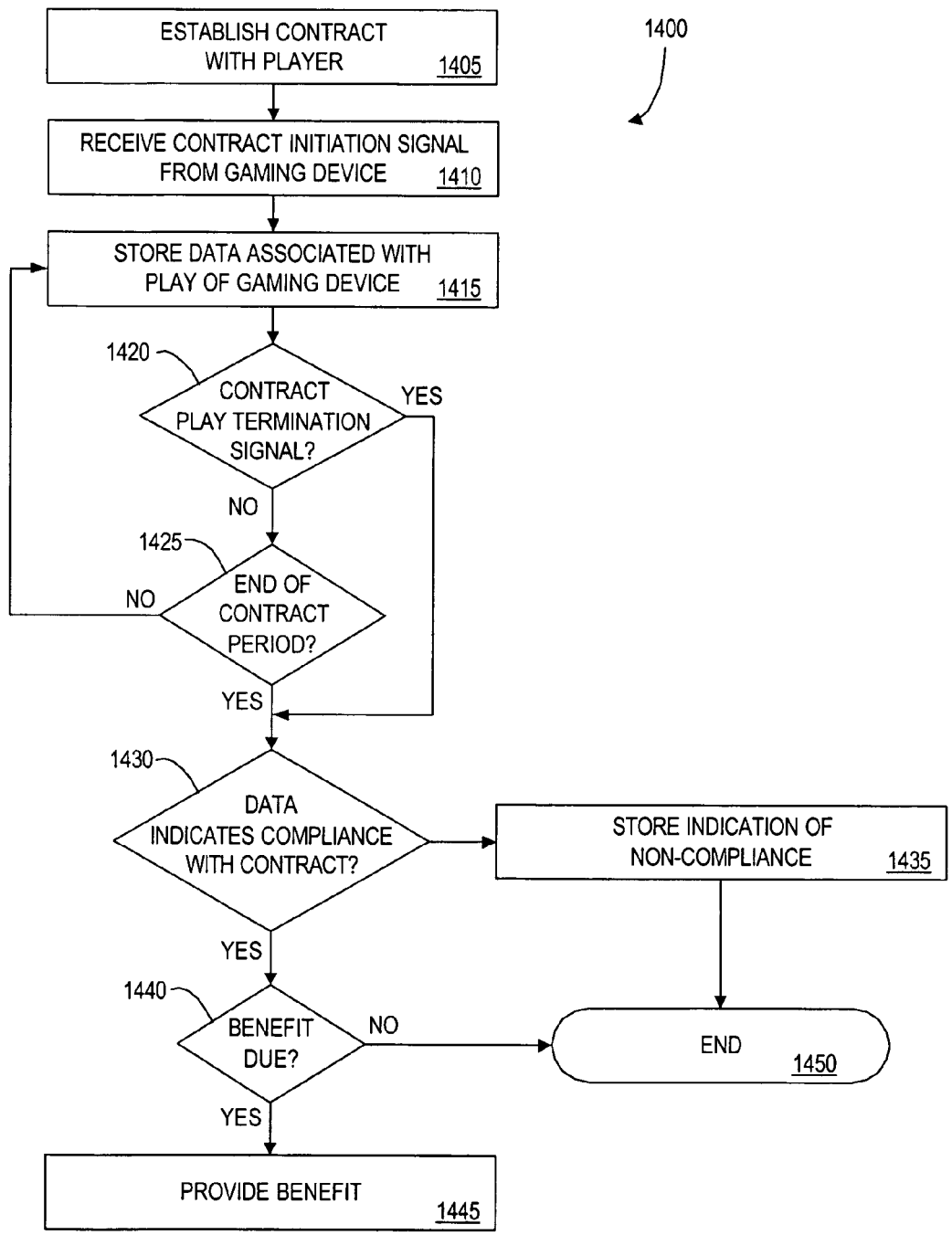
FIG. 14 is a flowchart illustrating an example process, in accordance with one or more embodiments of the present invention.
Figure 15:
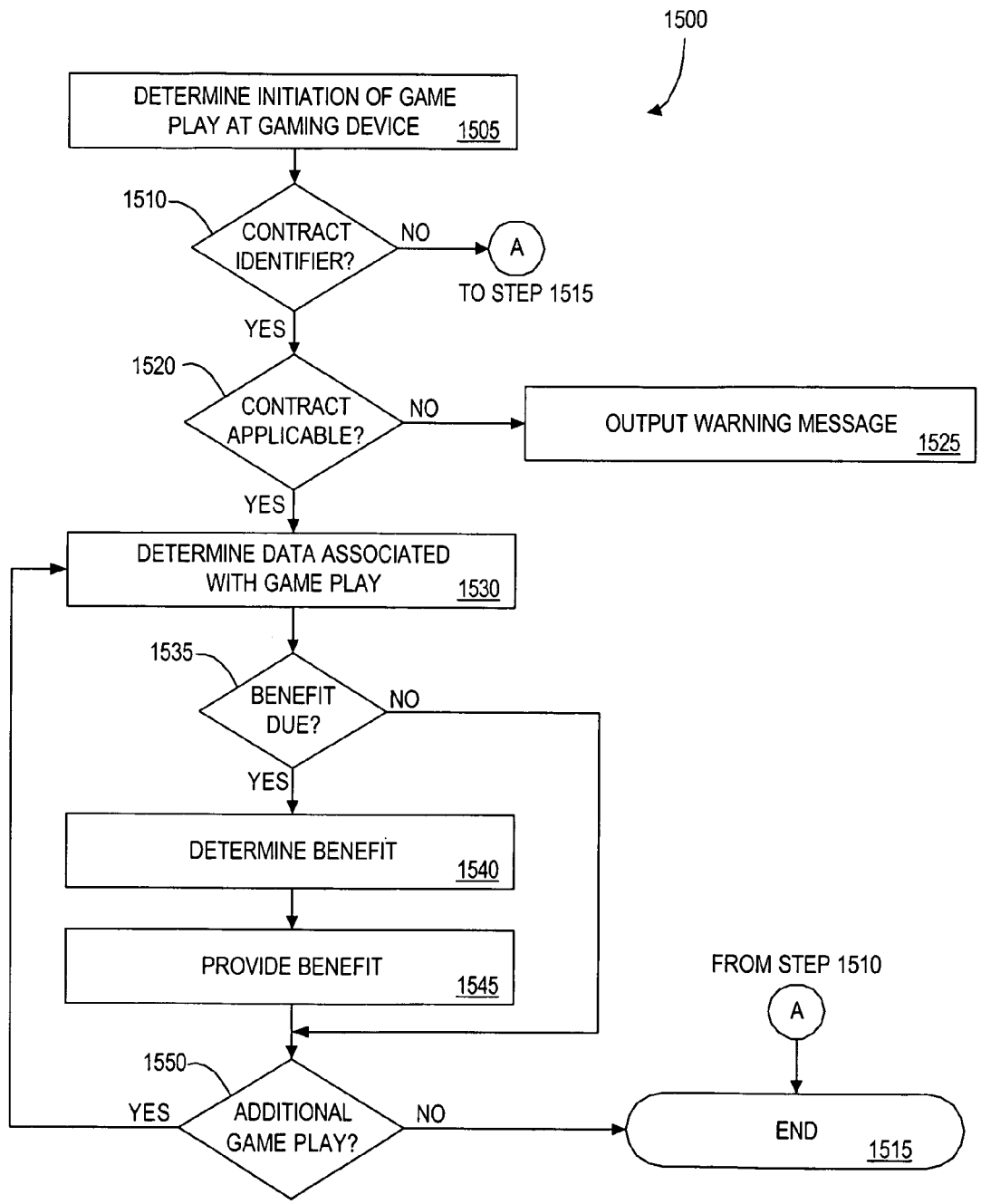
FIG. 15 is a flowchart illustrating an example process, in accordance with one or more embodiments of the present invention.
Figure 16:
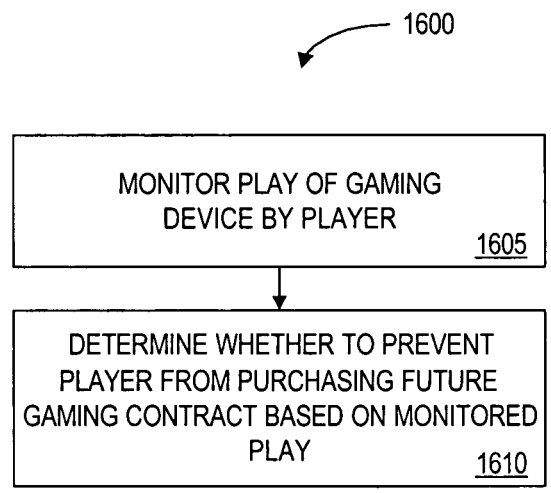
FIG. 16 is a flowchart illustrating an example process, in accordance with one or more embodiments of the present invention.

FIG. 14, FIG. 15, and FIG. 16 are flow charts of respective exemplary processes 1400, 1500 and 1600 that may be practiced via, for example, system 100 (FIG. 1). Any and all of the processes of FIG. 14, FIG. 15, and/or FIG. 16 (or any portion of any such process) may be embodied within computer program code of one or more programs described herein and may comprise a computer program product.

The processes described herein, and variations thereof that will be apparent from the disclosure herein, may be performed, for example, as a result of operation of the processor 205 of the computer 200, processor 305 of gaming device 300, a processor of a contract kiosk 140, a processor of a contract server, a processor of another device and/or a combination of any of the aforementioned processes (e.g. working in series, parallel, cooperatively, or otherwise in combination).

Except where impractical, it is contemplated that in one embodiment the processes and/or methods described herein and/or illustrated in FIG. 14, FIG. 15, and/or FIG. 16 may be performed by a computer 110 interactive with one or more gaming devices 130 and/or one or more kiosks 140. It is also contemplated that the method or methods of the present invention may be performed on a stand-alone gaming device.

Referring now to FIG. 14, process 1400 begins with step 1405, in which a contract is established with a player. Establishing a contract may comprise, for example, entering into a commitment with a player, in which commitment it is promised that a benefit defined by the contract will be provided to the player if the player complies with the terms of the contract. It should be understood that establishing a contract with a player includes determining that a player has purchased or otherwise entered into a contract (e.g., via a contract kiosk 140, via a gaming device 130, via a casino employee, etc.).

It should further be noted that process 1400, as any process described herein, need not necessarily be performed all at one time (i.e., a step of the process need not begin immediately after a preceding step has been completed). In some embodiments, a significant amount of time (e.g., minutes, hours, days, week, etc.) may pass between steps. For example, in one embodiment step 1405 (determining that a contract has been established) may be performed at a first time and step 1410 (determining contract initiation signal from gaming device) may be performed several hours or days later).

A contract may be established in a variety of manners and via a variety of entities. As described, various process steps of embodiments described herein (including embodiments in which a contract is established with a player) may be performed by one or more of a variety of entities, including a computer 110, a gaming device 130, a contract kiosk 140, casino personnel, etc.

In some embodiments, a player may indicate a desire to enter into or establish a contract. For example, a player may approach a casino representative in the interest of establishing a contract. In a more specific example, in one embodiment a booth or other location within casino premises may be dedicated to selling, establishing, and/or administering contracts, and may be staffed with personnel and casino personnel devices accordingly (e.g., a desk behind which staff operate computer terminals, such that requests to purchase contracts may be received). In another embodiment, a player may approach a "mobile" casino representative to establish a contract (e.g., a casino "floor representative" may be given a PDA or other handheld computing device, which may communicate with any of the devices/computers described herein such that a request to provide a contract may be received). In other embodiments, a player may approach a "contract kiosk" and indicate an interest in establishing a contract (e.g., by actuating an input device of the kiosk, such as a graphic of a touch-sensitive display screen that reads "Press here to get your losses covered!"). In another embodiment, a player may establish a contract upon checking in to a hotel associated with a casino. In further embodiments, a player may request to establish a contract by dialing a particular phone number and accessing an IVRU (e.g., a tent-card advertisement placed on top of a slot machine reads, "Dial 1-888-CONTRACT" and get 50% of your gambling losses covered—FREE!", such that the player dials the phone number, listens to a menu of options, and selects an option to purchase a contract by pressing an appropriate button of a cellular phone keypad). In one embodiment, a player may indicate a desire to establish a contract by actuating an actuatable input device of a gaming device. In this manner, a request to establish a contract may be received by a system of the present invention in a variety of manners.

As described, in one embodiment all or some available contracts may only be available to some players. For example, only certain players may be eligible to establish a particular contract or any contract at all (e.g., based on a characteristic associated with the player). Accordingly, in some embodiments the step of establishing a contract may comprise reviewing player data to determine player eligibility for establishing a contract. For example, in one embodiment, only players characterized by certain data may establish a contract (e.g., only registered hotel guests). Further, in some embodiments, players associated with certain player data may receive only certain contract terms (e.g., "high rollers" may be eligible to receive a higher percentage refund of gambling losses, longer contract periods, and so on) and/or may only be eligible for certain contracts but not others. It should be noted that, in an embodiment in which it is being determined whether a player is eligible to enter into a particular contract, the identifier of the contract and/or the terms of the contract may first be determined, prior to determining the player's eligibility to enter into the contract.

In some embodiments, a player database (e.g., a player database as illustrated in FIG. 4A and FIG. 4B) may be accessed in accordance with a particular player identifier or player name (e.g., a casino representative keys-in a player name, swipes a player tracking card through a card-reader device in communication with a casino personnel device, etc.) so as to determine player eligibility. Data stored within a player database may then be used to determine whether or not a particular player (i) is a registered hotel guest, (ii) has wagered a certain amount of money over the course of one or more trips to a casino, (iii) has generated a certain amount of "theoretical win" for the casino (e.g., which may be determined by multiplying a total amount wagered by a "house edge" metric of, e.g., nine percent (9%)), (iv) has generated a certain amount of actual winnings or losses over the course of one or more trips to the casino, (v) is associated with any active contracts, (vi) has completed (e.g., successfully) a contracts in the past, (vii) has registered for a casino "player account" membership (e.g., signed up for a player tracking card) perhaps on or before a certain date, and/or (vii) otherwise is eligible to establish a contract.

As described with reference to FIG. 4A and FIG. 4B (player database 400), player data may be collected and/or stored in a variety of manners. For example, a player may have previously registered for a player tracking card. Thus, various game play data (e.g., payout data, win/loss data, wager data, etc.) may have been tracked and stored in association with a player identifier as is known in the art. It should be noted that, in some embodiments, a player may not have previously registered for a player tracking card or registered as a casino hotel guest. Accordingly, a player database may contain no data stored with reference to the player (e.g., a casino representative uses a computer of the present invention to search for the player's name, but no record is revealed). In some embodiments, a player having no record or account may not be eligible to establish a contract or may only be eligible to establish a particular contract(s) and/or contract(s) with particular terms. In one such embodiment, a player may be offered an opportunity to establish a player record or account. For example, the player may be presented with an opportunity sign up for a player tracking card (e.g., open a player account). In another example, a player may receive a "guest pass" in exchange for performing a particular task (e.g., filling out a survey, eating at a casino-maintained restaurant, etc.); such a guest pass may then permit the player to establish a contract, a particular contract and/or a contract defining particular terms. In other embodiments, a player having no record may receive a contract characterized by only certain contract terms.

As described, player eligibility to establish a contract may be determined based on the player data associated with the player. For example, a player eligibility rules database (such as the exemplary player eligibility rules database 500 depicted in FIG. 5) may be accessed and one or more rules stored therein may be applied to determine the player's eligibility to enter into a contract, based on the player data associated with the player in conjunction with the one or more rules. For example, a rule may indicate that if a player is associated with an active contract, the player may not establish a second contract (e.g., as specified by rule "R-002" of the player eligibility database 500 (record R500-2)). In another example, a rule may indicate that if a player has generated more than ten thousand dollars ($10,000) in theoretical win, the player may establish any contract (e.g., a contract with any terms that the player desires; as specified by rule "R-003" of player eligibility rules database 500 (record R500-3)). In yet another example, a rule may indicate that if a player had not registered for a player tracking card before a particular date, the player may only be eligible to establish a contract with an associated refund rate of less than fifty-one percent (51%) (e.g., as specified by rule "R-004" of the player eligibility rules database 500 (record R500-4)).

As also described, in one embodiment establishing a contract may include determining an eligibility of one or more gaming devices for facilitating game plays that are covered under the contract. A gaming device being eligible for contract play may comprise, for example, the gaming device being authorized, approved, operable and/or available to facilitate game plays that, when participated in by a player who has established a contract, aid the player in earning or otherwise qualifying for a benefit defined by the contract (e.g., "count" as game plays covered under the contract).

A determination of whether a gaming device or type of gaming device is eligible for contract play (or a determination of which gaming devices or gaming device types are eligible for contract play) may be performed at one or more times, as deemed appropriate and desirable. In one embodiment, before a contract is established with a player, it may be determined whether or not a particular gaming device or type of device is permitted for contract play (e.g., this may be particularly useful in a scenario in which a player requests a contract to be executed on a particular gaming device or type of gaming device). For example, the determination may be performed after a player requests to establish a contract but prior to establishing the contract with the player. In another embodiment, the determination may be performed before a player ever requests to enter into a contract. The determination of gaming device eligibility may be helpful in order to inform a player, prior to the player establishing a contract, as to which gaming devices and/or types of gaming devices the player may play in order to earn or otherwise qualify for a benefit under the contract.

It should be noted that in some embodiments available contracts may be pre-packaged and displayed on a menu of available contracts to a player, as described herein. In such embodiments, the determination of whether a particular gaming device and/or particular type of gaming device is eligible for facilitating game play under a contract (e.g., whether play of the gaming device will aid a player in earning or otherwise qualifying for a benefit defined by the contract) may be performed at a time the contract is being defined and prior to a time at which a player is requesting to establish a contract. For example, a casino or other entity defining a contract to be included on a menu of available contracts may define, as one of the terms of the contract, the gaming devices and/or types of gaming devices the play of which will comply with the terms of the contract. This determination may be made, for example, based on some of the considerations described below. Accordingly, in such pre-packaged contract embodiments, upon a time of a player attempting to establish a contract, there may be no need to determine gaming device eligibility or the determination of gaming device eligibility may simply comprise retrieving the previously made decision as to which gaming device and/or types of gaming devices are eligible for play under the contract.

In some embodiments, it may be beneficial to restrict certain gaming devices or gaming device types characterized by certain attributes from a contract. Restricting a gaming device or type of gaming device from contract play may comprise rendering the gaming device unauthorized, unapproved, inoperable and/or unavailable to facilitate game plays that, when participated in by a player who has established a contract, aid the player in earning or otherwise qualifying for a benefit defined by the contract (e.g., the game plays do not "count" as game plays covered under the contract). A gaming device or gaming device type may be restricted from all contract play in general and/or from contract play under one or more particular contracts. A gaming device or gaming device type that is restricted from contract play may be flagged as such in a database, associated with a restricted status in a memory of a device (e.g., a memory of a kiosk 140 or computer 110) and/or may display or otherwise output an indication of its restricted status (e.g., to all players or to players who attempt to initiate contract play on the gaming device). In one embodiment, an indication of which gaming device(s) and/or gaming device type(s) are restricted from contract play may be output to a player considering a purchase of a contract. For example, such an indication may be output via a display screen of a device via which the player is purchasing the contract, printed on a receipt provided as a proof of a purchase of a contract, printed on a contract card, or otherwise provided to a player who has purchased or otherwise entered into a contract. In some embodiments, a gaming device itself may output an indication of whether the gaming device is restricted from contract play (e.g., an LED is lit, a sound is emitted, and so on). An indication of which gaming device(s) and/or gaming device type(s) are eligible for contract play may be output in similar manners.

It should be noted that whether a particular gaming device or gaming device type is restricted or eligible for contract play may change during a period defined by a contract. For example, a particular gaming device may be restricted from contract play at a time a player enters into a contract but may become eligible for contract play while the contract is active and before the contract ends.

Various characteristics or attributes may be considered when determining whether a gaming device and/or gaming device type is eligible for contract play. In one or more embodiments, a gaming device may be restricted from contract play (i.e., a player would not earn or qualify for a benefit defined by the corresponding contract by playing the gaming device) if a standard deviation metric associated with the gaming device is too high. In some embodiments, a standard deviation metric associated with a gaming device may be determined by the following calculation:

Let x be a random variable that can take on experimental values of x1, x2, . . . xn, with corresponding probabilities p1, p2, . . . pn. For example, x may represent a model of a game play of a gaming device. The experimental values would be payouts, such as negative one (−1), one (1), five (5), one hundred (100), and so on. The probabilities would be the probabilities of the corresponding payouts occurring. For example, the payout "−1" might occur with probability of nine tenths (0.9). The expectation of x is denoted E[x]. The expectation of x, which may also be known as the mean, or average, is defined as $$E[x] = p1*x1 + p2*x2 + \ldots + pn*xn$$

$$= \Sigma k=1 \ldots np_k x_k$$

The variance of x is denoted σx2. The variance is defined as $$\sigma x2 = p1*(x1-E[x])2 + p2*(x2-E[x])2 + \ldots pn*(xn-E[x])2$$

$$= \Sigma k=1 \ldots npk*(xk-E[x])2$$

Thus, the standard deviation metric associated with the gaming device, σx, is the square root of the variance.

In other embodiments, a gaming device may be restricted from contract play if it is characterized by a relatively high payback percentage. In some embodiments, a gaming device payback percentage may be determined based on a house edge metric. For example, a gaming device that statistically retains nine cents (9¢) of every dollar wagered for the house (i.e., a house edge metric of nine one hundredths (0.09)) may be thought of as a "91% payback" device.

In further embodiments, a variety of other characteristics or attributes may be considered when determining gaming device eligibility for contract play. Such attributes include, but are not limited to: (i) the gaming device's manufacturer (e.g., the name of the company that manufactured and distributed the device), (ii) the gaming device's location on the casino floor (e.g., a device is in a particular room or part of a particular bank of devices), (iii) the gaming device's wager denomination (e.g., a five cent per line (5¢-per-line) slot machine may be allowed, but a twenty-five cent per line (25¢-per-line) slot machine may not), (iv) the number of paylines which may be activated during one game play, (v) the number of hands of poker which may be played during one game play, (vi) a "game type" associated with the gaming device (e.g., a "slot machine" may be allowed but a "video poker" machine may not, a "Double Gems Jackpots" game may not be eligible), (vii) the conditions under which the casino purchased or leased the gaming device (e.g., a "participation" gaming device for which casinos must pay another entity a percentage of the gaming device's win may not be eligible), (viii) the jackpot amount associated with the gaming device (e.g., the top payout amount associated with the gaming device; it should be noted that a "progressive" jackpot may have a variable value, which may be accumulated by setting aside a small fraction of each wager amount into a jackpot pool, as is known in the art), (ix) the time of day (e.g., certain gaming devices may only be eligible for contract play during certain "off-peak" times), (x) the average or maximum speed at which the gaming device is operable to conduct a game play, and so on.

In one embodiment, a gaming device database (such as that illustrated in FIG. 6) may store data which may be useful in determining an eligibility of a gaming device for contract play. For example, in one embodiment, a casino server (e.g., computer 110) may maintain a gaming device database which may store data associated with gaming devices and/or gaming device types currently positioned on casino premises. Thus, a gaming device eligibility rules database (such as that illustrated in FIG. 7) may be used in conjunction with a gaming device database to determine whether or not a gaming device type and/or gaming device is eligible for contract play.

For example, in one embodiment, any gaming device characterized by a "progressive" jackpot as indicated by a gaming device type database may not be eligible for contract play (i.e., rule "R-001" of gaming device eligibility rules database 700). In another embodiment, if a gaming device database indicates that a standard deviation metric associated with a gaming device is greater than a predetermined threshold amount (e.g., "6") the gaming device may not be eligible for contract play. In yet another example, a gaming device manufactured by a certain company may not be eligible for contract play (e.g., rule "R-00N" of gaming device eligibility database 700). As described, in some embodiments rules may be enabled or disabled as a casino operator or other entity finds desirable and/or appropriate (e.g., a gaming device eligibility rules database is updated to reflect which rules the casino desires to enable).

In one embodiment, a determination of whether to establish a contract with a player and/or a determination of eligibility of a gaming device and/or gaming device type for contract play may be based on a level of utilization of the gaming device and/or type of gaming device. Thus, in some embodiments, step 1405 may comprise determining a level utilization of a gaming device and/or type of gaming device. For example, in one embodiment, a gaming contract may only be provided if it is determined that there is sufficient capacity for contract play (e.g., enough slot machines located on the floor of a casino are not currently being utilized, such that adding another player to the floor for the duration of a particular contract period will not result in a shortfall of gaming device capacity that is deemed unacceptable by a casino). In one embodiment, gaming device utilization data may be stored in a database, such as the example gaming device status database 800 depicted in FIG. 8. For example, a gaming device database may indicate a status associated with a gaming device (e.g., identified by a unique gaming device identifier, such as "GD-000001"), which may describe whether the particular device is currently "in use" or "not in use."

A variety of methods of monitoring gaming devices to detect such utilization are contemplated (e.g., detecting game play activity, detecting the insertion of a player tracking card or contract card, detecting the presence of a player using a sensor device, monitoring gaming devices with video cameras, etc.). In some embodiments, a device (e.g., computer 110) may track gaming device utilization in a substantially automatic manner (e.g., computer 110 determines use of a gaming device and updates a status of the gaming device in the gaming device status database, as necessary or appropriate). In one embodiment, a percentage utilization metric may then be calculated with respect to all gaming devices within a casino (e.g., thirty-seven percent (37%) of all gaming devices are in use) or a percentage of gaming devices being associated with a particular characteristic (e.g., fifty-nine percent (59%) of all video poker machines are in use, etc.).

Accordingly, in some embodiments, a gaming contract may or may not be established depending on a determined percentage utilization metric (e.g., if a percentage utilization metric is above a certain threshold, no gaming contracts are to be provided). In another embodiment, a gaming contract may be established but a beginning time of the contract (e.g., a time at which a player may begin playing one or more gaming devices in order to earn or otherwise qualify for a benefit under the contract) may be deferred until a level of utilization is deemed to be acceptable.

In one embodiment, historic gaming device utilization data may be considered when determining whether or not a gaming contract is to be established and/or whether a beginning time of a contract is to be deferred. For example, it may be determined that, on average, gaming device utilization from 12 PM until 6 PM on Wednesdays has been twenty-three percent (23%) at Casino A.

In one embodiment, step 1405 may comprise determining one or more terms of a contract. Determining a term of a contract may comprise, for example, determining the nature of the term and determining a value for the term. For example, a nature of a term may be determining a period defined by a contract while determining the value for the term may comprise determining the actual value of the period (e.g., three hours, one hundred (100) game plays, until a payout of at least one thousand (1000) credits is won, until a loss of at least one hundred dollars ($100) is incurred etc.). In one embodiment (e.g., an embodiment in which a player selects a contract to enter into from a menu of available pre-packaged contract), the terms (and values thereof) of the contract may already be defined and step 1405 may simply comprise determining the previously defined terms. In one embodiment, a player may be allowed to customize a contract by changing a value of one or more terms or selecting all terms and values for the contract.

In one embodiment, once (i) a request to establish a gaming contract has been received from a player, (ii) the player's eligibility has been determined, (iii) eligible/ineligible gaming device types have been identified, and/or (iv) gaming device utilization has been determined, one or more terms of the contract may be determined before the contract is established with a player. A variety of example contract terms will now be described in further detail.

One example term of a contract is the benefit to be provided to the player if the player complies with other terms of the contract. The term defining the benefit may further define how a value of the benefit is to be determined (e.g., a formula based on which the value of the benefit is to be determined).

A benefit may comprise, for example, a refund amount. As described, in one or more embodiments a benefit defined by a contract may comprise a refund of at least a portion of the losses incurred by a player, or wagers posted by a player, for game plays covered under the contract. In some embodiments, a refund amount may be based on amount of losses incurred by a player or a sum of wagers posted by the player. In such embodiments, a refund rate may be defined by the contract, the refund rate comprising a percentage (e.g., one hundred percent (100%), seventy-five percent (75%), fifty percent (50%), etc.) of the losses incurred by the player or sum of wagers posted by the player that is to be paid to the player. Accordingly, a refund rate associated with a gaming contract may comprise a formula based on which a refund amount may be determined.

In one embodiment, a refund rate may be greater than one hundred percent (100%) (e.g., "We'll refund all your losses plus pay you 5%!"). In yet another embodiment, a contract may entitle a player to receive a payment based on a win amount (e.g., "Get double your winnings!").

In another embodiment, a refund amount may be a predetermined amount that is not based on losses incurred by the player or wagers posted by the player (e.g., if a player agrees to play twelve (12) hours of slots, the player receives a fifty dollar ($50) bonus payment at the conclusion of the contract). In one embodiment, a refund amount may be provided to a player at the end of a gaming contract.

In one embodiment, as described herein, a contract may define a benefit other than a refund amount. For example, a benefit may comprise access to a feature of the gaming device, a reduced maximum wager amount, a more favorable payout table and/or probability table, an ability to continue playing a gaming device once a credit meter balance is depleted, goods, services, and/or an increased rate of earning comp points, etc. As described, in one embodiment a benefit may be provided to a player during a period of time defined by a contract (e.g., so long as the player is complying with other terms, such as play requirements (described below) of the contract.

In one embodiment, a benefit may be provided only once under the terms of the contract (e.g., at the end of the contract). In another embodiment, a benefit may be provided to a player (i) a plurality of times (e.g., periodically, in response to a predetermined event, etc.) and/or (ii) continuously or substantially continuously (e.g., so long as the player is complying with the play requirements defined by the contract, the player enjoys an increased rate of earning comp points).

Another example of a term of a contract may be a contract fee. A contract fee may comprise, for example, a purchase price of a contract and/or consideration to be provided by the player in exchange for being entitled to earn or otherwise qualify for the benefit defined by the contract. A contract fee may be required to be provided at the time the player enters into the contract, to be provided (e.g., in increments or based on another basis) during a period of time defined by the contract, at the end of a contract, or another time, as appropriate and/or desirable. As described herein, in various embodiments, a gaming contract may be provided only if a player (i) pays or agrees to pay a premium, fee or surcharge, which may be associated with one or more game plays and/or wager amounts, and/or (ii) agrees to a predetermined contract period.

Accordingly, in one example, a contract fee may comprise a flat fee associated with the contract (e.g., a player agrees to pay thirty dollars ($30) in exchange for the activation of a contract). In another example, a player may agree to pay an incremental fee, which may be based on (i) one or more game plays initiated during contract play (e.g., a player agrees to pay a fee of five cents (5¢) for each hand of video poker played during the contract period), and/or (ii) one or more wager amounts provided during contract play (e.g., a player agrees to pay one cent (1¢) for every twenty-five cents (25¢) wagered during the contract period). Again, a contract fee may be paid (i) before a gaming contract is provided (e.g., a player pre-pays a flat thirty dollar ($30) contract fee); (ii) during a contract period (e.g., a player establishes a debit account with a casino, such that the debit account is deducted by an incremental fee amount in accordance with each game play); (iii) after a contract period concludes (e.g., a player provides a credit card before a gaming contract is activated, but the card is not charged until contract play concludes and the contract is reconciled); and/or (iv) at another time.

As stated, in some embodiments, a player may agree to a predetermined contract period in lieu of, or in addition to, a monetary fee. A player may thus provide consideration other than money in exchange for being entitled to earn or otherwise qualify for a benefit defined by the contract. For example, a player may agree to twelve (12) hours of slot machine play in exchange for a contract offering a on hundred percent (100%) refund of all losses at a premium of one cent (1¢) per every twenty-five cents (25¢) wagered. In another example, a player may agree to six (6) hours of slot play in exchange for a contract offering a fifty percent (50%) refund of all losses with no associated contract fee. It should be noted that a casino may agree to such an arrangement, whereby a player agrees to an amount or period of game play in addition or as an alternative to providing a contract fee, because a house edge metric associated with play of one or more gaming devices may provide a casino with a statistically predictable amount of profit should players play such devices for prolonged periods of time (e.g., even though a contract fee was not received, revenue may still be generated through players' repeated play of such devices).

In one embodiment, a contract fee for a particular contract may comprise a first fee for a first player and a second fee for a second player. For example, the first player may receive a reduced fee due to a favorable characteristic associated with the player (e.g., the player is a member of a loyalty club of the casino, the player is a frequent gambler, an average maximum wager amount associated with the player is at least a predetermined amount, the player is a hotel guest, etc.).

Another example of a term of a contract may comprise a period of time defined by a contract. The period of time may comprise, for example, a period of time during which the contract is active, a period of time during which game plays participated in by the player count towards the player earning or otherwise qualifying for a benefit defined by the contract, etc.

A period of time may comprise, for example, (i) a minimum period of time, (ii) a maximum period of time, (iii) a specific period of time, or (iv) a range of time. In one or more embodiments, a term of a contract may define when the period of time defined by the contract begins (e.g., upon purchase of the contract, at 2:00 PM, upon a player initiating a game play covered under the terms of the contract, etc.) and when it ends.

In some embodiments, a period of time defined by a contract may be defined in terms of one or more of (i) a predetermined, minimum, and/or maximum number of game plays, or (ii) an indeterminate number of game plays to be initiated within a predetermined, minimum or maximum period of time (e.g., one hour). Thus, in one example, a period of time defined by a contract may comprise five thousand (5,000) handle pulls of a slot machine (e.g., a player agrees to receive a fifty percent (50%) refund on all losses incurred at any eligible slot machine, so long as the player initiates five thousand (5,000) game plays in total). In another example, a period of time defined by a contract may comprise six hours (e.g., a player agrees to receive a seventy-five percent (75%) refund on all losses incurred during six hours of gaming device play). In a further example, a period of time defined by a contract may comprise a specific period of hours during one or more days (e.g., contract play comprises any game plays initiated between 8 AM and 1 PM on a particular day).

Another example of a term of a contract may comprise one or more play restrictions or play requirements. A play requirement and/or a play restriction may comprise a condition associated with play of one or more gaming devices that a player may be required to satisfy in order to earn or otherwise qualify for a benefit defined by a contract. A variety of play requirements and play restrictions are contemplated. In some embodiments, a play requirement of a contract may specify that a player must maintain a predefined rate of play while participating in game plays covered under the contract. For example, a player may receive a fifty-percent (50%) refund on any losses incurred during a six-hour contract period, so long as the player agrees to maintain a minimum rate of three game plays per minute. Methods and apparatus for determining a gaming device player's rate of play and providing a benefit based at least thereon are described in Applicant's issued U.S. Pat. No. 6,238,288, entitled "METHOD AND APPARATUS FOR DIRECTING A GAME IN ACCORDANCE WITH SPEED OF PLAY," filed Dec. 31, 1997, the rate of play and rate of play determination concepts and descriptions of which are hereby incorporated by reference herein.

In other embodiments, a play requirement may define a wager amount to be posted for a game play (e.g., in order for the game play to be covered under the contract and/or in order for the game play to "count" towards the player satisfying the contract). For example, a play requirement may specify (i) a particular wager amount that a player must post for a game play, (ii) a minimum wager amount that a player must post for a game play, and/or (iii) a maximum wager amount (e.g., an average wager amount calculated based on all game plays covered under the contract) that a player must post for a game play. For example, a play requirement may require a player to wager at least twenty-five cents (25¢) per game play of a slot machine. In another example, a play requirement may require a player to wager a maximum of seventy-five cents (75¢) per game play of a slot machine.

In further embodiments, a play requirement may specify a particular manner of game play. For example, a play requirement may specify one or more of (i) a number of slot machine paylines which a player must activate in accordance with each game play; (ii) a strategy which a player must employ for a game play; and/or (iii) a feature of a gaming device which a player must active during a game play. For example, a play restriction may indicate that a player must activate a maximum of three slot machine paylines in accordance with each game play initiated during contract play.

It should be understood that a play requirement may apply to all or a subset of game plays covered under a contract.

Accordingly, step 1405 (or another step of another process performed in accordance with embodiments of the present invention) may comprise determining one or more contract terms. In some embodiments (whether a contract is being pre-defined prior to any player requesting the contract or whether the contract is being defined for a particular player in response to the player's request for a contract (e.g., based on specifications input by the player)), one or more contract terms may be determined such that the establishment of the resultant contract defined by the terms may be profitable for a casino. As described, in one or more embodiments a casino may pre-define and make available one or more "pre-packaged" contracts that may then be marketed as products to prospective customers (e.g., signs positioned on a casino floor advertise: "100% CASH REFUND—Get all your losses back—Play 12 Hours of Slots During Your Trip—Just 1¢ per Spin!").

In one example, a casino (e.g., a casino-maintained computer system programmed to execute various processes of the present invention) may calculate that at a contract fee of one cent (1¢) per every twenty-five cents (25¢) wagered, a casino may stand to generate a profit even after reimbursing a player for one hundred percent (100%) of the player's losses, so long as the player plays at a reasonable rate of play (e.g., five hundred (500) game plays per hour) for a period of twelve (12) hours. Assuming the player wagers an average of seventy-five cents (75¢) per game play and a house edge metric of eight one hundredths (0.08) (e.g., gaming devices are programmed to statistically hold eight percent (8%) of coin-in for the house), it may be determined that, statistically, the player will generate one hundred and eighty dollars ($180) in contract fees and accumulate three hundred and sixty dollars ($360) in losses during the contract period. Accordingly, as the player will be refunded the three hundred and sixty dollars ($360) loss amount, the casino may generate one hundred and eighty dollars ($180) in profit from the gaming contract. It should be noted that though gaming devices may be programmed to statistically maintain a house edge, thereby generating an eight percent (8%) loss on average for players, some players may achieve a win amount as the result of contract play (such a win amount may have decrease casino profits). While there may be some players who will generate a win amount during a period of time defined by a contract, by requiring the period of time to be relatively long and/or to encompass a relatively large number of game plays, a casino may reduce the number of such winners.

It should also be noted that, in some embodiments, while such an amount of profit may be comparably less than would have been generated had the player played for twelve (12) hours without a contract (e.g., wherein the player's losses would have been held by the casino), the contract may be advantageous in that it may (i) motivate a player to play only at the gaming establishment wherein the player's losses are "covered," thereby decreasing the likelihood that the player will gamble at a competitor's property, (ii) motivate a player to gamble for longer periods of time, (iii) increase the likelihood that a gaming establishment will derive additional revenue from the player's patronage of non-gaming casino activities (e.g., eating at restaurants, attending shows), as the player is motivated to gamble only within the establishment that provided the contract, (iv) increase the likelihood that a player afraid of losing a large sum of money will gamble within a gaming establishment, as the cost of playing gaming devices may be considered fixed (e.g., a player may play five (5) hours of slot machines, with a chance to win a large jackpot, for only a flat cost of fifty dollars ($50)), and so on.

In another example of a contract that a casino or other entity may pre-define and market as a product to players, a gaming establishment may advertise that a player may receive a fifty percent (50%) refund on all losses incurred within a given time period (e.g., any game play between 6 AM and 1 PM) without paying any associated contract fee. Thus, a gaming establishment may benefit by maintaining fifty percent (50%) of the financial losses incurred by the player, as well as by ensuring that the player's business is captured for a period of several hours.

In yet another example of a contract that a casino or other entity may pre-define and market as a product to players, a contract may allow a player to pay an up-front contract fee of fifty dollars ($50) for a contract lasting a period of six hours. The contract may define a benefit comprising a one hundred percent (100%) refund of all losses incurred as a result of game plays completed during the period of time defined by the contract.

In yet another example of a contract that a casino or other entity may pre-define and market as a product to players, a contract may allow a player to pay an up-front contract fee of twenty dollars ($20) for a contract defining a period of time of one hour. The contract may define a benefit comprising a one hundred percent (100%) refund of all losses incurred as a result of game plays completed in accordance with the terms of the contract. The contract may further define a play requirement requiring the player to only use a particular type of gaming device (e.g., only Nickel FrenZy™ machines are eligible).

In yet another example of a contract that a casino or other entity may pre-define and market as a product to players, a contract may allow a player to provide a credit card when signing up for the contract, in exchange for which the player will be authorized to initiate one thousand (1,000) game plays (e.g., at twenty-five cents (25¢) per game play) on any eligible gaming device. The contract may define a benefit comprising a seventy-five percent (75%) refund of all losses incurred as a result of the one thousand (1,000) game plays. The contract may define a contract fee of sixty dollars ($60), to be charged to the provided credit card once a contract has ended. In one embodiment, the amount, if any, to be charged to the credit card at the end of the contract may be determined by subtracting the sixty dollars ($60) from a refund amount due to the player as a result of the losses incurred by the player.

Thus, as some pre-defined contracts may be associated with a variety of pre-defined contract terms (e.g., "Contract A" has a refund rate of one hundred percent (100%)), certain pre-defined contracts may be unavailable to players characterized by certain player data. For example, a player eligibility rule of a player eligibility rules database may indicate that a player who is not a registered hotel guest may not receive a contract with an associated refund rate of greater than seventy-five percent (75%). Accordingly, in some embodiments, a player requesting a contract defining a benefit of a refund rate greater than seventy-five percent (75%) may be denied an opportunity to establish the contract if the player is not a registered hotel guest. Alternately or additionally, in some embodiments, an identified player (e.g., a player inserting a player tracking card or providing a last name, such that player data may be accessed) requesting generally to establish a contract (e.g., a player selects "Show me Gaming Contracts"

or "I'd Like Loss Insurance" as an option of a menu output by a touch-screen kiosk or IVRU) may not receive the option of selecting certain contracts. For example, contracts which the player is not eligible to establish (e.g., contracts characterized by certain terms) may not be included in a menu of contracts output to the player. Alternatively, the contracts for which a player is not eligible may be "grayed out" or otherwise indicated as unavailable on a menu of contract output to the player.

In some embodiments, a player may request to receive a "custom gaming contract." For example, a player may desire to select or adjust one or more contract terms or values thereof (e.g., contract period, refund rate, etc.). In one such embodiment, various contract terms (and/or certain values of certain contract terms) may be made available to a player based on the player's eligibility (e.g., as determined by analyzing player data). Thus, in some embodiments, players characterized by certain data (e.g., players that have established long-standing player accounts, generated large amounts of theoretical win, etc.) may select certain contract terms or certain values of certain contract terms (e.g., higher refund rates, longer/shorter contract periods, fewer play requirements, lower contract fees, etc.) as indicated by player eligibility rules. For example, a player may approach a booth dedicated to administering contracts, and communicate verbally to a casino representative a desire to receive a custom contract. The casino representative may then, for example, use a computer device in communication with any or all of the databases described herein (e.g., a player database, a player eligibility rules database, a gaming device eligibility rules database, etc.) to determine which contract terms or which certain values of certain contract terms the player may be eligible to select.

It should be noted that, in some embodiments, a contract characterized by certain predetermined combinations of contract terms may not be offered or made available to any player. For example, no player may be offered or approved for a contract wherein the associated contract terms comprise the following combination: a refund rate of greater than seventy-five percent (75%), a contract fee of less than ten dollars ($10) and a period of time defined by the contract that is shorter than one hour or twenty-five (25) game plays. In another example, no player may be offered or approved for a contract that defines a minimum rate of play requirement of fewer than three hundred (300) game plays per hour. In yet another example, no player may be offered or approved for a contract wherein an associated contract term comprises a refund rate of greater than one hundred percent (100%). Such rules may be stored, read from and/or written to a database, such as the contract customization rules database 900 (FIG. 9). It should be noted that, in some embodiments, such rules may have the effect of establishing the boundaries of contracts, setting the boundaries for contract terms in order to exclude from approval contracts that will not result in an acceptable level of profit for a casino. Use of such a database, or a similar methodology, may help ensure that contracts with a low likelihood of generating a minimum acceptable level of profit for a casino and/or other entity may not be provided. As described previously, such rules may be enabled and/or disabled as desired and/or appropriate. In this manner, a player may identify, select and/or define a contract characterized by a number of contract terms and values thereof that are desirable to the player.

In some embodiments (e.g., before a customized contract is established or before any contract is established), step 1405 may comprise receiving a confirmation from a player that the player desires a contract characterized by indicated contract terms.

A confirmation may be received in a variety of manners. In one example, a player may actuate an input device of a kiosk or other electronic device (e.g., gaming device, PDA) so as to signal confirmation (e.g., the player actuates a "YES" graphic of a touch-sensitive display screen, above which text reads "By pressing YES below, I agree to pay $50 and receive a contract card. By inserting the contract card before I play a slot machine, I will receive a 100% refund of any losses incurred between 11 AM and 5 PM today"). In another example, a player may signal confirmation verbally (e.g., by speaking to a casino representative, saying "YES" when prompted by an IVRU, etc.). In yet another example, a player may signal confirmation by actuating an appropriate button of a telephone, as prompted by an IVRU (e.g., "If you would like to purchase this contract, press 1"). In yet another example, a player may signal confirmation by signing or initialing a physical contract agreement form (e.g., a paper form which describes contract terms and includes an area for receiving a signature).

Additionally, in some embodiments, step 1405 (or another process consistent with embodiments of the present invention) may comprise receiving a contract fee or portion thereof, such that establishing a contract may comprise receiving the contract fee or a commitment to the contract fee. In one embodiment, establishing a contract may comprise determining that a contract fee has been received and/or determining that a commitment to a contract fee has been received. In one example, a player may tender a cash payment (e.g., a player provides cash to a casino representative, a player inserts cash into a bill acceptor of a kiosk, etc.). In other embodiments, a player may provide a credit card, which may be billed immediately. In further embodiments, a contract fee associated with a contract may be added as a charge to a hotel bill associated with a player.

As described, in some embodiments, step 1405 may comprise receiving a commitment from a player to pay a contract fee at a later time and/or determining that a player has provided a commitment to pay a contract fee at a later time. For example, in one embodiment, before a contract is activated (e.g., before a player is authorized to participate in play in order to earn or otherwise qualify for a benefit defined by a contract), a player may provide a credit card and sign a contract agreement form describing contract terms, one of which is an incremental contract fee of one cent (1¢) for every twenty-five cents (25¢) wagered. Thus, at the end of the contract period, if the player wagered a total of two hundred and forty-seven dollars and twenty-five cents ($247.25), the player's credit card may be charged nine dollars and eighty-nine cents ($9.89). In some embodiments, a player may provide a credit card before activating a contract, and a preauthorization process may "freeze" an amount of credit in association with the provision of the contract, such that a gaming establishment or other entity may charge up to the frozen amount of credit upon reconciliation of the contract. In other embodiments, a player may establish a debit account before receiving a contract. For example, a player may provide fifty dollars ($50), which may be established as a balance of a financial account associated with the player (e.g., associated with a player identifier and/or contract identifier). Thus, should the player accrue any incremental contract fees during contract play (e.g., a fee of five cents (5¢) per every three game plays), the account balance may be decremented accordingly.

A contract may be established in step 1405 upon a player selecting and/or customizing a contract that the player is eligible to enter into and upon the player providing (or committing to provide at a future time) a contract fee associated with a contract. In some embodiments, establishing a contract may comprise associating a contract identifier with a type of contract and/or a player identifier (e.g., a new record is established in a purchased contracts database, such as the example one illustrated in FIG. 11). Thus, in some embodiments, a player may be provided with a contract identifier upon a contract being established with the player. In some embodiments, a player may use a contract identifier so as to signal that one or more game plays should be monitored pursuant to contract play (e.g., a player provides a contract identifier before initiating play of a gaming device, such that all subsequent game play data may be stored in association with a particular gaming contract).

Referring now to step 1410, a contract initiation signal is received from a gaming device (e.g., by a device monitoring play of the gaming device, in order to monitor, analyze and/or store game play data associated with a contract, for purposes of calculating and/or providing a benefit defined by the contract). A contract initiation signal may comprise, for example, an indication that play of a gaming device has been initiated, which play is associated with a contract. For example, the signal may indicate that one or more game plays to be initiated after the contract initiation signal are covered by a contract or may potentially be covered by a contract (e.g., such that a player's participation in the game plays may aid the player in earning or otherwise qualifying for a benefit defined by the contract associated with the contract initiation signal). In one embodiment, a contract initiation signal includes a contract identifier.

In one example, step 1410 may comprise monitoring a gaming device to determine whether contract play has been initiated on the gaming device. This may be done in lieu of, or in addition to, receiving a contract initiation signal. For example, a device (e.g., computer 110) may monitor a state of a gaming device to determine whether a contract identifier, or other indicator associated with a contract, has been input to the gaming device in a manner that may be interpreted as an initiation of contract play on the gaming device. This determination may comprise, for example, whether an initiation for contract play has been requested at a gaming device (e.g., that a player has inserted a contract or other identifier as an indication that the player desires subsequent play of the gaming device to count towards the player earning or otherwise qualifying for a benefit defined by the associated contract). For example, the gaming device may be monitored to determine whether a contract card has been inserted into the gaming device or a player identifier that is associated with an active contract has been inserted into the gaming device. In one embodiment, determining that contract play has been initiated on a gaming device and/or that a request to initiation contract play at a gaming device has been received at the gaming device may include determining the contract identifier associated with the contract play.

A controller of the present invention (e.g., computer 110) may receive an initiation signal associated with a contract identifier in a variety of manners. For example, a card reader device in communication with the controller and/or the gaming device may detect the insertion of a contract card and/or player tracking card (e.g., a player is instructed to "Make sure your play is covered! Insert your Contract Card before you play any slot machine"). The card reader (i.e., a processor thereof, operating in accordance with a program stored in the memory of the card reader) may then determine a contract identifier associated with the card (e.g., by reading an encoded magnetic strip and/or retrieving contract data from a database). Thus, as a controller may communicate with a card reader device, a controller may receive a contract identifier. In some embodiments, a controller receiving a contract identifier may then store game play data associated with the contract identifier (as will be described with reference to step 1415), such that each time a player approaches a gaming device, so long as a contract card is inserted into a card reader device, game play data will be stored (e.g., a controller does not store game play data unless a contract card is inserted). As described, in other embodiments, a controller may receive a contract identifier in any of the manners described above (e.g., a gaming device in communication with a controller receives a PIN code representing a contract identifier via an input device).

In one or more embodiments, step 1415 may further comprise determining whether play of the gaming device from which the contract play initiation signal was received is covered by the associated gaming contract. For example, it may be determined whether play of the gaming device complies with one or more terms of the contract and/or the gaming device is eligible for contract play in accordance with the contract. As described, in some embodiments, one or more gaming devices maintained by a gaming establishment (e.g., slot machines positioned on a casino slot floor) may be ineligible for contract play in association with one or more contracts. Accordingly, in various embodiments of the present invention, an "eligibility indication" may be associated with a gaming device and/or may be determined for the gaming device (e.g., upon receiving a contract initiation signal or determining that a request for contract play has been received at a gaming device). An eligibility indication may comprise an indication of whether the gaming device is eligible for contract play in general and/or for contract play in accordance with certain contracts, certain contract types and/or contracts defining certain terms.

For example, in one or more embodiments, a gaming establishment or other entity may mark, equip or otherwise configure one or more gaming devices to output or display a "static" eligibility indication. A static eligibility indication may inform a prospective player of the eligibility status of one or more particular gaming devices (e.g., a gaming device is or is not eligible for contract play), such that the indication may not change over time (e.g., the associated gaming device is always ineligible for contract play pursuant to any gaming contract). A variety of static eligibility indications are contemplated within the scope of the present invention, including but not limited to stickers, signs or other physical objects affixed to or placed on or near a gaming device, such that text, graphics and/or icons indicate an eligibility status (e.g., a sticker reads "This machine eligible for Contract Play"). In one example, a gaming establishment or other entity may fit all eligible machines with such eligibility indications before any gaming contracts are provided to players.

In other embodiments, a "dynamic" eligibility indication may be associated with one or more gaming devices. A dynamic eligibility indication may inform a prospective player of the eligibility status of one or more particular gaming devices (e.g., a gaming device is or is not eligible for contract play), such that the indication may change over time (e.g., the associated gaming device may at times be eligible for contract play, and at other times may not be eligible). A variety of dynamic eligibility indications are contemplated within the scope of the present invention. In some embodiments, a dynamic eligibility indicator may comprise a light (e.g., when an LED under which text reads "Contracts OK" is lit, the machine is eligible). In other embodiments, a dynamic eligibility indicator may comprise text, icons and/or graphics output by a gaming device display screen (e.g., while a gaming device is idle, an "attract mode" sequence indicates "This machine eligible for Contract Play"). In further embodiments, a dynamic eligibility indicator may comprise a voice recording output via one or more gaming device speakers (e.g., a voice indicates "This machine eligible for Contract Play"). Such dynamic eligibility indicators may be programmed on a periodic or continual basis such that an eligibility status associated with one or more gaming devices may be changed as desired. For example, if a payback percentage or jackpot amount associated with a gaming device changes such that it is outside of an acceptable range, a gaming device eligibility rules database may indicate that the gaming device is no longer eligible for contract play, and thus, a status indicator may change.

In some embodiments, a gaming device may be eligible for contract play in accordance with some contracts or contracts defining certain terms but not others. In such embodiments, the gaming device may indicate which contracts, or contract terms, the gaming device is authorized to support.

In this manner, a player who has established a contract (e.g., a player bearing a contract card) may recognize whether a particular gaming device is eligible for contract play (or eligible for contract play in accordance with the player's particular contract), so as to prevent a situation wherein a player believes a refund is due for a loss amount that was incurred by game play at an ineligible gaming device. Further, in some embodiments, a player may (i) approach an ineligible gaming device, (ii) provide a contract identifier, and (iii) receive an "ineligibility warning indication" (e.g., a display screen reads, "You have inserted a Contract Card, but this machine is ineligible for Contract Play. Any losses you incur will not be refunded. Would you still like to play?"). In other embodiments, a casino representative may provide an ineligibility indication warning (e.g., verbally). Thus, in one embodiment step 1410 may comprise determining whether or not an associated gaming device is eligible for contract play, and if not, outputting an ineligibility warning indication.

Referring now to step 1415, data associated with play of the gaming device at which contract play has been initiated is stored. In one embodiment, the data is stored provided it is verified that play of the gaming device is covered under the terms of the contract (e.g., the gaming device is eligible for contract play in accordance with the contract and play of the gaming device complies with one or more of the terms of the contract). The data may be stored, for example, in a memory of the device that is monitoring play of the gaming device (e.g., computer 110). For example, computer 110 may, upon receiving the contract initiation signal in Step 1410, open a record in a database used to track sessions associated with contract and/or access the appropriate record of a purchased contracts database based on the contract identifier associated with the subject contract. The data determined based on the play of the gaming device may thus be stored in such a record.

As stated, in some embodiments, a player may establish a contract, approach an eligible gaming device, and indicate a desire to initiate contract play associated with a contract identifier (e.g., the player inserts a contract card into a card reader). Accordingly, a controller (e.g., computer 110) in communication with a gaming device and/or peripheral device may store data (e.g., game play data) associated with a contract identifier.

For example, turning to FIG. 11 and record R1100-3 thereof in particular, a player "P-000165" may have been provided with a contract card associated with a contract identified as "C-000003". The contract may entitle the player to receive a one hundred percent (100%) refund of any incurred losses between 9 AM and 3 PM, provided the player pays an up-front, flat contract fee of forty dollars ($40) and maintains a rate of play of at least five hundred (500) game plays per hour. The player may then approach a twenty-five cent (25¢) denomination five-reel, video slot machine and insert the contract card into a card reader. The player may then establish a credit balance (e.g., the player deposits twenty dollars ($20) via a bill acceptor device) and begin to gamble. For example, before spinning the reels, the player may activate nine (9) paylines at a cost of twenty-five cents (25¢) each, thus establishing a wager amount of two dollars and twenty-five cents ($2.25) (i.e., nine (9) credits) in association with the game play. The reels may then spin, and resolve to an outcome of "lime-lime-lime-plum-bell," yielding a payout of one dollar ($1.00) (i.e., payout amount) associated with the game play. Thus, a loss amount associated with the game play may be one dollar and twenty-five cents ($1.25) (i.e., the payout amount subtracted from the wager amount). Play may continue in this manner for some period of time, such that a controller may track a wager amount, payout amount and/or win/loss amount associated with each game play. Such data may then be stored in a database in association with the contract identifier. For example, in one embodiment, a controller may store a "total wager," "total win" and "total loss" associated with a gaming contract (e.g., the controller sums data associated with a plurality of game plays, as is depicted by FIG. 11).

Additionally, a controller may determine a "period remaining" associated with a contract, based on the data determined and/or stored in step 1415. For example, in one embodiment, a contract may define a total period of time a certain number of hours (e.g., six hours of game play). Thus, in one embodiment, upon receiving a contract initiation signal (e.g., a player inserts a contract card), a controller may decrement (e.g., continuously, periodically, in response to a passage of a unit of time or an initiation of a game play, as appropriate) the time played from the total period of time, thereby determining a "period remaining" for a contract. Such a period remaining may be stored in an appropriate record of a database (e.g., a record for tracking a player's play in accordance with the subject contract) in accordance with the time elapsed. Further, in one or more embodiments, a controller may be programmed to determine a contract play termination signal (e.g., the player's removal of a contract card from a card reader device in communication with a controller), as described below with respect to step 1420. Accordingly, in one example, if a period of time defined by a contract comprises a certain number of hours, and a player removes a contract card from a card reader, the controller may no longer decrement a period remaining in an appropriate record of a database (e.g., the appropriate record of the purchase contracts database 1100) in accordance with the time elapsed. In this manner, a player may (i) insert a contract card and initiate a number of game plays associated with contract play at a first gaming device, (ii) remove the card such that a period remaining record is no longer decremented, (iii) re-insert the card at a second gaming device (e.g., a second contract initiation signal is received) and continue game play associated with a gaming contract (e.g., a player may move from slot machine to slot machine, without the time spent traveling between devices being held against him).

In another embodiment, a period of time defined by a contract may define a period of time that is a certain time period during one or more particular days (e.g., a contract period is Aug. 31, 2004 between 9 AM and 3 PM). In one such example, a controller may decrement a "period remaining"

record of a contract database as the end of the period approaches (e.g., "2 hours, 10 minutes" remain before 3 PM). In a further embodiment, a period of time defined by a contract may comprise a number of game plays (e.g., one thousand (1,000) game plays), in which case a controller may decrement a number of game plays remaining as a player associated with the contract participates in game plays covered by the contract. In another embodiment, a period of time defined by a contract may comprise a number of hours within a range of hours (e.g., two (2) hours between 9 AM and 2 PM). Accordingly, a controller may decrement a period remaining record of a database in accordance with each game play covered under the contract and occurring during the period between 9 AM and 2 PM.

It should be noted that, in some embodiments, a player may have entered into a contract that is active, but may participate in one or more game plays that are not associated with the contract (e.g., a controller may determine "non-contract play" associated with a player, such that inapplicable game plays may not be decremented from a period remaining record of a contract database and the player's participating in the game plays not covered under the contract does not aid the player in qualifying for or otherwise earning a benefit defined by the contract). For example, in one embodiment, a player may approach a gaming device and insert a player tracking card instead of a contract card. Thus, any play that occurs while the player tracking card is inserted may not count towards the player qualifying for or otherwise earning a benefit under the contract. In another embodiment, upon a player inserting a player tracking card into a gaming device it may be determine that the player is associated with an active contract and that the gaming device is eligible for contract play in accordance with the contract. Accordingly, the player may be queried (e.g., via an output device of the gaming device or a component thereof) whether the player would like to have the game play the player participates in on the gaming device be covered under the contract. In one embodiment, such a player may have an option to designate one or more game plays as covered under the contract at any time while playing the gaming device.

It should be noted that an identified player associated with an active contract (e.g., as indicated by a player database) who attempts to initiate a game play without indicating that the play of the gaming device is to be covered under the active contract (or who indicates that the play of the gaming device is not to be covered under the active contract) may receive a warning message via any of the output devices described herein (e.g., "Your losses will not be covered. Are you sure you'd like to continue?", if the benefit defined by the contract is a refund of losses).

In some embodiments, a controller or other device may store a wager, payout and/or win/loss data associated with each game play associated with a contract. For example, a database may comprise a "game play-by-game play" record of wager, win and/or loss data for each game play completed under a contract. In one such embodiment, a controller or other device may also store outcome data, gaming device data and/or time data in association with each game play (e.g., the outcome "cherry-cherry-cherry" was achieved on gaming device "D-000192" at 3:10 PM on Aug. 31, 2004), irrespective of whether the game play is determined at the time to be associated with or covered by a contract. Such data may subsequently be accessed, for example, to determine whether a player has complied with one or more terms of a contract and/or earned or otherwise qualified for a benefit defined by a contract. Thus, in an alternate embodiment, one or more records of a database used for storing game data for game plays completed on one or more gaming devices may store the following example information for each game play (wherein each game play may or may not be associated with a particular gaming contract):

| DEVICE | TIME | OUTCOME | WAGER | PAYOUT |
|---|---|---|---|---|
| D-000192 | 3:10 | Ch-ch-ch | $1.50 | $10.00 |
| D-000192 | 3:11 | Pl-pl-bar | $1.50 | $0.00 |

It should be noted that such game play-by-game play records may be used in step 1140, described below, in determining whether a benefit is due to a player in accordance with a contract. Such data may also be used when printing a contract receipt, such as the example one illustrated in FIG. 13.

As stated, in some embodiments, an incremental contract fee may be associated with a contract (e.g., a player is charged one cent (1¢) for every twenty-five cents (25¢) wagered). Thus, in some embodiments, step 1415 (or an additional and distinct step of process 1400) may comprise assessing or determining an incremental fee to be paid by a player. As described, this may be done in a variety of manners. For example, in one embodiment, a player may establish a debit account balance from which incremental fees may be deducted (e.g., a controller tracks wagering activity associated with a contract, such that one cent (1 ¢) is deducted from an associated account in accordance with every twenty-five cents (25¢) wagered). In another embodiment, incremental contract fees may be charged to a player's credit card (though it should be noted that, in some embodiments, it may be preferable to wait and "batch" such charges at once). In an alternate embodiment, a player may provide an incremental contract fee via a gaming device (e.g., during contract play, each payline of a five cent (5¢) denomination slot machine costs ten cents (10¢) to activate).

In some embodiments, a player may be provided with a "contract status update." Accordingly, step 1420 (or another distinct step of process 1400) may comprise outputting a contract status update to a player. A contract status update may comprise, for example, an indication of the status of a player's compliance with one or more terms of a contract, a status of a current value of a benefit earned by a player in accordance with a contract, and/or a status of a player's progress in earning or otherwise qualifying for a benefit defined by a contract. In one or more embodiments, a contract status update may be output to a player in response to a player's request for such an update. In another embodiment, a contract status update may be output continuously, substantially continuously, periodically, in response to one or more qualifying events, or on another basis. A contract status update may be provided, for example, via a gaming device or component thereof (e.g., computer 110 may direct a player tracking device to output the contract status update), a contract kiosk, casino personnel, a smart card, a Web site, or via another appropriate and/or desirable means. In one embodiment, a contract card may comprise one or more input devices (e.g., a "check status button") and/or output devices (e.g., a small LED display screen), such that the card may be configured to output contract status updates.

As described, in one embodiment a player may proactively request a contract status update. For example, a player may request a contract status update in a variety of manners (e.g., actuating an input device of a gaming device or kiosk, dialing in to an IVRU, asking a casino representative, etc). For example, in one embodiment, a player may check the status of a contract by inserting a contract card into a kiosk and selecting "See My Contract Status."

As also described, in other, "passive", embodiments, a player may be provided with a status update without proactively requesting an update. For example, a display device in communication with a controller, but affixed to a gaming device (e.g., an LED screen of a player tracking card reader device), may periodically (or on another basis) output a contract status update message.

In various embodiments, a contract status update may comprise a variety of contract terms and the status thereof and/or other data, including but not limited to (i) "period remaining" data, such that a player may learn how much time and/or how many game plays remain in association with the subject contract (e.g., a display indicates "35 minutes remaining"); (ii) contract fee data, such that a player may learn of any incremental fees that have accrued in association with the subject contract (e.g., an IVRU indicates "You have totaled $5.87 in contract fees thus far"); (iii) loss data, such that a player may learn of any losses that a player has incurred during contract play (e.g., a representative accesses contract data using a casino personnel device, and tells the player "You've accumulated $105.40 in losses so far"); (iv) refund data, such that a player may learn of any refund amount which may be due to a player (e.g., a controller multiplies a loss amount by a refund rate, and determines that forty-five dollars and seventy cents ($45.70) is to be refunded to the customer); and so on.

In one or more embodiments, step 1420 (or another distinct step of process 1400) may comprise determining whether a player is in compliance with one or more terms of a gaming contract. For example, it may be determined, based on game play data, whether a game play a player has initiated, has requested to initiate, or has completed, complies with one or more play requirements or play restrictions defined by the subject contract. As described, in some embodiments, one or more play requirements or play restrictions may be associated with a contract. For example, in one embodiment, a play restriction comprises a maximum wager amount associated with each game play initiated during contract play (e.g., a player must not bet more than fifty cents (50¢) each time he spins a slot machine). Accordingly, in some embodiments, a controller or another device may be operable to (i) determine a play restriction associated with a contract, (ii) determine whether or not a player is in compliance with the play restriction, and if not (iii) output a "play restriction noncompliance warning." Continuing with the above example, a player who then activates three twenty-five cents (25¢) denomination slot machine paylines (e.g., establishes a wager amount of seventy-five cents (75¢) associated with a game play, which is greater than the fifty cent (50¢) maximum as indicated by the contract) and presses "spin" may be prompted with a non-compliance warning via any of the output devices described herein (e.g., a gaming device display screen indicates: "Warning! You are wagering more than is covered by your contract! Any losses you incur for this game play will not be eligible for a refund. Would you like to continue anyway?"). In an alternate embodiment, a player who is not in compliance with a play restriction of a contract may not be permitted to play a gaming device and/or to initiate the game play that would cause the player to not be in compliance with the contract.

Referring now to step 1420, it is determined whether a contract play termination signal has been received. This determination may comprise, for example, determining whether a player and/or gaming device has caused a signal to be transmitted to the controller or other device monitoring play of the gaming device, the signal indicating a termination of play of the gaming device in accordance with the contract.

For example, in one embodiment a contract play termination signal may comprise a signal that a player has removed a contract card and/or a player tracking card from the gaming device. In another example, a contract play termination signal may comprise a signal that the player has indicated that game plays initiated on the gaming device are no longer to count towards the player satisfying the requirements of the contract (e.g., unless and until the player indicates otherwise). In yet another example, a contract play termination signal may comprise a signal that the player has moved away from a proximity of the gaming device (e.g. based on data determined by a proximity, motion and/or weight sensor associated with the gaming device) or has otherwise discontinued play of the gaming device or play of the gaming device in accordance with the contract.

It should be noted that, in some embodiments in which a gaming device is completely or relatively passive in aiding a controller to monitor play of the gaming device in accordance with a contract, a contract termination signal may not be received from the gaming device. Rather, the controller or other device monitoring play of the gaming device may determine that contract play has been terminated at the gaming device by determining one or more of (i) determining that a contract and/or player card has been removed from the gaming device; (ii) determining that a player has indicated to a casino attendant that the player no longer desires to have play of the gaming device covered by the contract; and/or (iii) determining that the player has moved away from the gaming device or otherwise discontinued play of the gaming device completely or at least in accordance with the contract. In such an embodiment, step 1420 may comprise determining, from data obtained from the gaming device, that play of the gaming device in accordance with the contract has been terminated.

In one embodiment, a player may (i) insert a contract card, (ii) initiate a number of game plays pursuant to contract play, and (iii) leave a gaming device, but forget to remove a contract card. In some embodiments, a controller or other device may be operable to detect such "breaks in play" (e.g., periods of time during which a contract card is inserted during which no game plays have been initiated). For example, a contract card may be inserted at 5:05 PM. A player may then play a number of game plays, the last of which occurs at 5:23 PM. If the contract card then sits idle in the reader for a predetermined period of time (e.g., the player leaves, forgets his card, and doesn't come back for more than ten (10) minutes), a controller may determine that only the period of time during which the gaming device was not idle may count toward the contract (e.g., a period remaining field of a contract database is decremented by only eighteen (18) minutes, the time span from when the player inserted the card until the last game play was initiated).

If it is determined in step 1420 that a contract play termination signal has been received, the process continues to step 1430. Otherwise, the process continues to step 1425.

Referring now to step 1425, it is determined whether an end of a period of time defined by the contract has occurred. For example, it may be determined whether a maximum units of time defined by the contract have occurred (e.g., the contract defines a period of two (2) hours and the player has completed two (2) hours of play under the terms of the contract). In another example, it may be determined whether a maximum number of game plays defined by the contract have been completed in accordance with the contract. In yet another example, it may be determined whether an ending time defined by the contract (e.g., 2 PM on Jul. 1, 2005) is a current time. In one embodiment, determining that a period of time defined by the contract has ended may comprise, for example, informing the player associated with the contract of this determination (e.g., causing a gaming device to output a message informing the player that no more game plays will be covered by the contract because the period of time defined by the contract has ended). In one embodiment, determining that a period of time defined by the contract may further comprise causing play of the gaming device to be paused, ended or otherwise interrupted (e.g., so as to inform the player that subsequent play of the gaming device is no longer covered by the contract).

It should be noted that, in one embodiment, a gaming device may be operable to determine that a period of time defined by a contract has ended and transmit a contract play termination signal based upon such a determination. In such an embodiment, steps 1420 and 1425 may effectively be combined and/or performed by different devices (e.g., step 1425 is performed by a gaming device and prior to step 1420, while step 1420 is performed by a controller). It should again be emphasized that the steps of process 1400 (or of any other process described herein) may be performed in an order different from that described, as is practicable, convenient and/or desirable.

If it is determined, in step 1425, that a period of time defined by the subject contract has not ended, the process 1400 returns to step 1415, in which data associated with play of the gaming device is stored. Otherwise, the process 1400 continues to step 1430.

It should be noted that steps 1430, 1435, 1440 and 1445 may be considered a "reconciliation process" for a contract and, in some embodiments, may be performed as a subroutine distinct from the remainder of process 1400. For example, while one or more of the steps 1430, 1435, 1440 and 1445 may be performed by a contract kiosk 140 or a contract server, the remainder of process 1400 may be performed by computer 110. A reconciliation process (e.g., a process via which a contract is reconciled) may comprise, for example, a process via which it is determined (i) whether a player has complied with a contract such that a player has qualified for or otherwise earned a benefit defined by the contract; (ii) what the value, if any, is of a benefit to be provided to a player as a result of complying with the terms of the contract; (iii) providing the player with the benefit; and/or (iv) obtaining or attempting to obtain any contract fee or other consideration due from a player in exchange for the contract, if such fee or other consideration has not yet been obtained or has not been attempted to be obtained.

In one embodiment, a reconciliation of a contract may be initiated by a player. For example, a player approaches a casino booth, casino attendant and/or contract kiosk and requests a benefit defined by the contract (e.g., refund amount), thereby requesting reconciliation of the contract. In another embodiment, a reconciliation of a contract may be initiated by a device (e.g., computer 110, kiosk 140) in response to an occurrence of one or more predetermined events. For example, the device may reconcile all contracts every night at midnight or may reconcile each contract as contract play under the contract is terminated and/or a period of time defined by the contract is determined to have ended.

In some embodiments, reconciling a contract may comprise providing a refund or other benefit based at least in part on the data stored during step 1415. In general, it may be advantageous to record the refund that is due as a debt, an account payable, or in another form that is readily managed by known accounting systems (e.g., which a casino uses) and/or advantageous to a casino or other entity.

In one example, a player may provide a credit card to purchase a contract with an associated refund rate of seventy-five percent (75%) and a contract fee of fifty dollars ($50). Thus, in some embodiments, a fifty dollar ($50) charge may be pre-authorized (or "frozen") in association with the player's credit card, as is known in the art (e.g., fifty dollars ($50) in funds are reserved against the card's credit limit, though this may not be the amount that is ultimately charged). After it is determined that a period of time defined by the contract is determined to have ended, it may be determined that the player has accumulated eighty-five dollars ($85) in losses. Accordingly, the player may then approach a contract kiosk 140, insert a contract card, and be presented with a menu of options (e.g., "Purchase a contract extension," "Review your contract," "Settle your contract and receive a receipt"), from which the player may elect to reconcile a contract (e.g., the player selects "Settle your contract"). Thus, as the player may be entitled to a refund amount of sixty-three dollars and seventy-five cents ($63.75) (i.e., seventy-five percent (75%) of eighty-five dollars ($85)), the player's credit card may be charged thirteen dollars and seventy-five cents ($13.75), (e.g., the refund amount owed to the customer minus the fifty dollar ($50) contract fee). It should be noted that, in an alternate embodiment, a player may be provided with a refund amount in cash (e.g., a kiosk outputs sixty-three dollars and seventy-five cents ($63.75) in cash via a benefit output device), while the player's credit card may be charged the contract fee amount (e.g., fifty dollars ($50) is charged to the player's credit card).

In yet another example of reconciling a contract, a player may establish an eighty dollar ($80) balance in a financial account associated with a contract. The contract may allow the player to receive a one hundred percent (100%) refund on any losses incurred over the course of a twelve (12) hours of game play, and a contract fee associated with the contract may decrement the financial account balance by one dollar ($1) every one hundred and fifty (150) game plays. Thus, the player may have initiated nine thousand four hundred and thirty-five (9,435) game plays, totaling sixty-two dollars ($62) in contract fees which may be decremented against the account balance (i.e., leaving the player with an eighteen dollar ($18) account balance). The player may have also accumulated three hundred and two dollars and forty cents ($302.40) in losses during contract play. Accordingly, once the period of time defined by the contract is determined to have ended (e.g., and a display device of a card reader device outputs a "contract complete" indication to the player after twelve (12) hours of play are complete), the player may dial-in to an IVRU operable to facilitate one or more embodiments, and be provided with a menu of options (e.g., "Press '1' to reconcile your contract, press '2' to extend your contract . . . "), such that the player may indicate a desire to reconcile a contract (e.g., the player presses the appropriate button of a cellular phone keypad). Accordingly, an IVRU in communication with a controller may indicate that a casino representative must be dispatched to a particular location on the casino floor (e.g., to a particular gaming device, as identifier by the player when prompted by the IVRU). Thus, a representative may approach the player, and provide a payment of three hundred and twenty dollars and forty cents ($320.40) (i.e., the refund amount plus the remaining financial account balance), as well as a receipt therefore.

In some embodiments, a player must confirm or acknowledge that the player has received a refund amount. For example, a contract receipt (e.g., such as the example one illustrated in FIG. 13) may require that a player sign to acknowledge receipt of payment and a copy of the signed receipt may be collected by the casino.

Further, in some embodiments, providing a refund amount to a player may comprise updating casino accounting data so as to reflect the payment (e.g., a debit of fifty-three dollars and five cents ($53.05) from a casino account is marked as being paid to player "P-000529" pursuant to a refund associated with gaming contract "C-011245").

Further still, in some embodiments, upon the ending of a period of time defined by a contract, a player may be provided with a "contract period complete" message. Such a message may be output via any of the output devices described herein.

Still further, in one embodiment, a third party may process the management and payment of refunds or provision of other benefits defined by a contract. For example, a third party may (i) determine a refund amount due to a player, (ii) pay the player the refund amount, and/or (iii) charge the casino/operator for the refund amount. Such an embodiment may be advantageous in freeing the casino from the associated operating overhead of managing payment of refunds.

Referring now to step 1430, it is determined whether the data stored in step 1415 indicates compliance with the subject contract. Such a determination may comprise, for example, determining one or more terms of the contract (e.g., play requirements or play restrictions defined by the contract) and determining, based on the stored data, whether the one or more terms have been satisfied. For example, if a player requirement specifies a minimum acceptable rate of play, determining compliance with the contract may comprise calculating a rate of play achieved and/or maintained by the player while participating in game plays covered by the contract and determining whether the calculated rate is at least the minimum acceptable rate.

It should be noted that, in one embodiment, a determination of compliance with a contract may be performed during a period of time defined by the contract and/or prior to receiving a contract play termination signal, in lieu of or in addition to being performed after a period of time defined by the contract is determined to have ended and/or a contract play termination signal is determined to have been received. For example, while game play data is being determined and stored in step 1415, the data may be analyzed and compared to the terms of the subject contract (e.g., in a continuous, substantially continuous, or periodic manner) to determine whether the player is complying with the terms of the contract. Accordingly, step 1430 may be performed earlier in process 1400 than is depicted.

If it is determined, in step 1430, that the contract has not been complied with, process 1400 continues to step 1430, in which step an indication of non-compliance with the contract is stored (e.g., in a database, such as the purchased contracts database depicted in FIG. 11). Additionally, a message informing the player of the determined non-compliance (and, for example, the reasons therefore) may be output to the player. If, on the other hand, it is determined that the contract has been complied with, the process 1400 continues to step 1440.

In step 1440 it is determined whether a benefit is due to a player associated with the contract. For example, if the determination of compliance with the contract has been performed prior to an ending of a period of time defined by the contract (e.g., the determination of compliance was performed during the period of time) and the contract specifies that the benefit is to be provided at the end of the period of time, it may be determined that a benefit is not yet due to the player. If it is determined that a benefit is not yet due, the process 1400 ends (step 1450). Otherwise, the process 1400 continues to step 1445.

In step 1445, the benefit due to the player is provided to the player. Providing the benefit to the player may comprise, for example, authorizing a device and/or casino personnel to provide the benefit to the player. For example, if the benefit comprises a monetary amount, a device (e.g., contract kiosk or gaming device) may be directed to dispense an appropriate amount of cash or coins or a cashless gaming receipt redeemable for the appropriate amount of cash. In another example, if a benefit comprises an amount of comp points to be awarded to a player, a device (e.g., computer 110) may cause the appropriate amount of comp points to be added to an account of comp points associated with the player. In yet another example, if a benefit comprises a discount or gift certificate to a retail establishment (such that a player may receive goods and/or services by providing such a gift certificate or voucher), providing the benefit may comprise printing or otherwise providing an instrument entitling the player to the discount or appropriate gift certificate amount. Other manners of providing a benefit would be understood by one of ordinary skill in the art upon reading the present disclosure.

In one embodiment, providing the benefit to the player may comprise determining a value of a benefit to be provided to the player. Determining a value of a benefit to be provided to the player is described in more detail below with respect to step 1540 of process 1500.

It should be emphasized again that in one or more embodiments, a benefit may be provided to a player during a period of time defined by a contract (e.g., a number of comp points may be earned by the player and added to an account of comp points associated with the player, a feature of a gaming device is to be activate, a gaming device is authorized and/or directed to allow a player to continue gambling even though a credit meter balance of the gaming device has been depleted below a predetermined level, etc.).

Referring now to FIG. 15, illustrated therein is a flowchart of a process 1500 that is consistent with one or more embodiments encompassed by the present description. The process 1500 illustrates various uses of the various databases described herein. Process 1500 may be performed, for example, by computer 110 that is monitoring activity at gaming devices in order to, among other things, gather data for purposes of determining whether players have earned or otherwise qualified for benefits defined by contracts entered into by the players. It should be noted that, as is true for all processes described herein, a first portion of process 1500 may be performed by a first device (e.g., computer 110) while a second portion of the process 1500 may be performed by a second device (e.g., contract kiosk 140).

Referring now to step 1505, a determination is made as to whether game play has been initiated at a gaming device. This determination may be made based on, for example, a signal received from a gaming device and/or based on monitoring activity at the gaming device. Determining that game play has been initiated at a gaming device may comprise determining, for example, (i) that a credit meter balance has been established at a gaming device, (ii) that a start button has been actuated or handle has been pulled at the gaming device, (iii) that a player identifier and/or contract identifier has been inserted into the gaming device, (iv) that the presence of a player has been detected within proximity to the gaming device, and/or (v) that a player has begun configuring the gaming device to his preferences. It should be noted that determining that game play has been initiated does not necessarily mean that a particular game play has yet been initiated but may merely indicate that it appears as if a player intends to shortly initiate a particular game play.

In step 1510 it is determined whether a contract identifier has been received at the gaming device. This determination may comprise, for example, determining whether a player has keyed in a contract identifier to a keyboard of the gaming device, has inserted an instrument (e.g., paper receipt bearing machine readable indicia, contract card, player identifier associated with an active contract, etc.) indicating the contract identifier into the gaming device, has spoken the contract identifier into the gaming device, or has otherwise indicated a contract identifier to the gaming device. An indication being received by or input into a gaming device encompasses, of course, the indication being received by or input into a component of the gaming device.

If it is determined that a contract identifier has not been received, the process 1500 ends (step 1515). Otherwise, the process 1500 continues to step 1520.

In step 1520 it is determined whether the contract associated with the contract identifier applies to the current play of the gaming device (e.g., whether play of the gaming device is covered under the contract). For example, it may be determined (i) whether play of the gaming device would potentially satisfy a play requirement defined by the contract, (ii) whether the gaming device is eligible for contract play in accordance with the contract, and/or (iii) whether a period of time defined by the contract has not yet expired. If these example determinations (or other appropriate determinations) are answered in the affirmative, it may be determined that the contract is applicable to the current play of the gaming device and the process 1500 may continue to step 1530. Otherwise the process 1535 may continue to step 1535, wherein a warning message may be output to the player (e.g., computer 110 directs the gaming device to output the message), informing the player that play of the gaming device will not be covered under the contract and thus the player may not earn or otherwise qualify for the benefit defined by the contract by playing the gaming device.

In step 1530, data associated with play of the gaming device is determined. Determining the data may comprise, for example, receiving data associated with one or more game plays initiated and/or completed at the gaming device (e.g., wager posted, outcomes and/or payout received, time each game play is initiated, etc.) and/or determining such data by monitoring the events at the gaming device. Determining such data may further comprise storing such data. Many manners of determining (e.g., monitoring, receiving, storing, etc.) data associated with play of a gaming device have been described with respect to step 1415 of process 1400, above, and will be described with respect to step 1605 of process 1600, below. These descriptions are equally applicable to step 1530 and need not be repeated herein for purposes of brevity.

In some embodiments, step 1530 may further comprise analyzing such data to determine whether the player is satisfying one or more play requirements defined by the contract, whether a period of time defined by the contract has ended, and/or to determine another piece of information relevant to the contract. In other embodiments, determining the data may not involve any analysis of the data during step 1530.

In step 1535 it is determine whether a benefit is due to a player associated with the contract play of the gaming device for which data is being determined in step 1535. For example, it may be determined whether a player has earned or otherwise qualified for the benefit defined by the contract. As described, in one or more embodiments, a benefit may be provided to a player while the player is participating in game plays covered by the contract and before a period of time defined by the contract has ended. For example, assume a benefit defined by the contract entitles the player to complete five hundred (500) game plays in exchange for a single prepayment of a predetermined amount (e.g., twenty dollars ($20)) and irrespective of whether the credit meter balance of a gaming device on which the player is participating in the game plays is depleted below a predetermined level. In such an example, step 1535 may comprise determining whether the credit meter balance has been depleted below the predetermined level and, if so, whether the player has any game plays remaining to be completed under the terms of the contract.

If so, an additional amount of credits may be added to the credit meter balance of the gaming device (e.g., by computer 110), without requiring payment therefore from the player, and/or the gaming device may be authorized to allow the player to continue posting wagers and track the posted wagers by continuing to subtract them from the credit meter balance and allowing the credit meter balance to reflect an amount less than zero. In another example, a benefit defined by a contract may comprise an earning of comp points at an accelerated rate and/or access to a bonus round or other feature of the gaming device that would not otherwise be accessible to the player (e.g., without providing additional payment therefore or not at all). In such an example, determining whether the benefit is due to the player may comprise determining whether the player has satisfied the play requirements defined by the contract such that the appropriate amount of comp points (calculated at the accelerated rate) should be added to the player's comp point account and/or whether the player should be granted access to the bonus round or other feature of the gaming device.

If it is determined, in step 1535, that a benefit is not due, the process 1500 continues to step 1550. Otherwise, the process 1500 continues to step 1540, in which the benefit due to the player is determined. Determining the benefit may comprise, for example, calculating a value of the benefit (e.g., calculating a number of comp points to be provided to the player, calculating a monetary amount to be provided to the player, calculating an amount of free additional game plays to be provided to the player, etc.). This may comprise, for example, retrieving a formula from a memory (e.g., the formula may be stored in an available contracts database or a purchased contracts database, which may be accessed based on the contract identifier and using the formula to determine the value of the benefit. In other embodiments, the value of the benefit may be static and not dynamic (e.g., the value of the benefit is predetermined and does not vary based on any behavior or activity of the player). In such an embodiment, determining the benefit may simply comprise determining the nature and value of the benefit based on data stored in memory (e.g., by retrieving it from an available contracts database or a purchased contracts database, based on the contract identifier).

In step 1545, the benefit is provided to the player. Providing the benefit may comprise, for example, causing the gaming device to provide the benefit to the player (e.g., causing the gaming device to activate a feature, causing the gaming device to add credits to the credit meter balance, causing the gaming device to dispense a cashless gaming receipt, coins and/or tokens, etc.). In another example, providing the benefit may comprise crediting an account (e.g., a financial account, a comp point account, an account of accumulated free game plays, etc.) associated with the player and causing the gaming device to inform the player of the provided benefit. In yet another example, providing the benefit may comprise directing a casino attendant to approach the player and provide the benefit to the player. Many other manners of providing a benefit have been described with respect to step 1445 of process 1400, are equally applicable herein and need not be repeated herein for purposes of brevity.

Once the benefit has been provided, process 1500 continues to step 1550. In step 1550 it is determined whether an additional game play has been initiated and/or completed at the gaming device (e.g., while the steps 1535-1545 were being performed and/or since the step 1530 was last performed). If so, the process 1500 returns to step 1520, in which it is determined whether the contract is applicable to the game play. Otherwise, the process 1500 ends (step 1525).

It should be understood that many variations on the above-described embodiments are encompassed by the spirit and scope of the present invention. Some of these variations will now be described.

It should be noted that in some embodiments more than one player identifier may be associated with a contract identifier. For example, two players may together receive a multiplayer contract (e.g., two player identifiers are associated with a single contract identifier, and two contract cards comprising the same contract identifier are issued, one to each of the two players). Accordingly, two or more players may simultaneously engage in contract play (e.g., game plays initiated by either of the two players are associated with contract play). In one embodiment, a game play initiated by two or more players may have a cumulative effect of decrementing a "period remaining" associated with the associated contract.

For example, if two players receive a contract defining a period of time comprising eight hours, a first player may insert a contract card into a card reader associated with a first gaming device, and a second player may simultaneously or soon thereafter insert a second contract card into a card reader associated with a second gaming device. Each player may then play for thirty (30) minutes with the contract card inserted, such that a "period remaining" record of a purchased contracts database may be decremented by one hour. Further, in some embodiments, other data may be aggregated in association with a contract provided to more than one player (e.g., two or more loss amounts are totaled, two or more wager amounts are totaled, etc.), such that a refund amount may be provided to one or more players (e.g., one player accepts a refund amount on behalf of two players, a first and second player each receive half of a total refund amount, etc.) based on the aggregate of the play data associated with the two players.

In some embodiments, a player may be provided with a "cash advance amount." For example, in one embodiment, a player may have paid one hundred dollars ($100) to establish a contract entitling the player to receive a one hundred percent (100%) refund on all losses incurred by game play between 11 AM and 9 PM. Accordingly, the player may incur a substantial amount of losses before the period of time defined by the contract ends (e.g., by 5 PM), such that the player may have spent through a gambling budget. Thus, the player may have no more cash with which to wager, though the player may desire to play further, as the player may be entitled to a one hundred percent (100%) refund on all losses (e.g., the player thinks, "Even if I spend more cash, I'll get a refund for it all anyway at the end of the contract, so I can't really lose any more money than the $100 contract fee I spent already"). Accordingly, the player may request a cash advance amount. A request for a cash advance may be received by a variety of entities described previously herein (e.g., gaming devices, kiosks, casino representatives operating computing devices, etc.). In some embodiments, a cash advance may comprise a payment of a refund amount (e.g., or portion thereof) that is already due to a customer. For example, a player may have incurred two hundred dollars ($200) in losses before a period of time defined by a contract ends.

Thus, the player may approach a casino representative or contract kiosk and may receive two hundred dollars ($200) in cash (e.g., in one embodiment, a cash advance comprises an "early and partial reconciliation" of a contract, such that the player may no longer be entitled to receive a refund for the two hundred dollars ($200) that the player paid). In other embodiments, a player may be loaned a cash advance amount, such that the loan amount may be reflected during a contract reconciliation process described herein (e.g., when a player reconciles a contract, a player owes any contract fees and loan amounts, less any refund amounts due). In some embodiments, a fee may be associated with a cash advance (e.g., one dollar ($1) per cash advance). In one such embodiment, a cash advance fee amount may agreed upon as a term of a contract (e.g., before a contract is established with the player, the player agrees to pay a two dollar ($2) fee associated with any cash advance subsequently provided to a player).

In one embodiment, a play restriction may indicate a period of time during which one or more particular gaming devices or type of gaming devices must be played. For example, a play requirement defined by a contract may specify that a first gaming device type (e.g., "Any video poker machine") must be played for at least a specified first portion of the period of time defined by the contract (e.g., at least one hour out of four hours defined by the contract), and a second gaming device type (e.g., "Wild West Win Slots") must be played for at least a second specified portion of the period of time defined by the contract (e.g., at least 20 minutes out of the four hours defined by the contract).

In some embodiments, a contract may be valid at more than one gaming establishment. For example, a player may purchase a gaming contract entitling the player to receive a fifty percent (50%) refund on any losses incurred during the month of April at any "Casino XYZ" property. In this manner, the player may gamble at a first property maintained by Casino XYZ on a first day in April, and gamble at a second property maintained by Casino XYZ on a second day in April, and expect to have fifty percent (50%) of all the player's losses refunded.

In another embodiment, a player may purchase a gaming contract from a contract facilitator (e.g., "Gaming Contract Company X"), such that the contract is valid at any indicated properties with which the contract facilitator has partnered (e.g., a player purchases a "Las Vegas Casino Pass" from Gaming Contract Company X). In this manner, various systems (e.g., controllers, kiosks, etc.) that are produced, operated, owned and/or operable to communicate with a device operated by the contract facilitator may be installed in one or more participating casinos.

As described, in some embodiments a controller may be operable to detect various "breaks in play" (e.g., a player leaving a contract card in a card reader device without initiating a game play for a period of time), such that the time which a player is not playing a device may not count against a contract (e.g., a value in a "period remaining" field of a purchased contracts database is not decremented). In one such embodiment, the time a player spends in a "bonus round" or other secondary game may not be counted against a period of time defined by a contract.

As is known in the art, player tracking cards typically provide players with an amount of "complimentary points" based on game play (e.g., a player earns one point for each game play, such that a player may later redeem such points for merchandise or other benefits). In one embodiment of the present invention, a player may earn such traditional "comp points" during contract play. In another embodiment, a player may not earn such traditional comp points during contract play. For example, a player associated with an active contract who desires to earn comp points may be required to insert a traditional player tracking card. Accordingly, a controller may be operable to detect whether a player wishes to play for comp points, or engage in contract play (e.g., depending on the type of card the player inserts into a reader device).

In some embodiments, a player may receive a "contract extension" that entitles the player to an extension of the period of time defined by the contract. For example, a player may have purchased a contract entitling the player to receive a one hundred percent (100%) refund of all losses incurred within six (6) hours of game play. As described previously, after six (6) hours have elapsed (e.g., a "period remaining" field of a purchased contracts database is completely decremented), the period of time defined by the contract may be considered to have ended, such that a player may not receive a refund associated with any further play. Thus, a contract extension may allow a player to receive a longer contract period (e.g., the player gains another hour of play during which any losses will be covered by a one hundred percent (100%) refund). A player may be provided with a contract extension in a variety of manners.

In one example, a player whose period of time defined by a contract has ended may approach a casino representative and pay a fee (e.g., ten dollars ($10) per hour) to receive a contract extension (e.g., such that the representative uses a computer device in communication with one or more databases of the present invention to update one or more terms associated with the player's contract). In another example, a player may approach a contract kiosk 140 and select an "Add time" option from a menu of options output via a display screen. In some embodiments, a player establishing a contract may select or otherwise be provided with an "automatic extension" option, such that should the period of time defined by the contract end (e.g., the player completes six hours of play), the player may remain eligible to earn a refund amount based on subsequent play initiated after the end of the period of time if the player continues to play. For example, an automatic extension term associated with a contract may stipulate that once an initial period of time defined by a contract has ended, a player may be entitled to one or more "contract extension periods" (e.g., one hour increments of time), with which a "contract extension fee" may be associated (e.g., ten dollars ($10) for the first additional hour, fifteen dollars ($15) for the second additional hour, etc.). Additionally, similar or different contract terms may be associated with one or more contract extension periods (e.g., a refund rate is one hundred percent (100%) during an initial contract period, but falls to ninety percent (90%) during a contract extension period). Thus, in one example, a player may purchase a contract for six (6) hours of play with a one hundred percent (100%) refund rate. After the six (6) hours elapse, the player may continue to play (e.g., a contract card remains inserted in a card reader device and the player continues to play even after a "contract period complete" message is output to a player as described). Accordingly, contract data (e.g., game play data) may then be stored in association with (i) the original contract identifier or the initial period of time, and/or (ii) a newly created contract extension identifier or an additional period of time by which the initial period of time has been extended.

In one embodiment, a player may win a contract extension (e.g., on a random basis and/or in response to certain desirable gambling behavior by the player). For example, a player may be provided with a "bonus contract extension" if certain criteria are met (e.g., a contract extension for which no fee is associated). For example, a player may be provided with a "free extra hour" of coverage if the player (i) plays during a certain period of time (e.g., "Play for one hour before 7 AM, and get an extra hour FREE after 5 PM"); (ii) maintains a certain rate of play (e.g., "Average more than 600 spins per hour, and get an hour of coverage for FREE"); (iii) wagers a certain amount in association with one or more game plays (e.g., "Wager more than $4000 during your contract and get an hour FREE"), and/or (v) otherwise qualifies for the contract extension.

In accordance with some embodiments, gaming device output device(s) may be configured to output information (e.g., received from the controller and/or contract kiosk) pertaining to one or more statuses (and/or other information) associated with a contract. For example, a gaming device LCD (or other output device) may display information pertaining to the status of a particular contract to an associated player (e.g., based on a player identifier, gaming device identifier and/or contract identifier). Such status information may include, for example, an indication of one or more of the following: (i) an amount of elapsed time or number of elapsed game plays associated with the contract; (ii) an amount of time or number of game plays remaining subject to the contract; (iii) a net present refund amount associated with the contract (e.g., a dollar amount and/or percentage of total session wager or session loss that may be refunded to the player); (iv) net present win/loss associated with the contract; (v) an amount of wager remaining subject to the contract; (vi) an indication of one or more game play parameters required to fulfill the contract; (vii) offers or instructions to renegotiate or reestablish an existing contract; (viii) offers or advertisements outlining other available contracts or contract terms; (ix) the status of another contract (e.g., the status of a wife's contract may be output to her husband at a gaming device associated with the husband's player identifier); (x) information indicating that the terms of a contract have been fulfilled; and/or (xi) information indicating that the player is in breach of one or more terms of a given contract (e.g., a text message indicating "In order to be eligible a loss refund, you may wager only one coin per line").

Such information may be provided and/or updated on a continuous basis (e.g., after each wager or handle pull) and/or periodic basis (e.g., the information may be updated twenty times or at regular intervals over the course of a given contract). Accordingly, players may be apprised of various statuses or other information associated with one or more contract(s) while executing play at a gaming device. Alternatively, the execution of game play may not be necessary in order for a player to inquire or ascertain the status of his or her contract at a gaming device. For example, various functions of a contract kiosk 140 (described above) may be incorporated into that of a gaming device 130, such that a player may utilize a gaming device in order to inquire about and ascertain (e.g., status) information pertaining to a particular contract (e.g., by inputting a contract card to a gaming device card reader and actuating an "acquire contract status" button of a gaming device). Further, in some embodiments, status information may be output to a player's cellular phone (e.g., an IVRU may be configured to periodically dial a player's number and output status information) or other device associated with the player (e.g., to an e-mail account associated with the player viewable by a portable computing device). Contract status information may be output at a gaming device via a dual-use output device (e.g., an LCD capable of outputting both a player's current credit balance and various contract status information) and/or via a dedicated output device (e.g., a peripheral device with display screen dedicated to solely outputting contract status information).

In some embodiments, a player may be allowed to indicate whether a game play is to be covered by a contract (e.g., or be used to decrement a period remaining associated with a contract) essentially on a game play-by-game play basis. For example, prior to initiating a particular game play (e.g., if the player is feeling unlucky and has entered into a contract which defined a benefit comprising a refund amount), the player may indicate that this particular game play is to be covered under the contract (e.g., by inserting his contract card or actuating an appropriate button on the gaming device). In such an embodiment, unless the player provides an appropriate indication prior to or at the time of initiating a game play, the game play may not be covered by the contract. In another embodiment, once a player provides an indication that a game play is to be covered under a contract, all subsequently initiated game plays are covered by the contract (if the game plays qualify for coverage under the contract) unless and until the player indicates otherwise.

In some embodiments, a player may be restricted from establishing a contract if the player has previously abused a previously entered contract as determined by a gaming establishment. For example, in some embodiments, a player may initiate a number of game plays that is not consistent with an acceptable manner of play (e.g., a player initiates no game plays during the first several hours of a period of time defined by a contract, then initiates a large amount of game plays during the final thirty (30) minutes). Accordingly, such a player may be "flagged" as a problem player, such that the player is no longer to eligible to enter into a contract and/or no longer eligible to enter into a contract defining a certain contract term. For example, a "problem flag" may appear in association with a player identifier of a player database, and a rule of a player eligibility rules database may indicate that should there be a "problem flag," the player may not be eligible to establish a contract. A process for determining whether a player should be prevented from establishing a contract in the future will now be described in more detail with respect to FIG. 16.

Referring not to FIG. 16, illustrated therein is a flowchart of an example process 1600 that is consistent with one or more embodiments encompassed by the present description. In general, the process 1600 may be performed in order to avoid or reduce a likelihood of players gaming a casino or other entity via purchase of contracts consistent with the present invention. In another aspect of the embodiments encompassed by the process 1600, the process 1600 may be helpful in determining which types of contracts and/or contract terms a player should be eligible for (or restricted from) in the future.

For example, in accordance with one or more embodiment, apparatus, systems and methods may be provided for monitoring a contract (e.g., an agreement between a player and a casino establishment relating to game play within the casino). In one or more embodiments, one or more devices (e.g., computer 110, a contract kiosk 140, a gaming device 130, and/or a contract server) may be operable to (i) provide a contract associated with a contract identifier (e.g., establish a contract and provide a player a contract card), (ii) receive a contract initiation signal (e.g., detect the insertion of the contract card into an eligible gaming device), (iii) monitor play data associated with the contract identifier (e.g., track actions by the player), and/or (iv) determine whether to prevent the player from purchasing one or more contracts in the future based on the monitored play. Such a system may be advantageous in that contracts may be administered with less risk that a player may intentionally or unintentionally violate the terms or spirit of the contract (e.g., since a player who knows his game play is being monitored for such a purpose may desire avoiding any activity or behavior that may cause the player to be prevented from purchasing a contract in the future).

For example, in one scenario a player may be tempted to "game" a casino via abuse of a contract be removing a player tracking card during certain game plays (e.g., in order to maximize losses incurred under the contract) and/or by inserting a contract card into a gaming device being played by another player (e.g., unbeknownst to the other player), in order to earn a refund based on losses incurred by the other player. The embodiments described with reference to FIG. 16 aim to prevent or at least lessen the likelihood of a player gaming a casino in such a manner.

Referring now to step 1605, play of a gaming device is monitored by a device (e.g., by a computer 110, contract kiosk, 140, gaming device 130, a contract server). The game play may comprise game play associated with a contract. For example, it may first be determined (e.g., as described with respect to steps 1405 and 1410 of process 1400 and/or as described with respect to steps 1505 through 1520) that a contract has been established and that play of the gaming device is covered under the contract. This may comprise, for example, determining that a player of the gaming device is engaged in contract play. In one embodiment, monitoring of play of a gaming device may include storing and/or analyzing data associated with the monitored play. It should be noted that monitoring play of a gaming device may comprise monitoring play of several gaming devices (e.g., gaming devices that a player plays consecutively, simultaneously or at various times).

Monitoring the play of the player who is engaged in contract play of a gaming device may be performed in a variety of manners. For example, in one embodiment, a controller or other device may receive game play data from the gaming device and store it in an appropriate record of a database (e.g., a record for recording game play data in association with a particular contract identifier). Such game play data may include:

(i) Outcome achieved (e.g., bar-bar-bell, As Qh Qs 3d 2h in video poker);

(ii) Payout amount (e.g., three coins paid for a pair of jacks or better);

(iii) Wager amount (e.g., player wagered two quarters);

(iv) Game actions (e.g., player drew three cards to a pair of queens, player selected first of three locations in a bonus round selection stage);

(v) Type of gaming device played (e.g., stepper, video poker, five reel video);

(vi) Denomination of gaming device played (e.g., nickel, quarter, dollar);

(vii) Manufacturer of gaming device played;

(viii) Location of gaming device played;

(ix) Rate of play (e.g., number of handle pulls per unit time);

(x) Acceleration of play (e.g., rate of increase or decrease in rate of play);

(xi) Variation in wager amount (e.g., increases or decreases in the amount of the wager over time);

(xii) Player tracking card and/or contract card usage (e.g., is the player frequently removing and re-inserting his player tracking card and/or contract card, has the card been inactive for a long period of time, etc.);

(xiii) Precision of player strategy (e.g., is the player playing jacks or better 6/9 video poker according to optimum play); and/or (xiv) Strategy variations (e.g., has the player switched from an optimal video poker strategy to a strategy of sacrificing optimal play to maximize his chances at completing a royal flush).

In one embodiment, step 1605 includes monitoring of player behavior and/or activities other than game play activity at a gaming device. For example, actions that the player makes while establishing and/or reconciling a contract may be monitored as well.

In one embodiment, the monitoring of play of a gaming device may include comparing a player identification presented when establishing and/or reconciling a contract (e.g., at a slot booth) with identification information stored at a controller. This may be done, for example, to check that the same person who purchased the contract is the person attempting to reconcile the contract and/or who has participated in game plays covered by the contract.

In one embodiment, the monitoring of play need not rely on data received from a gaming device. For example, some or all of the data may stored at a controller (e.g., a slot server) or other device (e.g., contract kiosk). In some embodiments, data related to monitored play may be observed and/or input by casino personnel. Some types of data may be received via a contract kiosk or other type of terminal (e.g., player inputs a contract password at a contract kiosk in order to receive a refund amount defined by a contract).

Data associated with monitored play of a gaming device may be stored in a database (e.g., a player database, a purchased contracts database, and/or another database) or other memory means of a device. A player database, for example, may be accessed in accordance with a particular player identifier or player name (e.g., a casino representative keys-in a player name, swipes a player tracking card through a card-reader device in communication with a casino personnel device, etc.) so as to determine information about the player and/or play by the player.

In step 1610, a determination is then made as to whether or not the player should be prevented from purchasing or otherwise entering one or more contracts in the future. This determination may be made based on play of the gaming device (and/or other behavior or activities of a player) monitored and/or stored in step 1605. In one embodiment, determining whether a player should be prevented from purchasing a contract in the future may comprise determining whether the player should be prevented from purchasing or otherwise entering into any contract in the future. In another embodiment, determining whether a player should be prevented from purchasing or otherwise entering into a contract in the future may comprise determining whether the player should be prevented from purchasing or otherwise entering into a specific contract and/or a contract defining one or more specific terms or value thereof.

In one embodiment, determining whether a player should be prevented from purchasing or otherwise entering into a contract in the future may further comprise causing the player to be prevented from purchasing or otherwise entering into a contract in the future. For example, an indication of the player's ineligibility to establish a contract, a particular type of contract, and/or a contract defining certain terms may be stored in an appropriate record of a database (e.g., the record corresponding to the player in the player database). In one embodiment, if the player is to be prevented from purchasing or otherwise entering into a contract in the future for a predetermined period of time, an indication of the period of time may also be stored in association with the player's ineligibility.

In one embodiment, the determination of whether a player should be prevented from purchasing or otherwise entering into a contract in the future, based on play of a gaming device monitored previously, may be performed in response to a player's request to establish a contract. In such an embodiment, an analysis of the stored data may be performed and a message informing the player of his ineligibility may be output based on the analysis at the time of the request. This may be done in some embodiments in lieu of the determination being made based on retrieving a previously stored indication of the player's ineligibility from a record of a database.

In one embodiment, determining whether a player should be prevented from purchasing or otherwise entering into a contract in the future may comprise determining whether the player has complied with one or more terms of the contract the player has previously established. For example, a player whose rate of play during the contract period is below a minimum acceptable rate of play defined by a contract may be prevented from establishing future contracts and/or from establishing future contracts with the minimum acceptable rate of play (in one example, a lower minimum rate of play may be defined by a future contract provided to a player). To make a determination of whether the game play data indicates a compliance with one or more terms of a contract, a controller may access game play data and compare it with the terms defined by the subject contract. In the current example, the play data may indicate that the player made one hundred and twenty (120) handle pulls per hour during the period of time defined by the contract while the contract associated with the player may require a minimum acceptable rate of two hundred (200) handle pulls per hour. In one embodiment, while the player may still receive a refund of losses despite not having complied with the minimum acceptable rate of play, the player may be prevented from establishing a contract in the future and/or from establishing a contract that has a minimum acceptable rate of play of two hundred (200) handle pulls per hour or any greater minimum acceptable rate of play.

It should be noted that determining whether a player should be prevented from purchasing or otherwise entering into a contract in the future may comprise determining that a player should be prevented from entering into a contract for a predetermined period of time and/or until a predetermined condition is satisfied. For example, the player may be prevented from entering into a contract for one month, one year, until the player's average minimum rate of play is at least a predetermined average minimum rate of play, until a status associated with the player changed, etc. In one embodiment, step 1610 may further comprise determining the period of time for which the player is to be prevented from purchasing or otherwise entering into a contract.

In one embodiment, monitored game data may indicate that the player has left his contract play card three times in machines that have not seen play for five minutes or more. While this may be an indication of a forgetful customer, it could also be a signal that the player may be intentionally leaving the contract play card in unattended machines in the hopes that another player will unknowingly sit down at that machine and begin a non-contract gaming session. In this way, the player who sat down might thus generate losses associated with that particular gaming contract without costing the first player any money (since the first player did not post the wagers for the game plays while the contract card was in the gaming device).

These false losses might then result in substantial refund payments to the first player at the conclusion of the period of time defined by the contract. To address this issue, a controller might direct casino personnel to talk with the player when an orphaned card was detected more than three times. Alternatively or in addition, the controller may prevent such a player from establishing contracts in the future (e.g., by flagging the player, in the record of the player database that corresponds to the player, as a player who is not eligible to establish contracts). In another embodiment, a player might be required to visit a slot club booth to reactivate a contract card if it had been sitting idle in a machine for five minutes or more.

In one embodiment, a controller or other device may adjust game play data associated with the subject contract (e.g., to bring it in line with one or more terms of the contract and/or to compensate for one or more behaviors of a player that appear to be aimed at inappropriately maximizing the value of the benefit defined by the contract). For example, if it is determined that the player is removing his contract card after being dealt a strong initial hand in video poker (e.g. four queens) in an effort to generate large false losses (due to the fact that the controller would not track the final outcome if the card had been removed), then the controller may be programmed to automatically add outcomes subsequently achieved by the player after the card was removed. The controller may also be operable to track the initial hand dealt to the player and keep tracking (for the purposes of determining win/loss) until the hand was completed. In one embodiment, a warning message may also be output to casino personnel whenever a player withdrew his contract card after being dealt an initially winning (or likely to result in a winning outcome) video poker hand. Such tactics may also be used in other multi-stage games, such as video blackjack or even reel-based games if the player has an ability to pull a contract card out of a gaming device after seeing winning results on the first three reels of a five reel game.

In one embodiment, determining whether a player should be prevented from purchasing or otherwise entering into a contract in the future may be based on a determination of whether a player's gambling behavior changed in a certain manner during the period of time defined by the contract and/or as compared to the player's gambling behavior while the player was not participating in play covered by a contract. For example, monitored game play data may indicate that a player began a period of time defined by a contract by posting relatively small wagers per game play but then increased the size of the wager per game play dramatically as the contract neared the end of the period of time. This behavior of the player might be consistent with a player attempting to artificially decrease the effective standard deviation of the period of time defined by the contract. While this may not violate the terms of the contract, the casino may choose not to enter into contracts with this player in the future.

In one embodiment, determining whether a player should be prevented from purchasing or otherwise entering into gaming contracts in the future may be based on a determination of whether monitored game play data indicates that the player identifier presented at the reconciliation of a contract matches that provided at the establishment of the contract. Non-matching identification may indicate that a player has sold his contract to another player (perhaps exploiting the fact that contracts may be limited in number and thus may be highly desirable on some days or that only certain player may be eligible to enter into contract in general or into certain highly desirable contracts). The selling player may be prevented from entering into a contract in the future. Similarly, game play data may indicate that a first player has handed his contract card to another player (perhaps determined through the review of surveillance cameras). If such behavior is contrary to the terms of the contract, the player may have restrictions placed on his ability to enter into a contract in the future.

In accordance with some embodiments, a gaming device may have a feature which allows a player to build up equity, such as by collecting diamonds or other benefits or symbols upon an occurrence of a predetermined event during game play (e.g., whenever a special symbol appears on the payline and/or a predetermined outcome is achieved). At such machines, a player participating in contract play may advantageously play with his contract card in the machine until achieving a number of diamond symbols. At this point the may remove the contract card and quickly achieve a bonus payout for accumulating enough diamond symbols. This method of play may be determined by the controller based on the monitored game play data and the player may be prevented from using that particular type of equity machine in future contract play and/or may have other restrictions place on his ability to purchase or otherwise enter into contracts.

In one embodiment, a controller may be operable to terminate contract play under a contract based on the monitored play of the gaming device. The controller may be operable to do so addition to or in lieu of preventing a player from purchasing or otherwise entering into a contract in the future. Alternatively, the controller may reduce benefits to the player associated with the contract. For example, if the contract defines a refund rate of one hundred percent (100%) of a player's losses, the controller may determine to pay back only fifty percent (50%) of the player's losses based on the monitored play of the gaming device.

As described, in one or more embodiments, rather than preventing the player from purchasing or otherwise entering into a contract in the future, the controller may be operable to add rules/restrictions regarding the player's eligibility to enter into contracts in the future. Such rules/restrictions might include, for example:

(i) that the player must pay fifty percent (50%) more for a contract than the player would otherwise be required to pay;

(ii) that the player is eligible for some types of contracts or contract terms, but ineligible for other types of contracts or contract terms;

(iii) that the player may continue to be eligible to enter into a contract, but not for a contract that is eligible for contract play on video poker devices;

(iv) that the player may only establish one contract per month or per other unit of time;

(v) that the player is eligible only for certain value or value ranges of certain contract terms (e.g., a refund rate of up to fifty percent (50%) of losses); and/or (vi) that the player must maintain a minimum of five hundred (500) handle pulls per hour during all contract play.

A. Additional Exemplary Process

Figure 17:
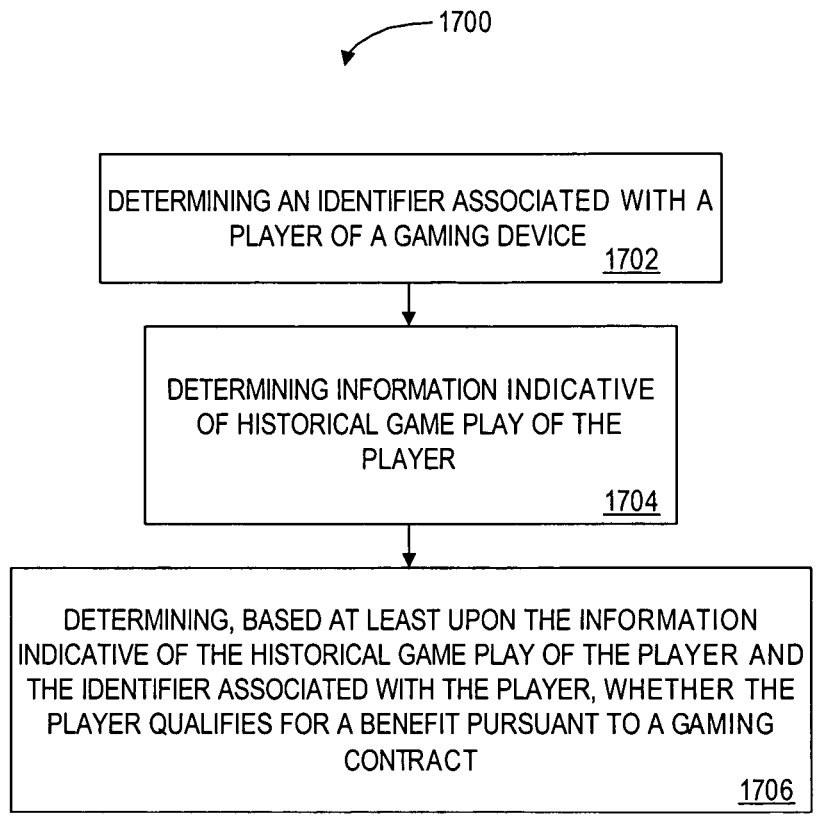
FIG. 17 is a flowchart of a method according to some embodiments.

Referring now to FIG. 17, a method 1700 according to some embodiments is shown. In some embodiments, the method 1700 may be at least partially performed by any of the system 100 of FIG. 1 (or any components thereof), the controller 200 of FIG. 2, and/or the gaming device 300 of FIG. 3. The method 1700 may also or alternatively be associated with and/or at least partially performed or implemented by other devices, objects, and/or entities associated with a casino or other gaming facility. According to some embodiments, some or all processes of the method 1700 may be performed via one or more customer service representatives and/or other employees of a casino and/or hotel or resort.

In some embodiments, the method 1700 may be descriptive of a method of utilizing an existing player tracking system of a casino and/or other establishment to implement gaming contracts. The method 1700 may begin at 1702, for example, by determining an identifier associated with a player of a gaming device. The identifier may, according to some embodiments, comprise a player tracking identifier associated with the player. The identifier may be received, identified, and/or otherwise determined in a variety of ways. The identifier may be received electronically, for example, via one or more of a slot machine or other gaming device (such as in the case a player inserts a player tracking card and/or keys in or provides a verbal indication of the identifier, and/or provides a biometric indicator), a kiosk, a Web site and/or web terminal, a cellular or standard telephone, and/or any combination thereof. In some embodiments, the identifier may also or alternatively comprise a gaming contract identifier. In the case that the player has purchased a gaming insurance policy contract, for example, the identifier may be or include a policy number and/or code (such as an encrypted sequence of numbers associated with the policy).

According to some embodiments, such as it the case that various relational data stores (e.g., such as those described herein) are utilized, a player tracking identifier may be indicative of a gaming contract associated with the player and/or a gaming contract identifier may be indicative of the player (and/or a player tracking number associated therewith). Further, in some embodiments, either or both identifiers may be received and/or determined via other means. The player may provide a verbal indication of the identifier (or identifiers) to a customer service representative or kiosk, for example, and/or may provide a representative and/or device with a gaming contract receipt, gaming contract card, printed copy of a confirmation e-mail, and/or other physical indicia (e.g., a token, barcode, and/or other human or machine-readable indicia).

In some embodiments, the identifier (or identifiers) may be received, identified, and/or otherwise determined as part of an insurance and/or contract claim. The player may believe that a benefit is due pursuant to a previously purchased gaming contract, for example, and may utilize a customer service representative, kiosk, and/or other device to provide an identification of the player and/or the gaming contract. In some embodiments, the player may also provide an indication of an expected amount due as a benefit pursuant to the gaming contract. The player may define, for example, an amount of losses that the player believes should be covered under a gaming insurance contract. According to some embodiments, the player may be sent a reminder (such as an e-mail, pager, and/or cellular telephone reminder) associated with the gaming contract, such as in the case that the player has not yet made or submitted a claim. In some embodiments, the claim may be automatically initiated, facilitated, and/or submitted on the player's behalf, such as in the case that certain conditions associated with the gaming contract are identified and/or determined.

In some embodiments, the method 1700 may continue by determining information indicative of historical game play of the player, at 1704. The identifier (and/or identifiers) determined at 1702, for example, may be utilized to query a database and/or other data store to determine information associated with previous game plays of the player. The identifier may be a player tracking identifier that is utilized to retrieve a player tracking history (and/or portion thereof) associated with the player. In some embodiments, a standard and/or known player tracking card may be inserted into a gaming device by the player, for example, to track metrics associated with the player's gaming activity on the gaming device. According to some embodiments, such metrics may include, but are not limited to: (i) time of game play, (ii) duration of game play (e.g., time period and/or number of plays), (iii) an amount wagered (e.g., coin in and/or coin in per play), (iv) payout amounts (e.g., coin out and/or coin out per play), (v) any combination thereof, and/or (vi) other metrics.

According to some embodiments, the historical game play data may be analyzed, parsed, and/or portioned based on a relevance with respect to the gaming contract. Information associated with the gaming contract, such as contract parameter values, may be utilized, for example, to limit and/or structure a query to a player tracking database to identify a subset of the player's historical game play data. In the case that the gaming contract defines a period of validity between 1 PM and 3 PM on a certain day, for example, only historical game play data associated with the player that occurred during that period may be determined, identified, and/or retrieved. In such a manner, for example, historical game play conducted under and/or in compliance with parameters of the contract may easily and/or quickly be determined. In some embodiments, such data may also or alternatively be flagged (e.g., utilizing one or more database columns) as historical game play data associated with the gaming contract. A record associated with historical game play data may include, for example, a flag such as "Y" or "YES" indicating that the record is associated with a game play contract, and/or an identifier such as "C-001" indicating that the record is associated with a particular gaming contract (e.g., a contract identified by "C-001"). Such flags may be determined and/or populated at a gaming device (e.g., as the game play data is defined and/or detected), at a server (e.g., as the game play data is recorded and/or stored and/or as the data is transformed, transmitted, and/or formatted), and/or at a customer service and/or other processing device (e.g., as a claim pursuant to the gaming contract is identified and/or processed). In some embodiments, a particular table and/or database may be utilized to store only gaming contract-related historical play data, and thus the subset of the player's historical data may be determined by simply querying data from such a data store.

As an example, a coverage period of a gaming contract may be from 2:00 PM to 3:00 PM on a specific date. Thus, a database storing a player's entire history of gaming may be accessed, and it may be determined that the player executed five hundred and twenty-one (521) game plays, wagered one hundred and sixty dollars and fifty cents ($160.50), and won one hundred and fifteen dollars ($115.00) in payouts during this time. Game plays that were not executed during this time frame may, according to some embodiments, not be considered, retrieved, and/or analyzed. Data outside of the scope of one or more parameters of the gaming contract may be filtered out of database query results, for example. In some embodiments, other parameters may alternatively or additionally be utilized besides coverage period to determine whether or not historic game play is covered by a gaming contract and/or gaming insurance policy. For example, if a player wagers more than fifty cents (50¢; e.g., maximum wager amount per game play) in association with a particular game play, that game play may be considered not to be covered by the gaming contract.

According to some embodiments, the method 1700 may continue at 1706 by determining, based at least upon the information indicative of the historical game play of the player and the identifier associated with the player, whether the player qualifies for a benefit pursuant to the gaming contract. The historical game play data determined at 1704 may be compared to one or more parameters of a gaming contract associated with the player (e.g., determined from the identifier of 1702), for example, to determine if the game play complied with and/or satisfied such gaming contract parameters. Any game play determined to be associated with the gaming contract, for example, may be examined and/or analyzed to determine if such game play satisfied conditions, requirements, and/or parameters of the gaming contract. In the case that the player was required to play for three (3) hours during a weekday to obtain insurance for any losses resulting from the play, for example, any game play data not occurring on a weekday may initially be ignored, filtered, and/or simply not considered. Any game play determined to have occurred during the specific gaming contract period (e.g., on a weekday, and presumably during an effective period of the gaming contract) may be compared to conditions of the gaming contract to determine contract compliance and/or to verify a claim amount.

In the case that the associated game play does not satisfy the three (3) hour requirement, for example, the player may not have qualified, pursuant to the gaming contract, to have any losses indemnified. Accordingly, any claim of the player may be denied. In the case that the gaming contract-related game play satisfies the three (3) hour play duration and/or one or more other conditions, however, the player's claim may be deemed legitimate. In some embodiments, the amount of the claim, loss, and/or any benefit due to the player may then be determined and/or verified. Any alleged loss and/or alleged benefit amount provided by the player may, for example, be compared to gaming contract terms and/or to the relevant associated historical game play to determine any amount and/or other benefit that may be due to the player.

As an example, consider the previous example of historic game play (the player executed five hundred and twenty-one (521) game plays, wagered one hundred and sixty dollars and fifty cents ($160.50), and won one hundred and fifteen dollars ($115.00) in payouts during the coverage period), in light of the following exemplary gaming contract parameters: (i) a refund rate equal to fifty percent (50%) of total losses, and (ii) a minimum refund amount of twenty-five dollars ($25). Thus, the player may receive a refund of twenty-five dollars ($25) for the covered play (forty-five dollars and fifty cents ($45.50) in total losses divided by two (2)=twenty-two dollars and seventy-five cents ($22.75), which is less than the minimum twenty-five dollar ($25) refund amount).

In some embodiments, the method 1700 may comprise fewer or more steps than those shown in FIG. 17. The method 1700 may include, for example, one or more processes directed to registering a player for a gaming contract. An indication that a player is interested in a gaming contract and/or desires to register or sign up for a gaming contract may, according to some embodiments, be received. The player may utilize a kiosk, gaming device, Web-related device, and/or PDA, for example, to initiate registration for a gaming contract. In some embodiments (such as described herein), the player may select from a menu of available gaming contracts. Similarly, the player may define, select, and/or otherwise determine one or more parameters and/or values thereof to be associated with the gaming contract. In some embodiments, the player may also or alternatively provide an indication to a casino employee such as a customer service representative and/or may fill out and/or provide one or more forms (such as a gaming contract registration form). According to some embodiments, the player may purchase the gaming contract and/or receive indicia of the contract (such as the gaming contract cards and/or receipts described herein).

In some embodiments, the gaming contract may define and/or be defined by one or more parameters and/or values thereof, as described herein. Terms of the gaming contract may specify, for example, (i) a period covered by the gaming contract (e.g., denoted by time (such as the next hour or from 1:00-3:00 PM) or game plays (the next two hundred (200) spins)); (ii) a refund rate (as percentage of loss), a refund amount (flat refund), a maximum/minimum refund amount (at least fifty dollars ($50), no more than four hundred dollars ($400), etc.), a deductible, etc.; (iii) and identification of eligible gaming devices, gaming device types, and/or game types; (iv) a maximum/minimum/fixed wager amount per game play; (v) a purchase price (e.g., a flat price, such as thirty dollars ($30) for policy) and/or incremental fees/premium (e.g., a twenty-five cent (25¢) premium per one dollar ($1) wagered); and/or (vi) other play requirements (e.g., a rate of play, etc.). As described, such parameters may be operator-specified, player-specified, or combination of both.

According to some embodiments, the method 1700 may also or alternatively comprise storing and/or recording the parameters of the gaming contract. The parameters may be stored in one or more data stores such as databases and/or tables thereof, for example, and/or may be associated with a player identifier (such as a player tracking identifier) and/or gaming contract identifier (e.g., such as the identifier determined at 1702). According to some embodiments, the parameters may be stored and/or recorded via one or more forms and/or other paperwork. Processes and/or devices associated with Optical Character Recognition (OCR) and/or Optical Mark Recognition (OMR) may be utilized, for example, to determine the one or more parameters (and/or values thereof) and/or convert hard-copy indicia of such parameters to electrical and/or digital indicia. Computer-readable forms such as forms provided by the Scantron® Corporation of Irvine, Calif., may be utilized, for example.

As an example, a player and/or representative may fill in appropriate bubbles or boxes of a form, thereby selecting various gaming contract parameters (e.g., a box next to "$400" is checked in association with a category of "refund limit" to define and/or request a four hundred dollar ($400) refund limit). Player indicia such as a player tracking number may also or alternatively be recorded in such a manner so as to easily associate the contract and parameters with a specific player. In some embodiments, the player identifier may be indicated by a barcode, code, key, and/or other human and/or machine-readable indicia that is or becomes known or practicable. In some embodiments, forms and/or data associated with a player's purchase and/or registration for a gaming contract may be stored and/or arranged in accordance with various methods to allow easy indexing and/or location of particular forms at a later time. Physical copies of the forms may simply be arranged by player tracking numbers, for example, and/or scanned-in electronic versions of the forms may be indexed and/or arranged by player tracking numbers and/or other pertinent metrics. In some embodiments, digital images of the forms may be stored in one or more databases for easy retrieval and/or analysis.

According to some embodiments, the gaming contract metrics may be stored and/or indicated on one or more objects provided to the player. A player's player tracking card may store an indication of the gaming contract (such as a gaming contract identifier) and/or gaming contract parameters, for example, and/or the player may be provided with a gaming contract card (such as a paper card, a plastic magnetic stripe card, etc.), a receipt, an e-mail, and/or other physical and/or electronic indicia or record.

In some embodiments, the same device and/or devices may be utilized to register the player for the gaming contract as well as reconcile the gaming contract and/or analyze or processes gaming contract claims (such as gaming contract insurance claims). The player may sign up for a gaming contract at a kiosk and/or customer service desk, for example, play at one or more gaming devices using a player tracking card, and may then return to the customer service desk and/or kiosk to make a claim under the gaming contract. In such a manner, for example, existing player tracking systems may be utilized without substantial or any modification to practice embodiments described herein. In some embodiments for example, a customer service desk, kiosk, and/or other hardware and/or personnel may simply be tasked to handle gaming contract, while the player tracking system operates as usual. In such embodiments, the player tracking data may then be utilized by the gaming contract personnel and/or devices to determine compliance with gaming contract terms and/or parameters.

The foregoing description discloses only exemplary embodiments of the invention; modifications of the above disclosed apparatus and methods that fall within the scope of the invention will be readily apparent to those of ordinary skill in the art.

For example, it should be understood that aspects of the invention may be utilized in connection with a device or devices located at a table game which facilitate placement of bets or other activities at a table game while reducing or eliminating actions required on a part of a player of the table game. For example, the MP21™ table manufactured by Bally Table Management Systems (TMS)™ division of Bally Systems® is an advanced blackjack table that includes an array of state-of-the-art optical and electronic sensors. The MP21™ constantly captures real-time data to instantly track and record every card dealt and every wager made to determine an accurate reporting of table game results. A device such as the MP21™ may be used in embodiments of the present invention to monitor contract play at a table game.

Other products manufactured by Bally TMS™ may also be used in embodiments of the present invention to monitor contract play at a table game. For example, Bally TMS™ produces the technology formerly known as MindPlay™, which includes touch-screen data ratings products (formerly known as eTABLE™), card security (Bally MPBaccarat™, UCS intelligent card shoe), and the MP21™ Any and all of these products may be used in an embodiment of the present invention. Further, U.S. Pat. No. 6,460,848 to Soltys et al., entitled "Method and Apparatus for Monitoring Casinos and Gaming" describes a "system [that] automatically monitors playing and wagering of a game, including the gaming habits of players and the performance of employees." (Abstract). The systems and methods of this invention may be used some embodiments described herein to monitor gaming activity of a player (e.g., at a table game) and is hereby incorporated by reference herein for all purposes.

It should also be understood that aspects of the present invention may be applicable to games in which the skill of the player and/or player input may partially or completely determine the outcomes. Such games may include video poker and video blackjack and may also include other games not usually present in casinos. For example, such games may include a simulation of a golf putting game, in which player input causes a simulated golf ball to be propelled toward a simulated golf hole. If the simulated ball lands in the simulated hole, a prize may be awarded. A machine which allows playing of such a simulated golf game is to be included in the term "gaming device" as used herein.

Accordingly, while the present invention has been disclosed in connection with exemplary embodiments thereof, it should be understood that other embodiments may fall within the spirit and scope of the invention as defined by the following claims.

VIII. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s). The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby"

modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality and/or features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method of operating a gaming system, the method comprising:
   (a) causing at least one processor to operate with at least one input device to enable a player to pay a fee to enter into a contract for a benefit, the contract being associated with one or more terms and the benefit including a predetermined flat refund amount;
   (b) regardless of whether the player has entered into the contract, enabling the player to place one or more monetary wagers on one or more plays of a game, said one or more monetary wagers being in addition to the fee;
   (c) causing the at least one processor to operate with the at least one input device to determine an identifier associated with the a player; and
   (d) if the player has entered into the contract:
      (i) causing the at least one processor to determine information indicative of historical game play of the player;
      (ii) causing the at least one processor to determine, based at least upon the information indicative of historical game play of the player and the identifier associated with the player, whether the one or more terms of the contract are satisfied; and
      (iii) if it is determined that the one or more terms of the contract are satisfied, causing the at least one processor to operate with at least one display device to display the benefit and to cause the benefit to be provided to the player.

2. The method of claim 1, wherein causing the at least one processor to operate with the at least one input device to determine the identifier associated with the player comprises:
   causing the at least one processor to operate with the at least one input device to receive an indication of a player tracking number associated with the player.

3. The method of claim 1, wherein causing the at least one processor to determine the information indicative of historical game play of the player is based at least in part on the identifier associated with the player.

4. The method of claim 3, wherein causing the at least one processor to determine the information indicative of historical game play of the player comprises:
   causing the at least one processor to query a database to retrieve the information indicative of historical game play of the player.

5. The method of claim 1, wherein causing the at least one processor to operate with the at least one input device to determine the identifier associated with the player comprises, if the player has entered into the contract:
  causing the at least one processor to operate with the at least one input device to receive an indication of a contract identifier associated with the contract.

6. The method of claim 1, further comprising, if the player has entered into the contract:
  causing the at least one processor to determine, based at least in part on the identifier associated with the player, information indicative of the contract associated with the player.

7. The method of claim 6, wherein causing the at least one processor to determine the information indicative of the contract associated with the player comprises:
  causing the at least one processor to query a database to retrieve the information indicative of the contract associated with the player.

8. The method of claim 6, wherein causing the at least one processor to determine whether the one or more terms of the contract are satisfied comprises:
  causing the at least one processor to compare the information indicative of historical game play of the player with the information indicative of the contract associated with the player.

9. The method of claim 6, wherein the information indicative of the contract associated with the player defines the one or more terms of the contract.

10. The method of claim 9, wherein causing the at least one processor to determine whether the one or more terms of the contract are satisfied comprises:
  causing the at least one processor to determine, based on the information indicative of historical game play of the player, that the historical game play of the player satisfies the one or more terms of the contract.

11. The method of claim 6, further comprising:
  causing the at least one processor to store the information indicative of the contract.

12. The method of claim 1, further comprising:
  causing the at least one processor to operate with the at least one input device to receive, from the player, a request to enter into the contract.

13. The method of claim 1, further comprising:
  causing the at least one processor to operate with the at least one input device to receive the fee for the contract from the player.

14. The method of claim 1, further comprising:
  causing the at least one processor to monitor any wagered-on plays of the game by the player; and
  causing the at least one processor to store, based at least in part on the monitoring, the information indicative of historical game play of the player.

15. A method of operating a gaming system, said method comprising:
  (a) if a player has paid a fee to enter into a contract for a benefit including a predetermined flat refund amount, said fee being in addition to any monetary wagers placed on any plays of any games and the contract being associated with one or more terms, causing at least one processor to operate with at least one input device to receive an indication of a contract insurance claim associated with said contract;
  (b) thereafter, causing the at least one processor to determine information indicative of a subset of historical game play of the player, wherein said subset of historical game play is associated with the contract;
  (c) causing the at least one processor to determine whether the one or more terms of the contract are satisfied; and
  (d) if it is determined that the one or more terms of the contract are satisfied, causing the at least one processor to operate with at least one display device to display the benefit and to cause the benefit to be provided to the player.

16. The method of claim 15, wherein causing the at least one processor to operate with the at least one input device to receive the indication of the contract insurance claim associated with the contract comprises:
  causing the at least one processor to operate with the at least one input device to receive an indication of at least one of a player tracking identifier associated with the player and a contract identifier associated with the contract.

17. The method of claim 15, wherein causing the at least one processor to determine the information indicative of the subset of historical game play of the player comprises:
  causing the at least one processor to retrieve from a database, utilizing a player tracking identifier associated with the player, information indicative of a portion of historical game play of the player.

18. The method of claim 17, wherein the information indicative of the portion of historical game play associated with the contract is determined by accessing a temporal restriction associated with the contract and determining records of historical game play stored in the database that satisfy the temporal restriction.

19. The method of claim 15, wherein causing the at least one processor to determine whether the one or more terms of the contract are satisfied comprises:
  causing the at least one processor to compare the information indicative of the subset of historical game play of the player to the one or more terms of the contract.

20. A gaming system, comprising:
  at least one display device;
  at least one input device;
  a processor; and
  a memory coupled to the processor, the memory storing instructions operable to cause the processor to operate with the at least one display device and the at least one input device to:
  (a) enable a player to pay a fee to enter into a contract for a benefit, the contract associated with one or more terms and the benefit including a predetermined flat refund amount;
  (b) regardless of whether the player has entered into the contract, enable the player to place one or more monetary wagers on one or more plays of a game, said one or more monetary wagers being in addition to the fee;
  (c) determine an identifier associated with the player; and
  (d) if the player has entered into the contract:
    (i) determine information indicative of historical game play of the player;
    (ii) determine, based at least upon the information indicative of the historical game play of the player and the identifier associated with the player, whether the one or more terms of the contract are satisfied; and
    (iii) if it is determined that the one or more terms of the contract are satisfied, display and cause the benefit to be provided to the player.

21. A method of operating a gaming system, the method comprising:
  (a) causing at least one processor to operate with at least one input device to enable a player to pay a fee to enter into a contract for a benefit, the contract being associated with one or more terms and a contract period;

(b) regardless of whether the player has entered into the contract, enabling the player to place one or more monetary wagers on one or more plays of a game, said one or more monetary wagers being in addition to the fee;

(c) causing the at least one processor to operate with the at least one input device to determine an identifier associated with the player; and (d) if the player has entered into the contract:
  (i) causing the at least one processor to determine information indicative of historical game play of the player;
  (ii) causing the at least one processor to determine, based at least upon the information indicative of historical game play of the player and the identifier associated with the player, whether the one or more terms of the contract are satisfied;
  (iii) if it is determined that the one or more terms of the contract are satisfied, causing the at least one processor to operate with at least one display device to display and cause the benefit to be provided to the player, the benefit including a refund amount based on a determined amount of money lost by the player in at least one wagered-on play of the game during the contract period.

22. The method of claim 21, wherein causing the at least one processor to operate with the at least one input device to determine the identifier associated with the player comprises:
  causing the at least one processor to operate with the at least one input device to receive an indication of a player tracking number associated with the player.

23. The method of claim 21, wherein the causing the at least one processor to determine the information indicative of historical game play of the player is based at least in part on the identifier associated with the player.

24. The method of claim 23, wherein causing the at least one processor to determine the information indicative of historical game play of the player comprises:
  causing the at least one processor to query a database to retrieve the information indicative of historical game play of the player.

25. The method of claim 21, wherein causing the at least one processor to operate with the at least one input device to determine the identifier associated with the player comprises, if the player has entered into the contract:
  causing the at least one processor to operate with the at least one input device to receive an indication of a contract identifier associated with the contract.

26. The method of claim 21, further comprising, if the player has entered into the contract:
  causing the at least one processor to determine, based at least in part on the identifier associated with the player, information indicative of the contract associated with the player.

27. The method of claim 26, wherein causing the at least one processor to determine the information indicative of the contract associated with the player comprises:
  causing the at least one processor to query a database to retrieve the information indicative of the contract associated with the player.

28. The method of claim 26, wherein causing the at least one processor to determine whether the one or more terms of the contract are satisfied comprises:

causing the at least one processor to compare the information indicative of historical game play of the player with the information indicative of the contract associated with the player.

29. The method of claim 26, wherein the information indicative of the contract associated with the player defines the one or more terms of the contract.

30. The method of claim 29, wherein causing the at least one processor to determine whether the one or more terms of the contract are satisfied comprises:
  causing the at least one processor to determine, based on the information indicative of historical game play of the player, that the historical game play of the player satisfies the one or more terms of the contract.

31. The method of claim 26, further comprising:
  causing the at least one processor to store the information indicative of the contract.

32. The method of claim 21, further comprising:
  causing the at least one processor to operate with the at least one input device to receive, from the player, a request to enter into the contract.

33. The method of claim 21, further comprising:
  causing the at least one processor to operate with the at least one input device to receive, from the player, the fee for the contract.

34. The method of claim 21, further comprising:
  causing the at least one processor to monitor any wagered-on plays of the game by the player; and
  causing the at least one processor to store, based at least in part on the monitoring, the information indicative of historical game play of the player.

35. A method of operating a gaming system, said method comprising:
  (a) if a player has paid a fee to enter into a contract for a benefit, said fee being in addition to any monetary wagers placed on any plays of any games and the contract being associated with one or more terms and a contract period, causing at least one processor to operate with at least one input device to receive an indication of a contract insurance claim associated with the contract;
  (b) causing the at least one processor to determine information indicative of a subset of historical game play of the player, wherein said subset of historical game play is associated with the contract;
  (c) causing the at least one processor to determine whether the one or more terms of the contract are satisfied; and
  (d) if it is determined that the one or more terms of the contract are satisfied, causing the at least one processor to operate with at least one display device to display and cause the benefit to be provided to the player, the benefit including a refund amount based on a determined amount of money lost by the player in at least one wagered-on play of the game during the contract period.

36. The method of claim 35, wherein causing the at least one processor to operate with the at least one input device to receive the indication of the contract insurance claim associated with the contract comprises:
  causing the at least one processor to operate with the at least one input device to receive an indication of at least one of a player tracking identifier associated with the player and a contract identifier associated with the contract.

37. The method of claim 35, wherein causing the at least one processor to determine the information indicative of the subset of historical game play of the player comprises:

causing the at least one processor to retrieve from a database, utilizing a player tracking identifier associated with the player, information indicative of a portion of historical game play of the player.

38. The method of claim 37, wherein the information indicative of the portion of historical game play associated with the contract is determined by accessing a temporal restriction associated with the contract and determining records of historical game play stored in the database that satisfy the temporal restriction.

39. The method of claim 35, wherein causing the at least one processor to determine whether the one or more terms of the contract are satisfied comprises:
causing the at least one processor to compare the information indicative of the subset of historical game play of the player to the one or more terms of the contract.

40. A gaming system comprising:
at least one display device;
at least one input device;
a processor; and
a memory coupled to the processor, the memory storing instructions operable to cause the processor to operate with the at least one display device and the at least one input device to:
(a) enable a player to pay a fee to enter into a contract for a benefit, the contract associated with one or more terms and a contract period;
(b) regardless of whether the player has entered into the contract, enable the player to place one or more monetary wagers on one or more plays of a game, said one or more monetary wagers being in addition to the fee;
(c) determine an identifier associated with the player; and
(d) if the player has entered into the contract:
  (i) determine information indicative of historical game play of the player;
  (ii) determine, based at least upon the information indicative of the historical game play of the player and the identifier associated with the player, whether the one or more terms of the contract are satisfied; and
  (iii) if it is determined that the player qualifies for the benefit, display and cause provide the benefit to be provided to the player, the benefit including a refund amount based on a determined amount of money lost by the player in at least one wagered-on play of the game during the contract period.

* * * * *